US012750691B2

(12) United States Patent
Matsumura et al.

(10) Patent No.: US 12,750,691 B2
(45) Date of Patent: Sep. 29, 2026

(54) TERMINAL, A RADIO COMMUNICATION METHOD, A BASE STATION, AND A SYSTEM FOR CONTROLLING RECEPTION OF A SYNCHRONIZATION SIGNAL BLOCK

(71) Applicant: NTT DOCOMO, INC., Tokyo (JP)

(72) Inventors: Yuki Matsumura, Tokyo (JP); Naoya Shibaike, Tokyo (JP); Hiroki Harada, Tokyo (JP); Haruhi Echigo, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 312 days.

(21) Appl. No.: 18/292,221

(22) PCT Filed: Jul. 30, 2021

(86) PCT No.: PCT/JP2021/028431
§ 371 (c)(1),
(2) Date: Jan. 25, 2024

(87) PCT Pub. No.: WO2023/007728
PCT Pub. Date: Feb. 2, 2023

(65) Prior Publication Data

US 2024/0284193 A1 Aug. 22, 2024

(51) Int. Cl.
*H04W 16/28* (2009.01)
*H04B 7/08* (2006.01)
*H04W 56/00* (2009.01)

(52) U.S. Cl.
CPC ............ *H04W 16/28* (2013.01); *H04B 7/088* (2013.01); *H04W 56/001* (2013.01)

(58) Field of Classification Search
CPC .... H04W 16/28; H04W 56/001; H04B 7/088; H04B 7/06968; H04B 7/06958; H04L 5/0048; H04L 5/0023
See application file for complete search history.

(56) References Cited

U.S. PATENT DOCUMENTS

2019/0058517 A1* 2/2019 Kang .................. H04B 7/0695
2019/0074890 A1 3/2019 Chang et al.
(Continued)

FOREIGN PATENT DOCUMENTS

WO WO-2020090094 A1 * 5/2020 ......... H04B 7/06968
WO 2021102692 A1 6/2021
(Continued)

OTHER PUBLICATIONS

Extended European Search Report issued in Application No. 21951927.9, mailed Mar. 21, 2025 (9 pages).
(Continued)

*Primary Examiner* — Angelica Perez
(74) *Attorney, Agent, or Firm* — Osha Bergman Watanabe & Burton LLP

(57) ABSTRACT

A terminal according to one aspect of the present disclosure includes: a receiving section that receives a synchronization signal block including a first signal and a second signal; and a control section that controls the reception of the synchronization signal block by assuming that a first beam used for the first signal is different from a second beam used for the second signal. According to one aspect of the present disclosure, coverage can be improved by taking account of overhead.

5 Claims, 48 Drawing Sheets

(56) References Cited

U.S. PATENT DOCUMENTS

| | | | | |
|---|---|---|---|---|
| 2019/0090212 | A1* | 3/2019 | Chou | H04W 48/08 |
| 2020/0275409 | A1* | 8/2020 | Gonzalez | H04W 68/02 |
| 2022/0321285 | A1* | 10/2022 | Khoshnevisan | H04L 5/0003 |
| 2022/0408224 | A1 | 12/2022 | Sun et al. | |
| 2024/0049154 | A1 | 2/2024 | Svendsen et al. | |
| 2024/0188089 | A1* | 6/2024 | He | H04J 11/0076 |
| 2026/0136369 | A1* | 5/2026 | Li | H04W 72/23 |

FOREIGN PATENT DOCUMENTS

| | | | |
|---|---|---|---|
| WO | 2022161591 | A1 | 8/2022 |
| WO | 2022266604 | A1 | 12/2022 |

OTHER PUBLICATIONS

Office Action issued in Japanese Patent Application No. 2023-538188, issued May 27, 2025 (8 pages).
International Search Report issued in PCT/JP2021/028431 on Feb. 22, 2022 (5 pages).
Written Opinion of the International Searching Authority issued in PCT/JP2021/028431 on Feb. 22, 2022 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
ASTRI, TCL Communication Ltd.; "Efficient design of SS block"; 3GPP TSG-RAN WG1 #87, R1-1612289; Reno, US; Nov. 14-18, 2016 (7 pages).

* cited by examiner

FIG. 23A

| INDICATION INFORMATION VALUE | BEAM ID |
|---|---|
| 00 | #0, #1 |
| 01 | #4, #5 |
| 10 | #0, #1, #2, #3 |
| 11 | #4, #5, #6, #7 |

FIG. 23B

| INDICATION INFORMATION VALUE | BEAM ID |
|---|---|
| 00 | #0, #1, #4, #5 |
| 01 | #4, #5, #6, #7 |
| 10 | #0, #1, #2, #3 |
| 11 | #4, #5, #6, #7 |

FIG. 30A

| INDEX | SSB INDEX |
|---|---|
| 1 | SSB#1-1 |
| 2 | SSB#1-2 |
| 3 | SSB#1-3 |
| 4 | SSB#1-4 |
| 5 | SSB#2-1 |
| … | … |

FIG. 30B

| INDEX | SSB INDEX |
|---|---|
| 1 | SSB#x-1 |
| 2 | SSB#x-2 |
| 3 | SSB#x-3 |
| 4 | SSB#x-4 |

FIG. 36A

REPETITION NUMBER CONFIGURATION PATTERN

| Config. | NUMBER OF REPETITIONS |
|---|---|
| #1 | 4 |
| #2 | 3 |
| #3 | 2 |
| #4 | 1 |

FIG. 36B

REPETITION NUMBER CONFIGURATION PATTERN

| Config. | NUMBER OF PUSCH REPETITIONS | NUMBER OF PUCCH REPETITIONS | NUMBER OF PDSCH REPETITIONS | ... |
|---|---|---|---|---|
| #1 | 4 | 3 | 2 | ... |
| #2 | 3 | 2 | 1 | ... |
| #3 | 2 | 1 | 1 | ... |
| #4 | 1 | 1 | 1 | ... |

FIG. 39A

| SSB RSRP:P [dBm] | NUMBER OF REPETITIONS |
|---|---|
| P < P_0 | 4 |
| P_0 <= P < P_1 | 3 |
| P_1 <= P < P_2 | 2 |
| P_2 <= P | 1 |

FIG. 39B

| SSB RSRP:P [dBm] | NUMBER OF PUSCH REPETITIONS | NUMBER OF PUCCH REPETITIONS | NUMBER OF PDSCH REPETITIONS | ... |
|---|---|---|---|---|
| P < P_0 | 4 | 3 | 2 | ... |
| P_0 <= P < P_1 | 3 | 2 | 1 | ... |
| P_1 <= P < P_2 | 2 | 1 | 1 | ... |
| P_2 <= P | 1 | 1 | 1 | ... |

FIG. 40A

REPETITION NUMBER REPORT CONFIGURATION

| Config. | NUMBER OF REPETITIONS |
|---|---|
| #1 | 4 |
| #2 | 3 |
| #3 | 2 |
| #4 | 1 |

FIG. 40B

REPETITION NUMBER REPORT CONFIGURATION

| Config. | NUMBER OF PUSCH REPETITIONS | NUMBER OF PUCCH REPETITIONS | NUMBER OF PDSCH REPETITIONS | ... |
|---|---|---|---|---|
| #1 | 4 | 3 | 2 | ... |
| #2 | 3 | 2 | 1 | ... |
| #3 | 2 | 1 | 1 | ... |
| #4 | 1 | 1 | 1 | ... |

FIG. 41A

REPETITION NUMBER INDICATION CONFIGURATION

| Config. | NUMBER OF REPETITIONS |
|---|---|
| #1 | 4 |
| #2 | 3 |
| #3 | 2 |
| #4 | 1 |

FIG. 41B

REPETITION NUMBER INDICATION CONFIGURATION

| Config. | NUMBER OF PUSCH REPETITIONS | NUMBER OF PUCCH REPETITIONS | NUMBER OF PDSCH REPETITIONS | ... |
|---|---|---|---|---|
| #1 | 4 | 3 | 2 | ... |
| #2 | 3 | 2 | 1 | ... |
| #3 | 2 | 1 | 1 | ... |
| #4 | 1 | 1 | 1 | ... |

SSBS WITH WIDE BEAMS (FIRST SSB)

SBS WITH NARROW BEAMS (SECOND SSBS)

FIG. 44A

REPETITION NUMBER INDICATION CONFIGURATION

| Config. | NUMBER OF REPETITIONS | BEAM |
|---|---|---|
| #1 | 4 | WIDE |
| #2 | 3 | WIDE |
| #3 | 2 | NARROW |
| #4 | 1 | NARROW |

FIG. 44B

REPETITION NUMBER INDICATION CONFIGURATION

| Config. | NUMBER OF PUSCH REPETITIONS | NUMBER OF PUCCH REPETITIONS | NUMBER OF PDSCH REPETITIONS | ... | BEAM |
|---|---|---|---|---|---|
| #1 | 4 | 3 | 2 | ... | WIDE |
| #2 | 3 | 2 | 1 | ... | WIDE |
| #3 | 2 | 1 | 1 | ... | NARROW |
| #4 | 1 | 1 | 1 | ... | NARROW |

TERMINAL, A RADIO COMMUNICATION METHOD, A BASE STATION, AND A SYSTEM FOR CONTROLLING RECEPTION OF A SYNCHRONIZATION SIGNAL BLOCK

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

In existing LTE systems (for example, 3GPP Rel. 8 to Rel. 14), a user terminal (User Equipment (UE)) transmits uplink control information (UCI) by using at least one of UL data channel (for example, Physical Uplink Shared Channel (PUSCH)) and UL control channel (for example, Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), improvement of coverage is studied.

However, when beams are configured to be narrow/increased in number for coverage improvement, this may increase overhead and decrease communication throughput.

Thus, an object of the present disclosure is to provide a terminal, a radio communication method, and a base station that can improve coverage by taking account of overhead.

Solution to Problem

A terminal according to one aspect of the present disclosure includes: a receiving section that receives a synchronization signal block including a first signal and a second signal; and a control section that controls the reception of the synchronization signal block by assuming that a first beam used for the first signal is different from a second beam used for the second signal.

Advantageous Effects of Invention

According to one aspect of the present disclosure, coverage can be improved by taking account of overhead.

BRIEF DESCRIPTION OF DRAWINGS

FIGS. 23A and 23B are diagrams to show examples of Aspect 8-4-2.

FIGS. 30A and 30B are diagrams to show examples of Aspect 10-2.

FIGS. 36A and 36B are diagrams to show examples of a repetition number configuration according to the eleventh embodiment.

FIGS. 39A and 39B are diagrams to show examples of Aspect 12-1-A.

FIGS. 40A and 40B are diagrams to show examples of Aspect 12-1-B.

FIGS. 41A and 41B are diagrams to show examples of Aspect 12-2.

FIGS. 44A and 44B are diagrams to show examples of a repetition number indication configuration.

DESCRIPTION OF EMBODIMENTS

TCI, Spatial Relation, QCL

Figure 1A:
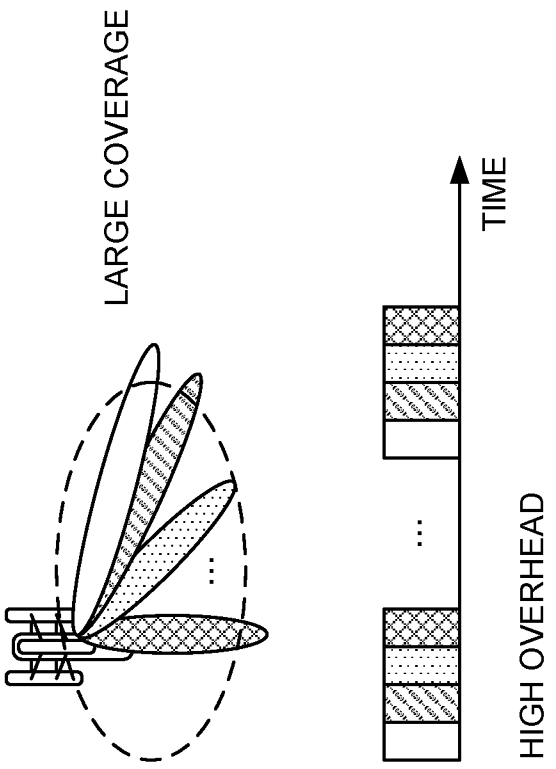
FIGS. 1A and 1B are diagrams to show examples of beams and coverage.

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE, based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

- QCL type A (QCL-A): Doppler shift, Doppler spread, average delay, and delay spread
- QCL type B (QCL-B): Doppler shift and Doppler spread
- QCL type C (QCL-C): Doppler shift and average delay
- QCL type D (QCL-D): Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

Note that a channel/signal being a target of application of a TCI state may be referred to as a target channel/reference signal (RS) or simply as a target, and another signal described above may be referred to as a reference reference signal (reference RS) and a source RS or simply as a reference.

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), a reference signal for QCL detection (also referred to as a QRS), a demodulation reference signal (DMRS), and the like.

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a given channel/signal, and this RS may be referred to as a QCL source of QCL type X in the TCI state.

In a TCI state of a DMRS of a PDCCH/PDSCH, a type A RS may always be configured (in both FR1 and FR2), and a type D RS may be configured (mainly in FR2).

The type A RS may be used for channel information measurement over a long time period, for example, used for channel estimation of the DMRS. Such measurement of the DMRS only gives an instantaneous measurement value and hence does not give Doppler information and the like. A UE measures a periodic RS (for example, a TRS) configured as the type A RS to obtain information of type A {Doppler shift, Doppler spread, average delay, delay spread} in advance and then receive the PDCCH/PDSCH by using this information.

The Type D RS is used for notification of a base-station-side transmission spatial domain filter (analog beam). The UE measures an RS (for example, a TRS) configured as the type D RS to select a UE-side reception spatial domain filter and then uses this reception spatial domain filter to receive the PDCCH/PDSCH.

Initial Access Procedure

In an initial access procedure, the UE (RRC_IDLE mode) receives an SS/PBCH block (SSB), transmits Msg.1 (PRACH/random access preamble/preamble), receives Msg.2 (PDCCH, PDSCH including a random access response (RAR)), transmits Msg.3 (PUSCH scheduled by RAR UL grant), and receives Msg.4 (PDCCH, PDSCH including a UE contention resolution identity). Subsequently, when ACK for Msg.4 by a base station (network) is transmitted from the UE, RRC connection is established (RRC_CONNECTED mode).

The reception of the SSB includes PSS detection, SSS detection, PBCH-DMRS detection, and PBCH reception. In the PSS detection, detection of part of a physical cell ID (PCI), detection (synchronization) of OFDM symbol timing, and (coarse) frequency synchronization are performed. The SSS detection includes detection of the physical cell ID. The PBCH-DMRS detection includes detection of (part of) an SSB index within a half radio frame (5 ms). The PBCH reception includes detection of a system frame number (SFN) and radio frame timing (SSB index), reception of configuration information for remaining minimum system information (RMSI, SIB1), and recognition of whether the UE can camp on the cell (carrier).

The SSB includes 20 RBs and has a time corresponding to four symbols. Transmission periodicity of the SSB can be configured from among {5, 10, 20, 40, 80, 160} ms. A plurality of symbol locations of SSB in a half frame are defined based on a frequency range (FR1, FR2).

The PBCH includes 56-bit payload. N repetitions of the PBCH are transmitted in periodicity of 80 ms. N depends on SSB transmission periodicity.

System information is constituted of an MIB carried by a PBCH, RMSI (SBI1), and other system information (OSI). SBI1 includes a RACH configuration and information for performing a RACH procedure. A relationship of time/frequency resources between the SSB and a PDCCH monitoring resource for SBI1 is configured by the PBCH.

The base station using beam correspondence uses a plurality of beams to transmit one of a plurality of SSBs in each cycle of the SSB transmission periodicity. The plurality of SSBs have a plurality of respective SSB indices. The UE that has detected one SSB transmits a PRACH in a RACH occasion associated with the SSB index of the SSB and receives a RAR in a RAR window.

Beams and Coverage

In a high frequency band, unless beamforming is applied to a synchronization signal/reference signal, coverage is small, which makes it difficult for a UE to find a base station. Meanwhile, when beamforming is applied to a synchronization signal/reference signal to ensure coverage, this enables the signal to reach in a specific direction while making it difficult for the signal to reach in directions other than the specific direction (FIG. 1A). By assuming that the base station before establishing connection with the UE does not know the direction in which the UE is present, it is not possible to use only a beam in an appropriate direction to transmit a synchronization signal/reference signal. Conceivable is a method in which the base station transmits a plurality of synchronization signals/reference signals having respective beams in different directions to recognize which beam the UE finds. However, when thin (narrow) beams are used for the sake of coverage, this requires transmission of many synchronization signals/reference signals, which may increase overhead and decrease frequency usage efficiency.

Figure 1B:
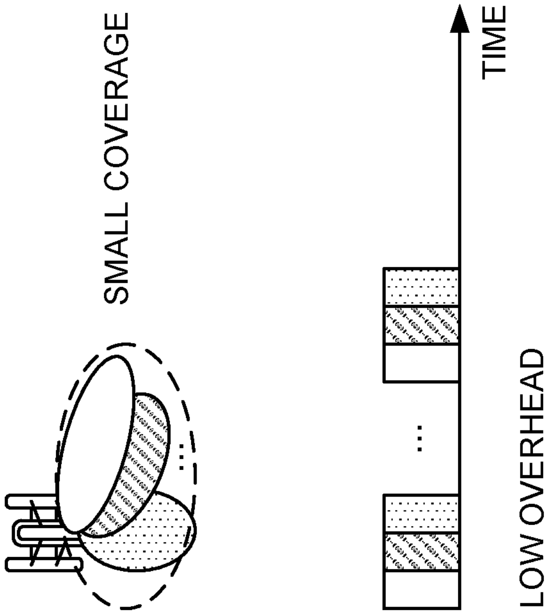

When thick (wide) beams are used to reduce the number of beams (synchronization signals/reference signals) to suppress overhead, this makes coverage small (FIG. 1B).

For future radio communication systems (for example, 6G), use of frequency bands such as millimeter waves and terahertz waves is considered to further advance. It is considered to provide communication services by using a number of thin beams and constructing the area/coverage of a cell.

It is considered to use existing FR2 to expand the area and use a frequency band higher than that for existing FR2. To enable these, improvement of beam management in addition to multi-TRP, reconfigurable intelligent surface (RIS), and the like is preferable.

The maximum number of synchronization signal blocks (SSBs) in current 5G NR is 64. Since it is necessary to cover the area (surface) of a cell by using 64 beams at maximum, it is difficult to use thin beams. To use a number of thin beams, beam management methods 1 and 2 below are conceivable.

{Beam Management Method 1}

Use more than 64 SSBs (the maximum number of SSBs exceeds 64). Simply increasing the number of SSBs may cause an increase in SSB overhead/initial access delay.

{Beam Management Method 2}

Use up to 64 SSBs (the maximum number of SSBs is 64). Reduce the area (surface) for one cell/sector to cover. Problems such as cell-sector interference and high speed/frequent inter-cell/inter-sector handover may occur.

Thus, the inventors of the present invention came up with the idea of a method of suppressing overhead/initial access delay.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, a sequence, a list, a set, a group, a cluster, a subset, and the like may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer parameter, an RRC information element (IE), an RRC message, and a configuration may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a MAC CE and an activation/deactivation command may be interchangeably interpreted.

In the present disclosure, a beam, a spatial domain filter, spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state or QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, a PL-RS, an antenna port, a panel group, and a beam group may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a CSI-RS, an NZP-CSI-RS, a periodic (P)-CSI-RS, a P-TRS, a semi-persistent (SP)-CSI-RS, an aperiodic (A)-CSI-RS, a TRS, a CSI-RS for tracking, a CSI-RS including TRS information (higher layer parameter trs-Info), an NZP CSI-RS resource in an NZP CSI-RS resource set including TRS information, an NZP-CSI-RS resource in an NZP-CSI-RS resource set constituted of a plurality of NZP-CSI-RS resources of the same antenna port, and a TRS resource may be interchangeably interpreted.

In the present disclosure, Msg.1, a PRACH, a random access preamble, a preamble, and a message may be interchangeably interpreted. In the present disclosure, Msg.2, a Msg.2 PDCCH, a random access response (RAR), a PDSCH including a RAR, and a message may be interchangeably interpreted. In the present disclosure, Msg.3, a PUSCH scheduled by RAR UL grant, and a message may be interchangeably interpreted. In the present disclosure, Msg.4, a Msg.4 PDCCH, a PDSCH including a UE contention resolution identity, and a message may be interchangeably interpreted.

Radio Communication Method

In the present disclosure, a failure may be interpreted as a failure(s) of a specific number of failure times. The specific number of failure times may be defined in a specification or may be notified/configured by broadcast/SIB/higher layer signaling or the like. The specific number of failure times may be one.

In the present disclosure, beam sweeping, repetition transmission with beam change, and a plurality of repetition transmissions using different beams may be interchangeably interpreted.

In the present disclosure, an SSB (first SSB/second SSB) not being detected/received and received power/reception quality of an SSB being equal to or lower than a threshold (or lower than the threshold) may be interchangeably interpreted. In the present disclosure, an SSB (first SSB/second SSB) being detected/received and received power/reception quality of an SSB being equal to or higher than a threshold (or higher than the threshold) may be interchangeably interpreted.

In the present disclosure, a wide beam, a thick beam, a first SSB, a first SSB index, a PSS/SSS, and a beam of a PSS/SSS may be interchangeably interpreted. In the present disclosure, a narrow beam, a thick beam, a second SSB, a second SSB index, a PBCH/PBCH-DMRS, and a beam of a PBCH/PBCH-DMRS may be interchangeably interpreted.

First Embodiment

Figure 2A:
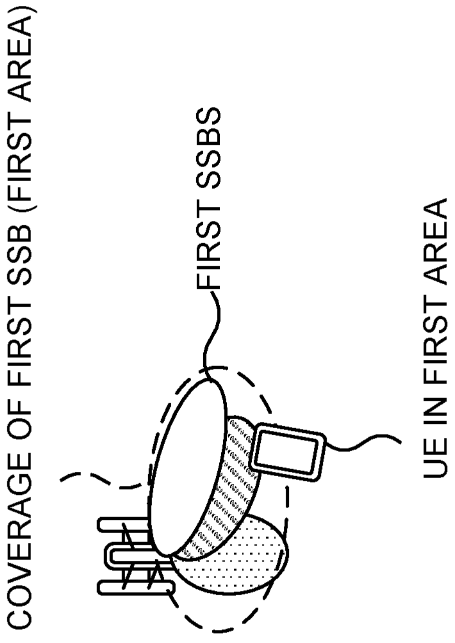
FIGS. 2A and 2B are diagrams to show examples of a first SSB and a second SSB.
Figure 2B:
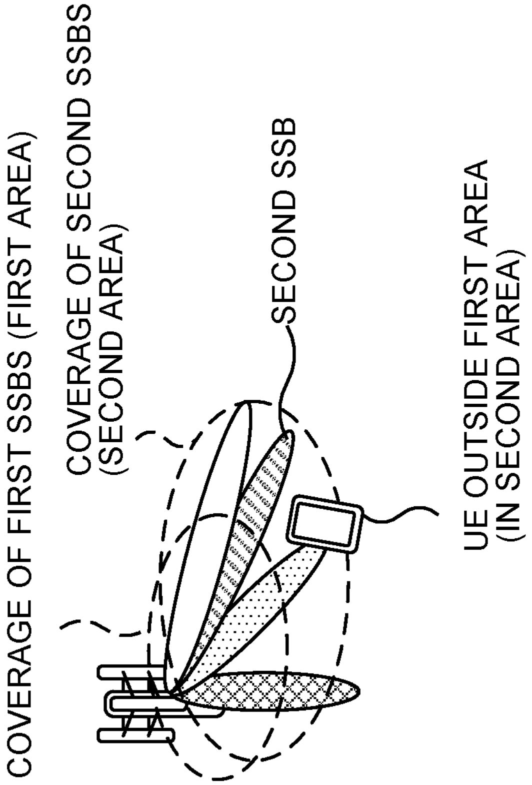

First SSBs (existing SSBs, 64 SSBs, a first number of SSBs) may cover a first area (FIG. 2A) while second SSBs (RSs different from existing SSBs, a second number of SSBs) may cover a second area (FIG. 2B). A first UE may receive a first SSB while a second UE may receive a second SSB. The first UE may be an existing (Rel-15/16 NR) UE.

The first SSBs (primary SSBs) may be existing (Rel-15/16 NR) SSBs. The first SSBs may be transmitted periodically. The first SSBs may be a first set of SSBs. The maximum number of the first SSBs may be 64.

The second SSBs (secondary SSBs) may cover an area which cannot be covered by the first SSBs. The second SSBs may be transmitted periodically or may be transmitted aperiodically. The second SSBs may be a second set of SSBs. The number of second SSBs (second number) may be different from or may be the same as the number of first SSBs (first number).

In the present disclosure, the second SSBs may be RSs other than SSBs, may be CSI-RSs, or may be tracking reference signals (TRSs, CSI-RSs for tracking).

Figure 3A:
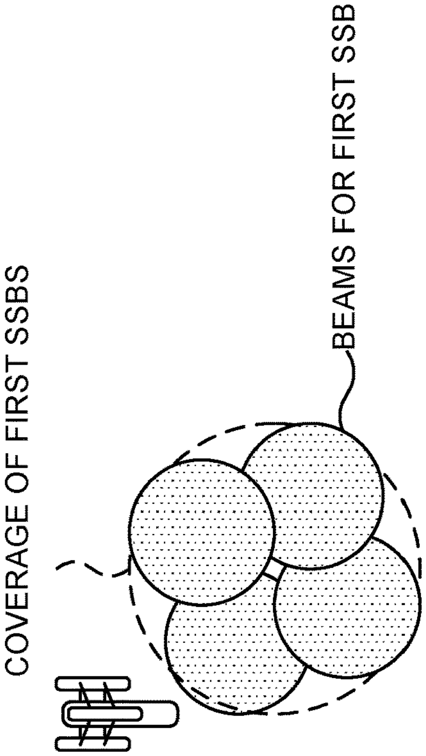
FIGS. 3A and 3B are diagrams to show examples of a first area and a second area.
Figure 3B:
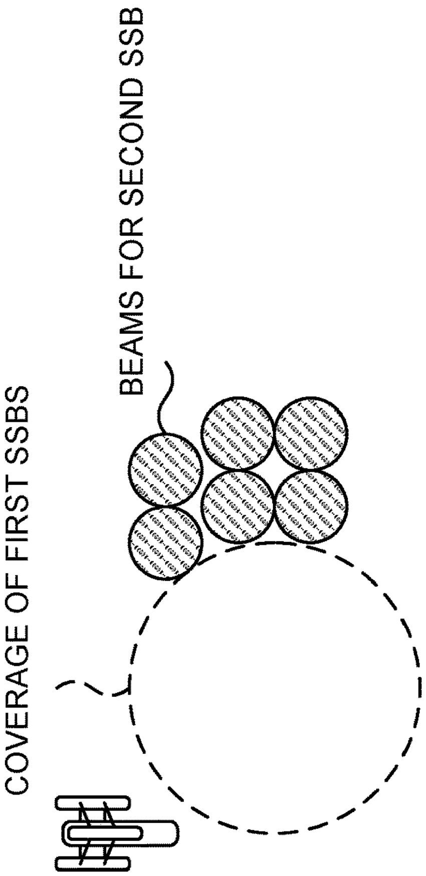

In 3D MIMO, each beam constructs an area (surface). The second area covered by the second SSBs (FIG. 3B) need not include part of or the entire of the first area covered by the first SSBs (FIG. 3A).

The beams used for transmission of the second SSBs may be thinner than the beams used for transmission of the first SSBs.

The first SSBs and the second SSBs may be transmitted in the same carrier/CC/BWP.

«Aspect 1-1»

The first SSBs may be transmitted periodically.

The second SSBs may be transmitted periodically. When the second SSBs are transmitted periodically, transmission periodicity of the second SSBs may be different from the transmission periodicity of the first SSBs. The transmission periodicity of the second SSBs may be longer than the transmission periodicity of the first SSBs.

Figure 4:
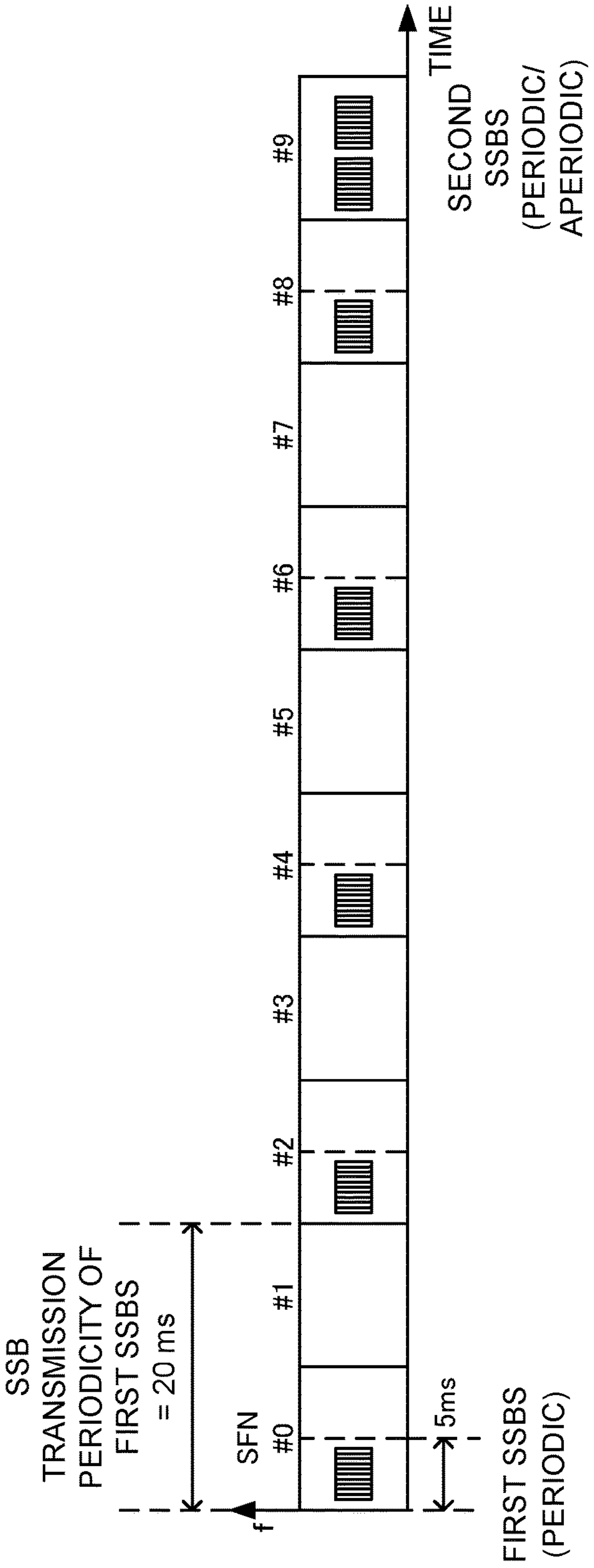
FIG. 4 is a diagram to show an example of Aspect 1-1.

The second SSBs may be transmitted aperiodically (FIG. 4).

A specific number of second SSBs may be transmitted per first SSB. For example, the specific number may be 4, 6, or 8 or any of other numbers. When 64 first SSBs are transmitted and the specific number is 6, 384 second SSBs may be transmitted.

Figure 5:
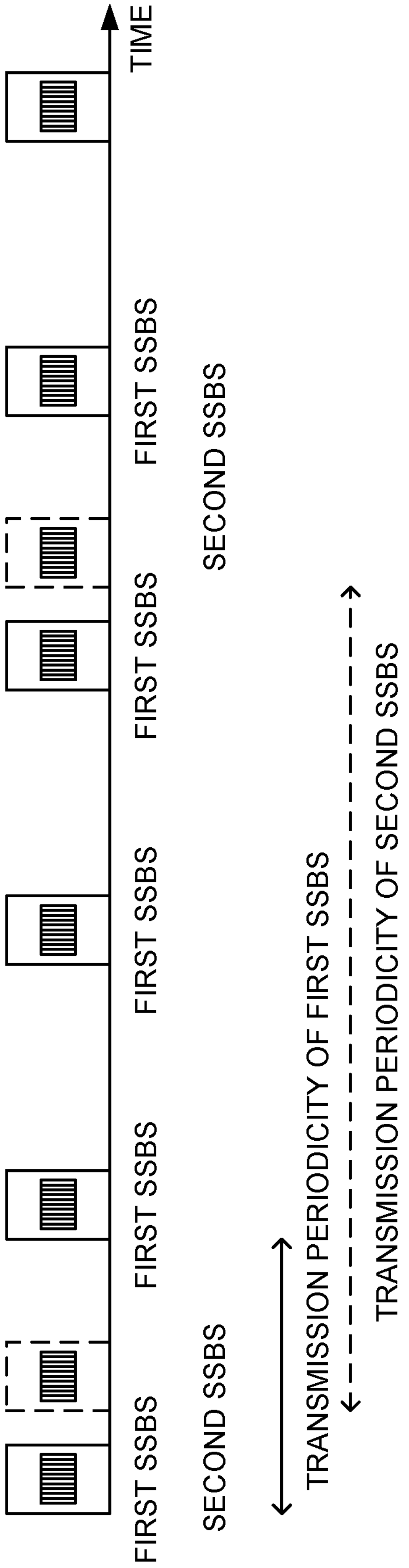
FIG. 5 is a diagram to show an example of SSB transmission periodicity.

When the first SSBs and the second SSBs are transmitted periodically and the transmission periodicity of the second SSBs is longer than the transmission periodicity of the first SSBs (FIG. 5), the UE may follow at least one of initial access operations 1 and 2 below.

{Initial Access Operation 1}

A UE that can detect a first SSB performs initial access by using the first SSB. Since the frequency of the first SSBs is higher than the frequency of the second SSBs, initial access delay of the UE using a first SSB is low.

{Initial Access Operation 2}

A UE that can detect a second SSB performs initial access by using the second SSB. Since the frequency of the second SSBs is lower than the frequency of the first SSBs, initial access delay of the UE using a second SSB is higher than the initial access delay of the UE using a first SSB. When a majority of UEs are assumed to be present within the first area, it is possible to suppress influence of initial access delay.

«Aspect 1-2»

The first SSBs need not be transmitted periodically. A specific number of (M) repetition transmissions of a first SSB may be performed in each specific time period. The specific time period may be one frame or longer or may be 20 ms or longer.

M repetition transmissions of a first SSB and N repetition transmissions of a second SSB may be performed in each specific time period. The specific time period may be specific periodicity×(M+N) or longer.

Figure 6:
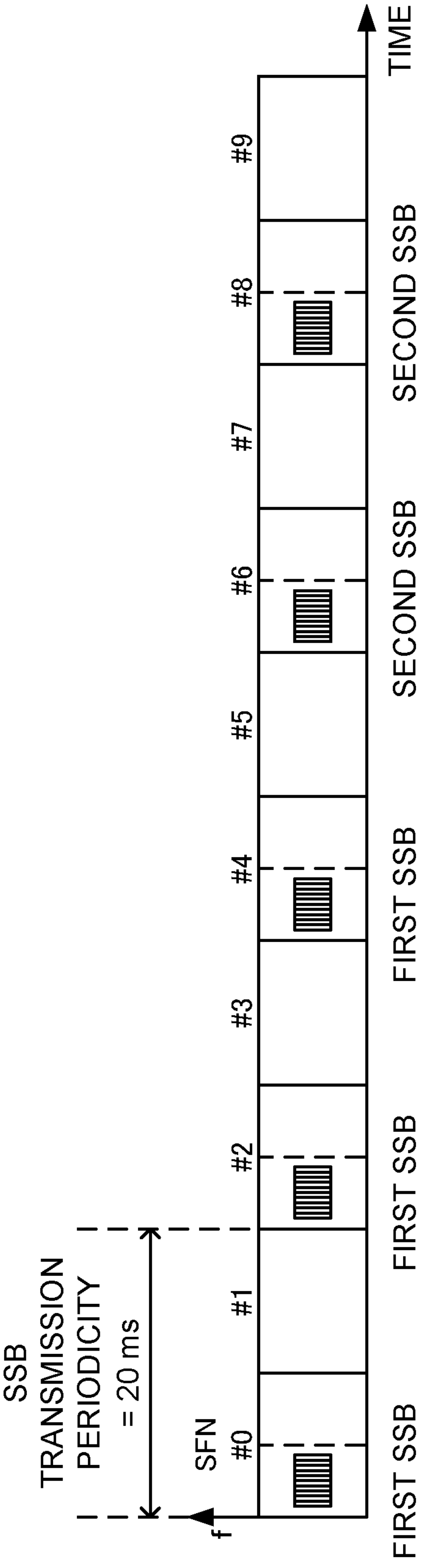
FIG. 6 is a diagram to show an example of Aspect 1-2.

Either of the first SSBs and the second SSBs may be transmitted in each cycle of specific periodicity. In the example in FIG. 6, SSB transmission occasions #0 to #4 are present in respective cycles of the specific periodicity (for example, every 20 ms). First SSBs are transmitted in each of SSB transmission occasions #0 to #2, and third SSBs are transmitted in each of SSB transmission occasions #3 and #4.

«Aspect 1-3»

When each first SSB is transmitted by using a first beam, each second SSB is transmitted by using a second beam, and the second beam is narrower than the first beam, the number of second SSBs may be larger than the number of first SSBs.

The first SSBs may be transmitted in each cycle of first periodicity, and the second SSBs may be transmitted in each cycle of second periodicity. The second periodicity may be different from the first periodicity. A plurality of first SSBs transmitted in one cycle of the first periodicity may be referred to as a first SSB set. A plurality of second SSBs transmitted in one cycle of the second periodicity may be referred to as a second SSB set.

{Aspect 1-3-1}

The number of second SSBs per cycle of the second periodicity (in the second SSB set) is equal to the number of first SSBs per cycle of the first periodicity (in the first SSB set).

All the second SSBs (second SSBs corresponding to all second SSB indices) may be transmitted over a plurality of cycles of the second periodicity (a plurality of second SSB sets). In other words, part of the second SSBs (a second SSB subset) may be transmitted in each cycle of second periodicity.

All the first SSBs (first SSBs corresponding to all first SSB indices) may be transmitted in each cycle of the first periodicity (each first SSB set).

The transmission duration (time length) of the second SSBs per cycle of the second periodicity may be different from the transmission duration (time length) of the first SSBs per cycle of the first periodicity.

Figure 7A:
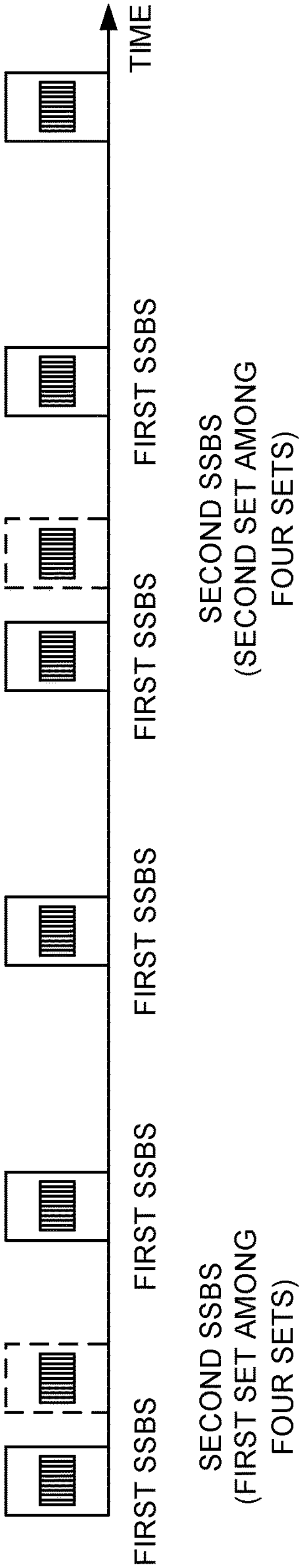
FIGS. 7A and 7B are diagrams to show examples of Aspect 1-3.

In the example in FIG. 7A, the number of first SSBs is 64, and the number of second SSBs is 256. 64 first SSBs are transmitted in each cycle of the first periodicity. 64 different second SSBs are transmitted in each cycle of the second periodicity to transmit 256 second SSBs over four cycles of the second periodicity.

{Aspect 1-3-2}

The number of second SSBs per cycle of the second periodicity (in the second SSB set) is different from the number of first SSBs per cycle of the first periodicity (in the first SSB set).

The transmission duration (time length) of the second SSBs of each cycle of the second periodicity may be different from the transmission duration (time length) of the first SSBs of each cycle of the first periodicity. The transmission duration (time length) of the second SSBs per cycle of the second periodicity may be longer than the transmission duration (time length) of the first SSBs per cycle of the first periodicity.

Figure 7B:
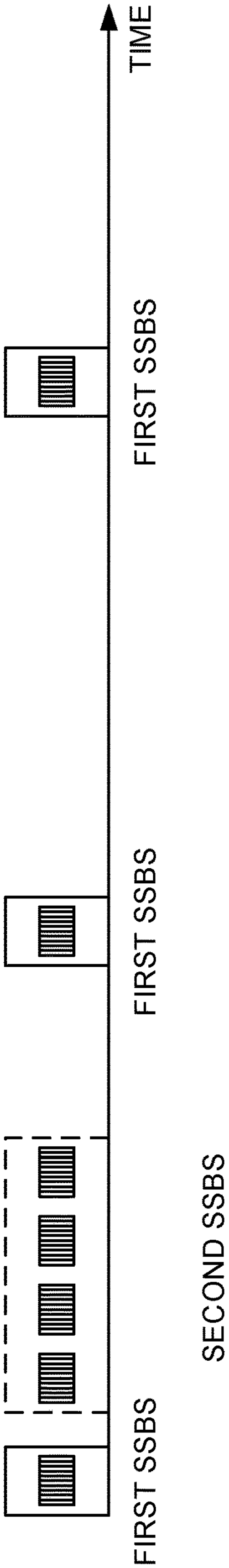

In the example in FIG. 7B, the number of first SSBs is 64, and the number of second SSBs is 256. 64 first SSBs are transmitted in each cycle of the first periodicity. 256 second SSBs are transmitted in each per cycle of the second periodicity.

{Aspect 1-3-3}

Subcarrier spacing of the second SSBs may be different from subcarrier spacing of the first SSBs. The number of second SSBs per second periodicity (in the second SSB set) may be equal to the number of first SSBs per first periodicity (in the first SSB set), and the transmission duration (time length) of the second SSBs per cycle of the second periodicity may be different from the transmission duration (time length) of the first SSBs per cycle of the first periodicity. The number of second SSBs per second periodicity (in the second SSB set) may be different from the number of first SSBs per first periodicity (in the first SSB set), and the transmission duration (time length) of the second SSBs per cycle of the second periodicity may be equal to the transmission duration (time length) of the first SSBs per cycle of the first periodicity.

Subcarrier spacing of the second SSBs may be equal to subcarrier spacing of the first SSBs. The number of second SSBs per second periodicity (in the second SSB set) may be different from the number of first SSBs per first periodicity (in the first SSB set), and the transmission duration (time length) of the second SSBs per cycle of the second periodicity may be different from the transmission duration (time length) of the first SSBs per cycle of the first periodicity.

{Aspect 1-3-4}

A plurality of aspects among Aspects 1-3-1 to 1-3-3 may be combined. For example, the transmission duration (time length) of the second SSBs per cycle of the second periodicity may be longer than the transmission duration (time length) of the first SSBs per cycle of the first periodicity, and all the second SSBs (second SSBs corresponding to all second SSB indices) may be transmitted over a plurality of cycles of the second periodicity (a plurality of second SSB sets).

«Aspect 1-4»

In existing NR, cell defined SSB information is notified by a system information block (SIB). Information of an additional SSB for measurement may be notified by a measurement object information element (measObject).

At least one of the SIB and a serving cell configuration (servingCellConfig) may include second SSB information/ configuration. At least one of the SIB and the serving cell configuration may include first SSB information/configuration.

The UE may use second SSB information configured/notified by at least one of the SIB and the serving cell configuration, to perform operation of reception/detection/measurement of second SSBs (after RRC connection is established/in an RRC_CONNECTED mode).

According to this embodiment, by second SSBs being transmitted in addition to first SSBs, it is possible to enhance coverage, suppress overhead, and the like.

Second Embodiment

«Aspect 2-1»

The UE may attempt to receive/detect a first SSB transmitted periodically/aperiodically. The UE that has successfully receive/detect a first SSB may perform initial access by using only the first SSB (without using any second SSB). The UE that has successfully receive/detect a first SSB may perform initial access by using the first SSB or may perform initial access by using a second SSB. For example, when the UE has failed in the initial access based on the first SSB, the UE may perform initial access by using the second SSB.

When the UE cannot detect any first SSB (for example, when the UE cannot detect any first SSB within a detection time period), the UE may attempt to receive/detect a second SSB. The UE that cannot receive/detect any first SSB may perform initial access by using only a second SSB (without using any first SSB).

At least one piece of resource information among frequency information 1, frequency information 2, time information 1, and time information 2 related to second SSBs below may be defined in a specification, may be broadcast, or may be configured (by higher layer signaling).

{Frequency Information 1}

Frequency information of the second SSBs may be similar to frequency information of the first SSBs.

The frequency information of the second SSB may include a frequency (synchronization raster, sync raster) at which the UE searches for a PSS/SSS at the time of initial access. The frequency information of the second SSBs may be defined in a specification for each frequency range (each of FR1, FR2, and the like).

The frequency at which the UE searches for a PSS/SSS at a time point other than the time of initial access may be configured/indicated by a network.

{Frequency Information 2}

The frequency information of the second SSBs may be different from the frequency information of the first SSBs. The frequency information of the second SSBs may be configured/indicated by the network.

The frequency information of the second SSBs may include a relationship between the frequency of the first SSBs and the frequency of the second SSB (relative positions, a frequency offset from a detection RB of a first SSB, or the like).

{Time Information 1}

Time information of the second SSBs may be similar to time information of the first SSBs.

The time information of the second SSBs may include periodicity (for example, one of a plurality of values including at least one of {5, 10, 20, 40, 80, 160} ms). The UE may blind-detect the periodicity.

{Time Information 2}

The time information of the second SSBs may be different from the time information of the first SSBs. The time information of the second SSB may be configured/indicated by the network.

The time information of the second SSBs may include a relationship between the time of the first SSBs and the time of the second SSBs (relative positions, a time offset from a detection symbol of a first SSB, a relationship between the periodicity of the first SSBs and the periodicity of the second SSBs, the periodicity of the second SSBs being the same as the periodicity of the first SSBs, or the like).

When the UE detects the first SSB and has a problem in subsequent operation (for example, Msg.3 transmission), the UE may detect a second SSB and perform the subsequent operation, based on the second SSB.

«Aspect 2-2»

The UE may use the same rule for deriving SSB indices for both the first SSBs and the second SSBs. The UE can derive frame timing without distinguishing between the first SSBs and the second SSBs. When the first SSBs and the second SSBs are transmitted in the same half frame, the UE may use a method (for example, DMRS sequences, fields/bits in PBCHs) for distinguishing the SSB indices of all the first SSBs and the second SSBs.

The UE may use different rules for deriving SSB indices for the first SSBs and the second SSBs. The UE can distinguish between the first SSBs and the second SSBs. It is possible to suppress the numbers of SSB indices of the first SSBs and the second SSBs. The UE may use different frame timing derivation methods for the first SSBs and the second SSBs.

According to this embodiment, the UE can appropriately receive/detect a first SSB/second SSB.

Third Embodiment

Figure 8A:
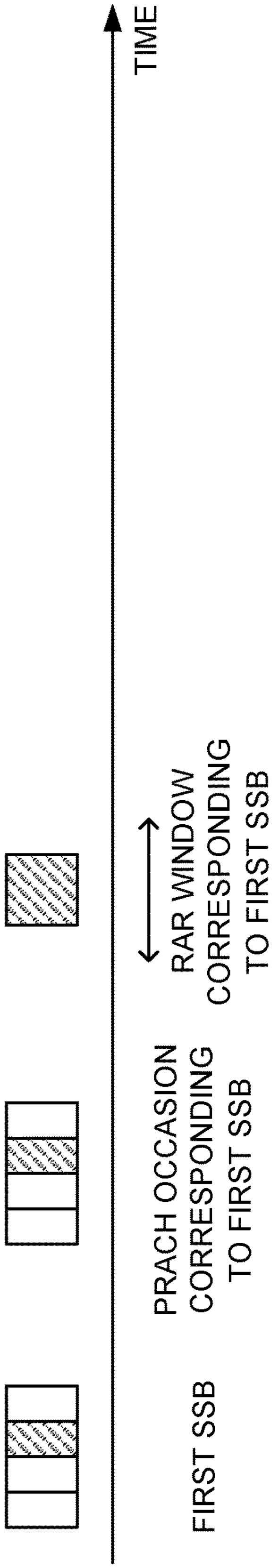
FIGS. 8A and 8B are diagrams to show examples of a third embodiment.

A UE that has detected a first SSB may transmit a PRACH (Msg.1) in a PRACH occasion (RACH occasion) corresponding to the detected first SSB (FIG. 8A).

Figure 8B:
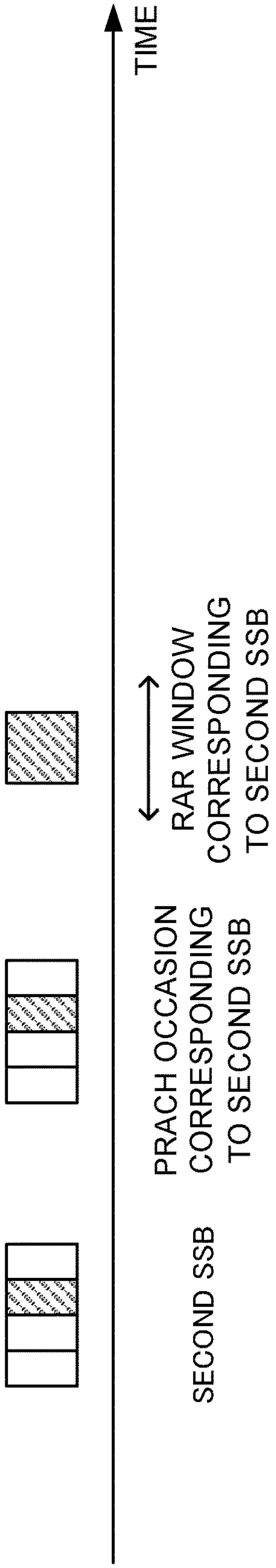

A UE that has not detected any first SSB (for example, the UE that has failed to detect any first SSB within the detection time period) may detect a second SSB and transmit a PRACH in a PRACH occasion corresponding to the detected second SSB (FIG. 8B). Correspondences between a second SSB and a PRACH occasion may be defined in a specification, may be broadcast, or may be configured by higher layer signaling.

The UE that has detected a first SSB may detect a second SSB and transmit a PRACH in a PRACH occasion corresponding to the detected second SSB.

The UE that has transmitted the PRACH in the PRACH occasion corresponding to the second SSB may receive a random access response (RAR) in the RAR window corresponding to the second SSB (FIG. 8B). The RAR window corresponding to the second SSB may be defined in a specification, may be broadcast, or may be configured by higher layer signaling.

According to this embodiment, the UE can appropriately perform a random access procedure, based on reception of a first SSB or a second SSB.

Fourth Embodiment

A UE in the coverage area (first area) of the first SSBs may follow at least one of SSB related operations 1 and 2 below.

{SSB Related Operation 1}

The UE that can detect a first SSB need not detect the second SSB and need not transmit a PRACH in a PRACH occasion corresponding to the second SSB. Since a number of PRACH occasions/resources corresponding to the second SSBs need not be prepared (especially in contention-based random access (CBRA)), PRACH occasions/resources can be distributed.

{SSB Related Operation 2}

In a network that transmits the second SSBs, the UE that can detect a first SSB may detect a second SSB and transmit a PRACH in a PRACH occasion corresponding to the second SSB. The accuracy of beam (QCL) information obtained from the second SSB is higher (more exact) than the accuracy of beam information obtained from a first SSB. The UE can detect, by using the beam information of the second SSB, a DMRS at higher accuracy than that of a case of using the beam information of the first SSB, which can improve PDSCH/PDCCH reception characteristics and PUSCH/PUCCH transmission characteristics.

According to this embodiment, the performance of the UEs in the coverage of the first SSBs can be improved.

Fifth Embodiment

This embodiment relates to QCL relationships using a first SSB and a second SSB.

The QCL relationships using a first SSB and a second SSB may be defined in a specification, or the UE may be notified of the QCL relationships. QCL types/QCL chains representing inclusion relationships of QCL may be defined in a specification, or the UE may be notified of the QCL types/QCL chains. One or more second SSBs may be associated with (included in) one first SSB.

Figure 9:
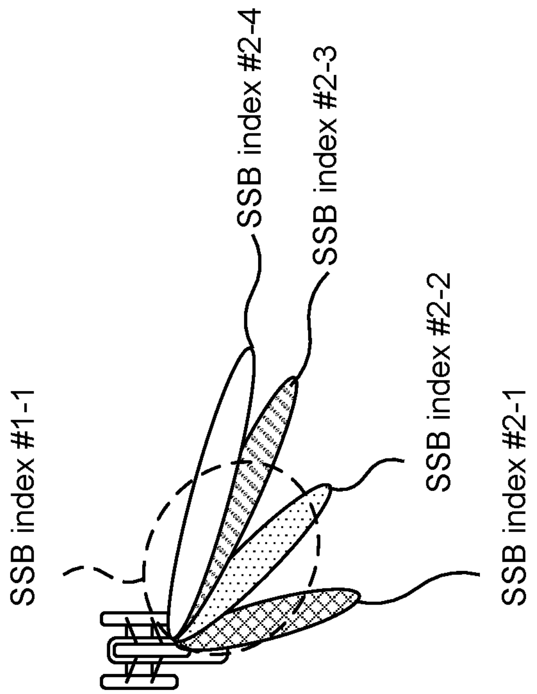
FIG. 9 is a diagram to show an example of a fifth embodiment.
Figure 10:
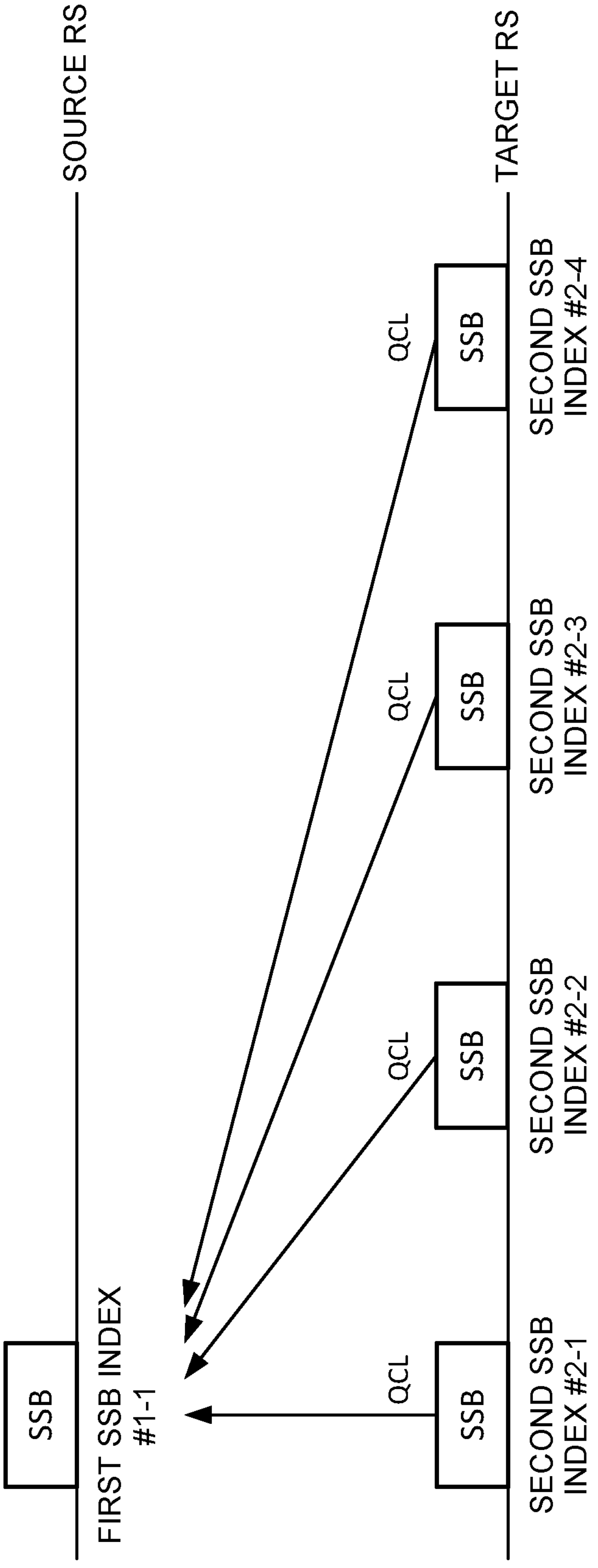
FIG. 10 is a diagram to show an example of QCL relationships.

In the example in FIG. 9, the first SSB (wide beam) with first SSB index #1-1 and the second SSBs (narrow beams) with second SSB indices #2-1 to #2-4 are transmitted. As shown in FIG. 10, QCL relationships of second SSB indices #2-1 to #2-4 indicate (refer to) first SSB index #1-1. When a QCL relationship is type D, the UE can use a receive beam (spatial reception parameter, spatial domain reception filter) determined based on reception of first SSB index #1-1, for reception of second SSB indices #2-1 to #2-4. When a QCL relationship is type A, the UE can use a QCL parameter {Doppler shift, Doppler spread, average delay, delay spread} determined based on reception of first SSB index #1-1, for reception of second SSB indices #2-1 to #2-4.

It may be expressed that a reference destination (source) of a QCL relationship includes a reference source (target) of the QCL relationship. The UE may determine a reference destination (source) of the QCL relationship from the reference source (target), based on the QCL relationship. For example, the UE may determine, based on the detected second SSB, the first SSB associated with the second SSB and use the first SSB for QCL (beam) of a channel/RS. The UE may receive not only a narrow beam but also a plurality of second SSBs associated with the same first SSB.

When the QCL source of DMRS #1 of given PDSCH/PDCCH #1 is SSB #1-1 and the QCL source of DMRS #2 of another PDSCH/PDCCH #2 is SSB #2-1, whether the UE (especially in FR2) can receive PDSCH/PDCCH #1 and PDSCH/PDCCH #2 simultaneously is a problem.

Figure 11A:
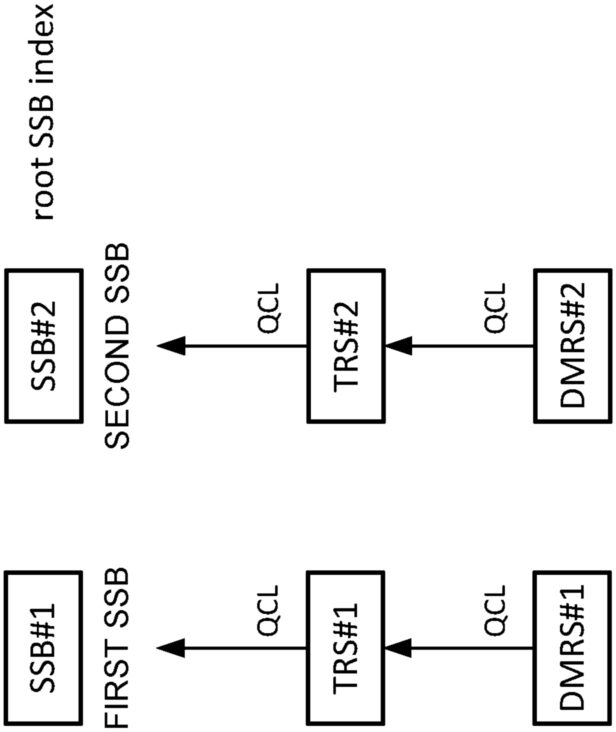
FIGS. 11A and 11B are diagrams to show an example of QCL relationships of DMRSs.

In the example in FIG. 11A, the QCL relationship of DMRS #1 refers to TRS #1, and the QCL relationship of TRS #1 refers to SSB #1-1. SSB #1-1, which is the final reference destination of the QCL relationship of DMRS #1, may be referred to as a root SSB of DMRS #1, a root QCL source, and the like. The QCL relationship of DMRS #2 refers to TRS #2, and the QCL relationship of TRS #2 refers to SSB #2-1. SSB #2-1, which is the final reference destination of the QCL relationship of DMRS #2, may be referred to as a root SSB of DMRS #2, a root QCL source, and the like.

It may be defined that the UE assumes that DMRS #1 and DMRS #2 are not in a QCL relationship when SSB indices of the root SSBs of DMRS #1 and DMRS #2 are different from each other. In this case, when PDSCH/PDCCH #1 and PDSCH/PDCCH #2 are transmitted in the same symbol in FR2, the UE need not be able to receive both.

Figure 11B:
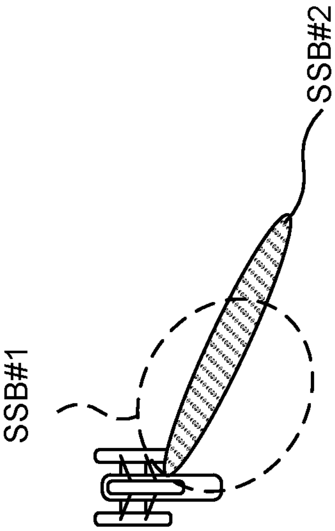

The UE may assume that DMRS #1 and DMRS #2 are in a QCL relationship when the QCL source of DMRS #1 and the QCL source of DMRS #2 are in a QCL relationship even when SSB indices of the root SSBs of DMRS #1 and DMRS #2 are different from each other. This case may be a case where the beam of the QCL source of DMRS #1 (SSB #1, first SSB) includes the beam of the QCL source of DMRS #2 (SSB #2, second SSB) as in FIG. 11B. This case may be expressed as DMRS #1 and DMRS #2 are in a QCL relationship with an inclusion relationship. In this case, when PDSCH/PDCCH #1 and PDSCH/PDCCH #2 are transmitted in the same symbol in FR2, the UE may be able to receive both.

According to this embodiment, the UE can appropriately recognize a QCL relationship of a first SSB/second SSB.

Sixth Embodiment

This embodiment relates to a QCL relationship between a first SSB/second SSB and a DMRS of a PDSCH/PDCCH.

When the UE transmits a PRACH in a PRACH occasion corresponding to a first SSB/second SSB, the UE may assume that a DMRS of a PDSCH/PDCCH is in a QCL relationship with the first SSB/second SSB corresponding to the PRACH occasion used for the transmission.

A TCI state may be configured by higher layer signaling, and the QCL relationship of the DMRS of the PDSCH/PDCCH may be configured/notified by the TCI state. As the QCL source of the TCI state of the DMRS, the first SSB/second SSB may be directly referred to/configured. Another TRS/CSI-RS may be referred to/configured as the QCL source of the TCI state of the DMRS, and the first SSB/second SSB may be referred to/configured as the QCL source of this TRS/CSI-RS.

According to this embodiment, the UE can appropriately use a first SSB/second SSB for a QCL relationship of a DMRS of a PDSCH/PDCCH.

Seventh Embodiment

It is conceivable that a base station transmits a second SSB only when needed. In this case, it is preferable that the base station recognize whether a UE in need of a second SSB is present among UEs served by the base station (in the coverage/serving area of the base station). However, it is difficult for the base station to judge whether a UE can perform initial access only by using a first SSB or the UE is in need of a second SSB.

This embodiment relates to second SSB transmission triggered by a UE.

«Aspect 7-1»

Figure 12A:
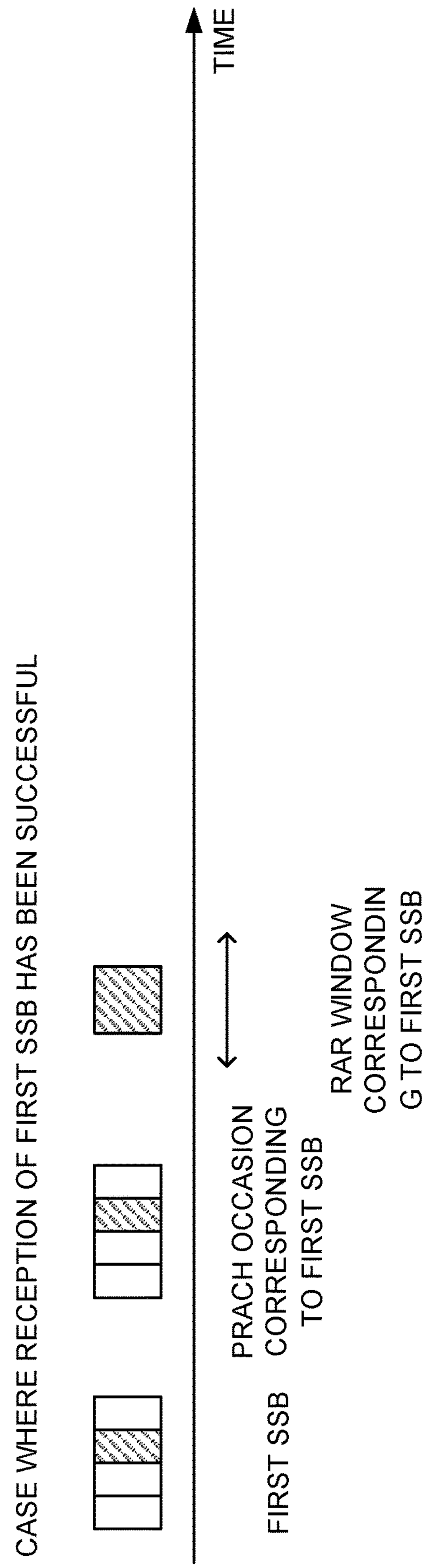
FIGS. 12A and 12B are diagrams to show examples of Aspect 7-1.

When the UE has successfully detected a first SSB, the UE may transmit a PRACH in a PRACH occasion corresponding to the first SSB and receive a RAR in a RAR window (FIG. 12A).

Figure 12B:
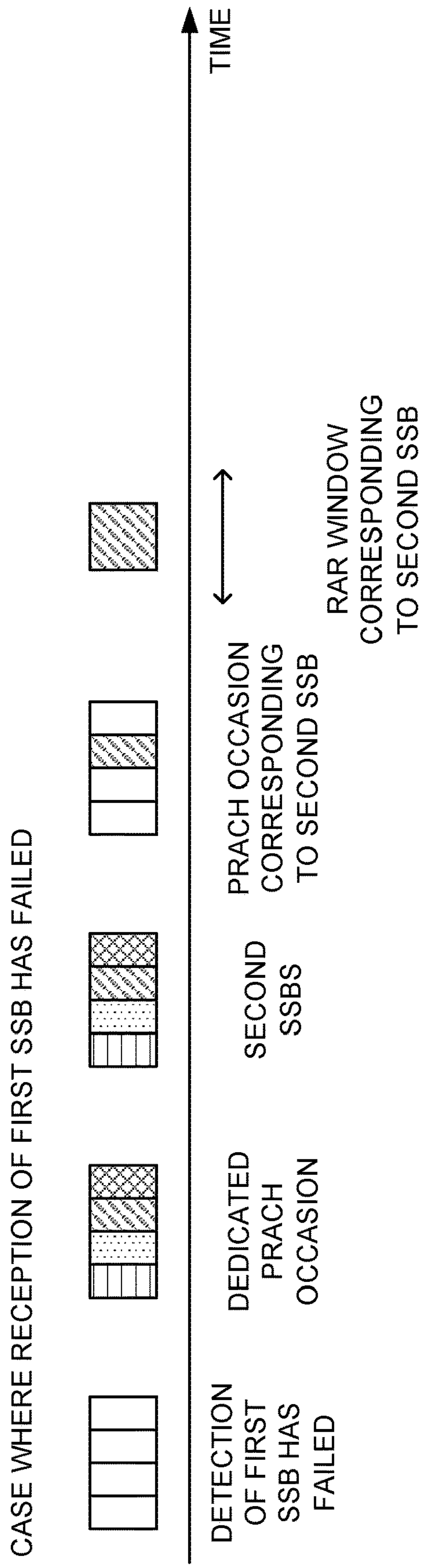

If the UE has failed to detect (failed to find) a first SSB (when correlation detection has failed, when received power is equal to or lower than a threshold), the UE may transmit a PRACH dedicated to detection failure notification in one or more PRACH occasions dedicated to detection failure notification (FIG. 12B). The dedicated PRACH occasion may be defined in a specification or may be configured by higher layer signaling.

The base station that has received the dedicated PRACH may transmit a plurality of second SSBs (while performing beam sweeping). The UE may measure received powers of the plurality of second SSBs (while performing beam sweeping), and transmit a PRACH in a PRACH occasion corresponding to the second SSB with the highest received power.

The UE may transmit a plurality of dedicated PRACHs in a plurality of respective dedicated PRACH occasions. The UE may use different transmit beams for transmission of the plurality of dedicated PRACHs (perform beam sweeping with dedicated PRACHs).

The base station may attempt reception of the plurality of PRACHs in a plurality of respective dedicated PRACH occasions. The base station may use different transmit beams (narrow beams) (perform beam sweeping) for the reception of the plurality of dedicated PRACHs. When a dedicated PRACH is detected, the base station may transmit a second SSB in a direction of the detected dedicated PRACH (by using a beam corresponding to the detected dedicated PRACH).

The UE that has detected a first SSB and transmitted a dedicated PRACH may search for second SSBs (measure received powers of a plurality of second SSBs) in a specific period after the transmission.

The base station may select a second SSB corresponding to the detected dedicated PRACH occasion and transmit only the selected second SSB.

«Aspect 7-2»

Figure 13A:
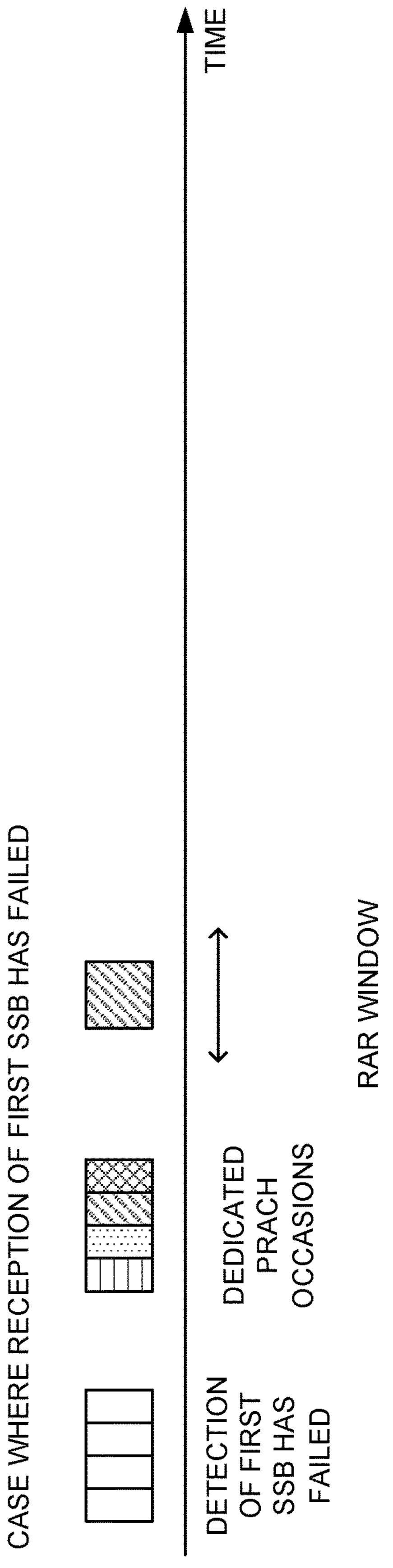
FIGS. 13A and 13B are diagrams to show examples of Aspect 7-2.

It may be assumed that, after the UE transmits a dedicated PRACH(s) in one or more PRACH occasions dedicated to first SSB detection failure notification, the UE receives a RAR by using a resource (beam/RAR window) corresponding to the beam used for the dedicated PRACH (FIG. 13A). This eliminates the need for transmission of a second SSB, which can reduce overhead.

The UE may use different receive beams (while sweeping with receive beams) in a plurality of RAR windows (as in FIG. 20A in Aspect 8-1 to be described later) to receive a RAR. In this case, it may be assumed that the UE receives a RAR by using any one of one or more beams used for the dedicated PRACH.

Figure 13B:
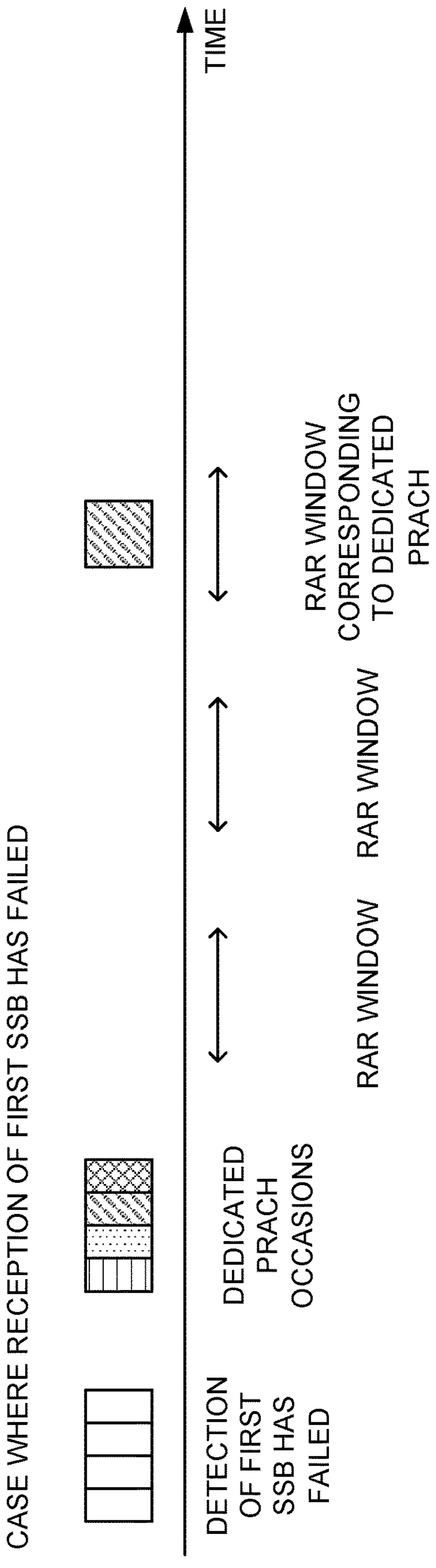

The plurality of RAR windows may be defined in a specification or may be configured by higher layer signaling. The plurality of RAR windows may correspond to a plurality of respective dedicated PRACH occasions/dedicated PRACHs (FIG. 13B). The UE may use the receive beam corresponding to the transmit beam of the transmitted dedicated PRACH to attempt reception/measurement/detection in a RAR window corresponding to the dedicated PRACH.

«Aspect 7-3»

Aspects 7-1 and 7-2 may be combined.

Figure 14A:
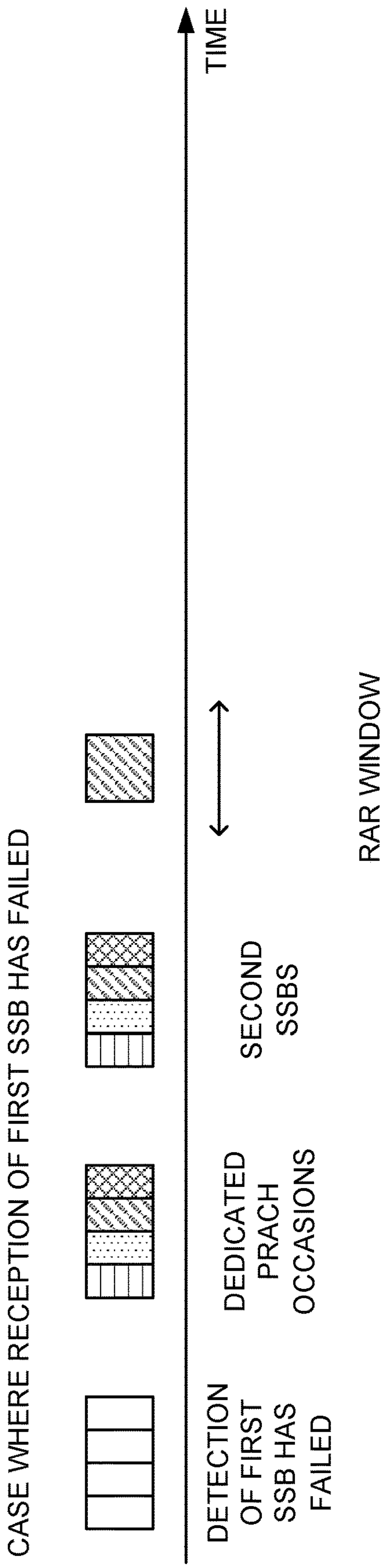
FIGS. 14A and 14B are diagrams to show examples of Aspect 7-3.

After the UE transmits a dedicated PRACH in one or more dedicated PRACH occasions, the UE may measure a plurality of second SSBs and thereafter receive a RAR (FIG. 14A). In this case, according to Aspect 8-1 to be described later, repetition transmission (beam sweeping) of the RAR may be performed.

Figure 14B:
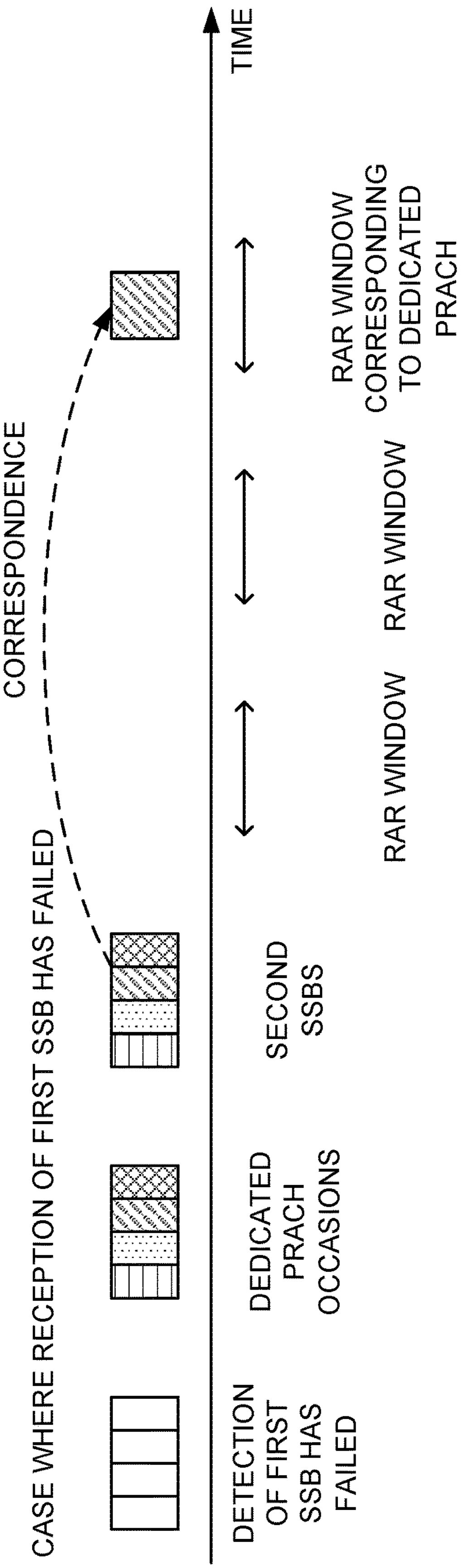

After the UE transmits a dedicated PRACH in one or more dedicated PRACH occasions, the UE may select one of a plurality of RAR windows, based on reception/measurement/detection of a plurality of second SSBs, and receive a RAR in the selected RAR window. The selected RAR window may correspond to the second SSB with the highest received power among the received powers of the plurality of second SSBs. One receive beam of the plurality of second SSBs may correspond to the receive beam of the RAR (FIG. 14B).

Figure 15A:
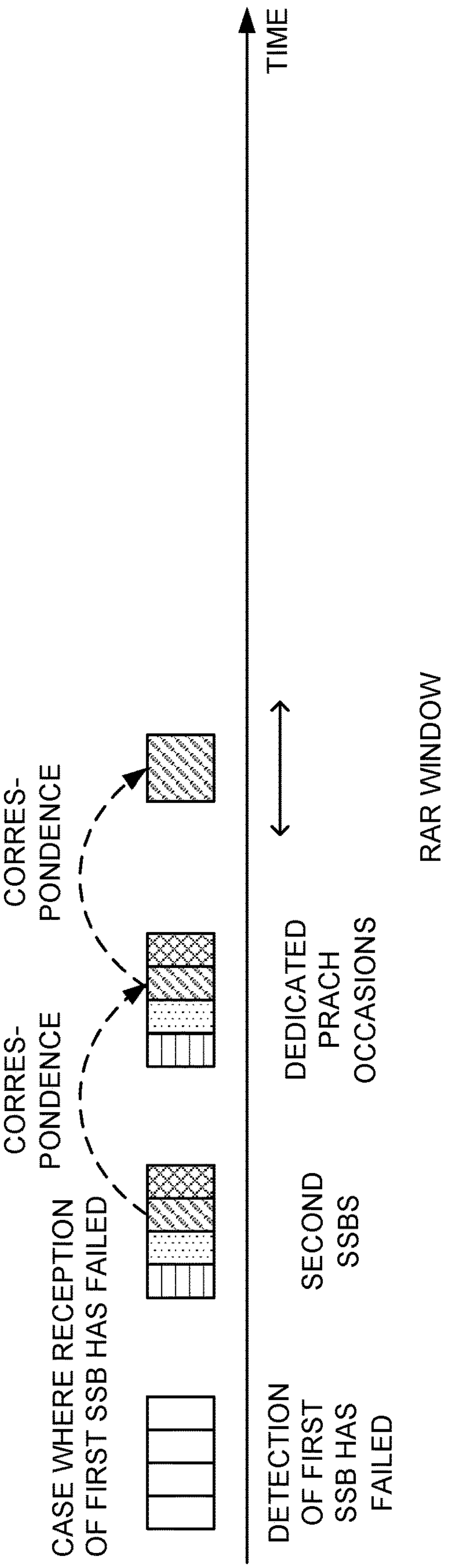
FIGS. 15A and 15B are diagrams to show examples of a first variation of Aspect 7-3.

As shown in FIG. 15A, the order in the time domain may be a plurality of first SSBs, a plurality of second SSBs, a plurality of dedicated PRACH occasions, and a RAR/RAR window. The beam of one second SSB, the beam of one dedicated PRACH occasion/dedicated PRACH, and the beam of one RAR beam may correspond.

Figure 15B:
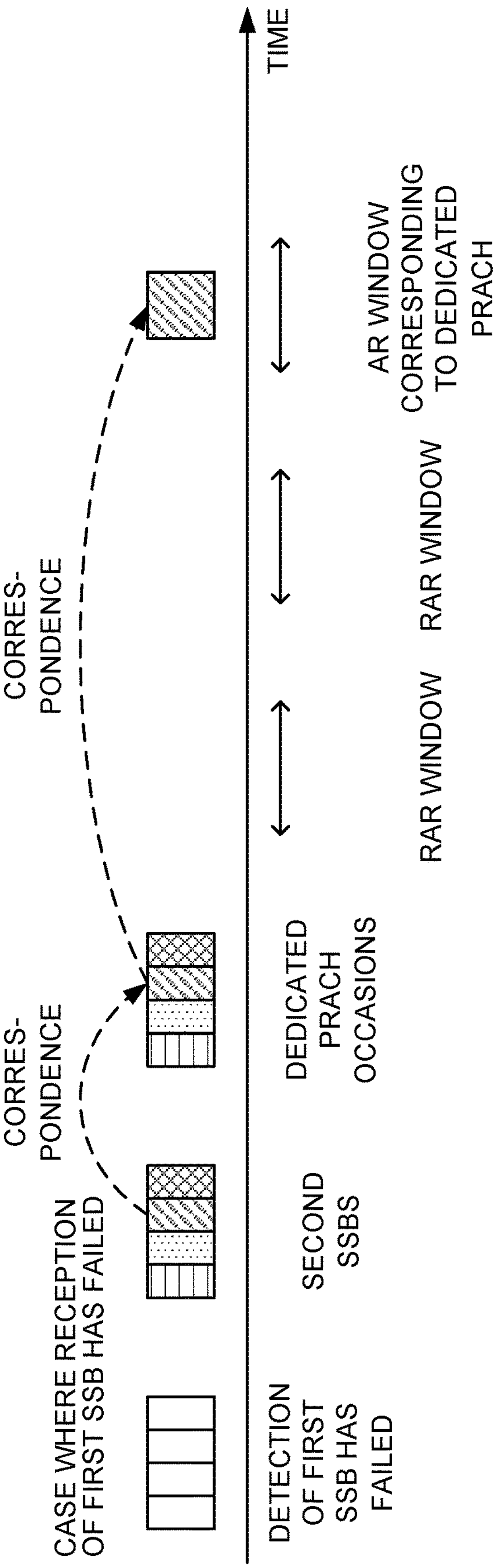

As shown in FIG. 15B, the order in the time domain may be a plurality of first SSBs, a plurality of second SSBs, a plurality of dedicated PRACH occasions, and a plurality of RAR windows. The beam of one second SSB, the beam/occasion of a dedicated PRACH, and the beam/window of a RAR beam may correspond.

Figure 16A:
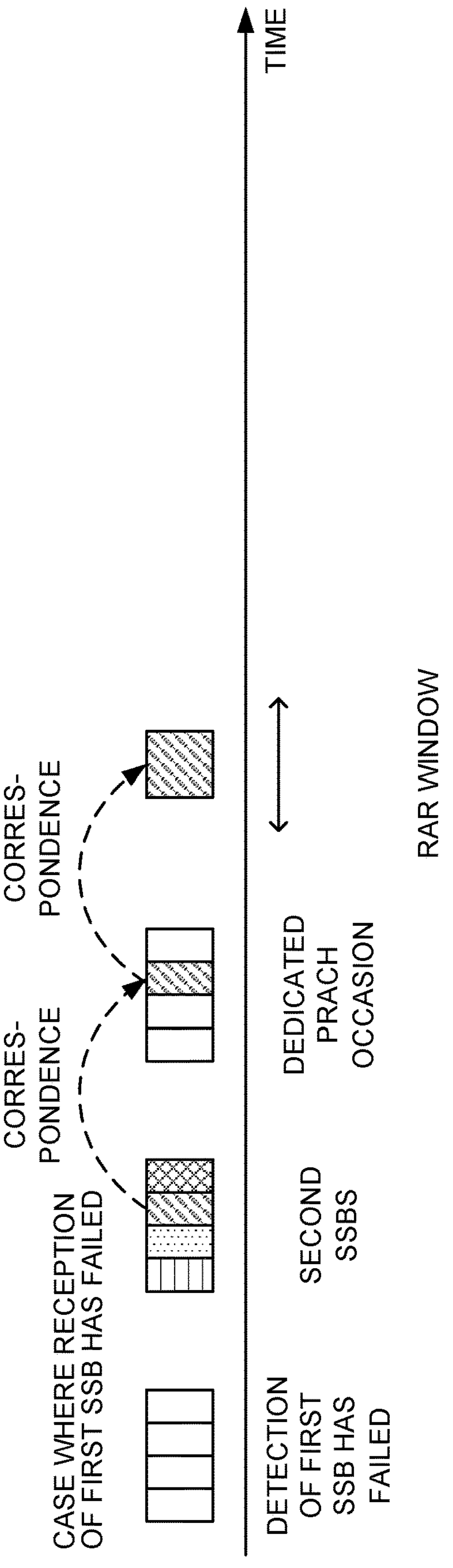
FIGS. 16A and 16B are diagrams to show examples of a second variation of Aspect 7-3.

As shown in FIG. 16A, the UE may measure a plurality of second SSBs, select one second SSB, based on the result of reception/detection/measurement of the plurality of second SSBs, select a dedicated PRACH occasion corresponding to the selected second SSB from the plurality of dedicated PRACH occasions, and transmit a dedicated PRACH in the selected dedicated PRACH occasion. Here, the selected second SSB may be the second SSB with the highest received power among the received powers of the plurality of second SSBs. The beam of one second SSB, the beam of the dedicated PRACH/dedicated PRACH occasion, and the beam of a RAR/RAR window may correspond.

Figure 16B:
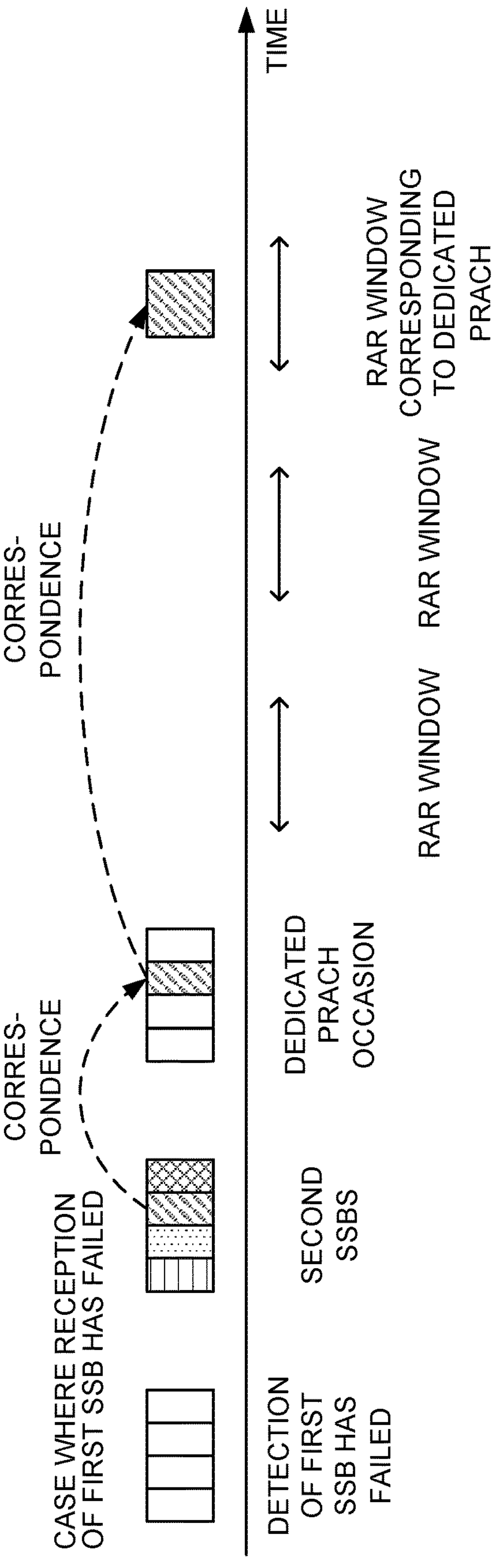

As shown in FIG. 16B, the order in the time domain may be a plurality of first SSBs, a plurality of second SSBs, a plurality of dedicated PRACH occasions, and a plurality of RAR windows. The beam of one second SSB, the beam/occasion of a dedicated PRACH, and the beam/window of a RAR beam may correspond.

Any of Aspects 7-1 to 7-3 may be applied to at least one of initial access, operation for searching for SCells in different frequencies (different frequency bands), UL synchronization, RRC reconfiguration, and recovery from RRC idle. A PRACH occasion dedicated to first SSB detection failure notification may be configured by an RRC IE.

A first SSB, a PRACH occasion corresponding to the first SSB, and a RAR window corresponding to the first SSB may be in the same BWP/CC or may be in different BWPs/CCs.

A first SSB, a second SSB, a PRACH occasion corresponding to the second SSB, a RAR window corresponding to the second SSB, and a PRACH occasion dedicated to first SSB detection failure notification may be in the same BWP/CC or may be in different BWPs/CCs.

According to this embodiment, it is possible to suppress overhead of a second SSB.

Eighth Embodiment

Figure 17:
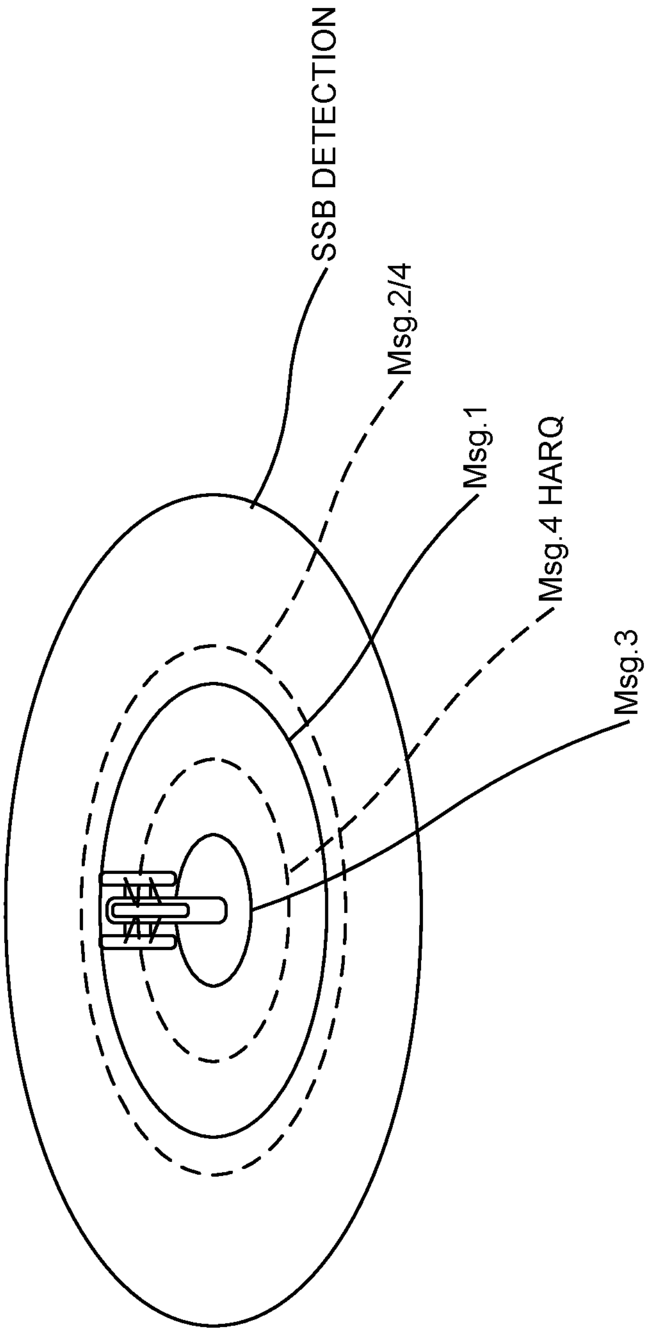
FIG. 17 is a diagram to show an example of coverage.

As shown in the example in FIG. 17, it may be assumed that the coverage of Msg.3 (Msg.3 PUSCH, PUSCH scheduled by RAR UL grant) is the smallest among those of channels/signals in initial access. Since transmission power in UL is lower than transmission power in DL and Msg.3 has a larger number of information bits than that of a PRACH/Msg.4 (PDSCH including a UE contention resolution identity) HARQ-ACK, Msg.3 has a small coverage.

It is conceivable that initial Msg.3 transmissions from many UEs are received correctly while Msg.3 from UEs outside the Msg.3 coverage result in being error. An improvement method for a UE outside the Msg.3 coverage will be described below.

This embodiment may be applied to a radio communication system in which no second SSB is transmitted.

«Aspect 8-1»

A UE that has failed in initial Msg.3 transmission may transmit a plurality of repetitions for Msg.3 retransmission. Repetitions may be inter-slot repetitions or may be intra-slot repetitions.

Only a UE configured/indicated by broadcast/higher layer signaling/Msg.2 (RAR UL grant)/Msg.3 retransmission scheduling may transmit the plurality of repetitions of Msg.3 retransmission.

A UE that has failed in a specific number of Msg.3 transmissions (initial transmission/retransmission) may transmit a plurality of repetitions of Msg.3 retransmission.

A beam used for Msg.3 retransmission (repetition) may be equal to a beam used for initial transmission.

A beam used for Msg.3 retransmission (repetition) may be different from a beam used for initial transmission. For example, different transmission beams may be used for a plurality of respective repetitions (beam sweeping may be used).

Figure 18A:
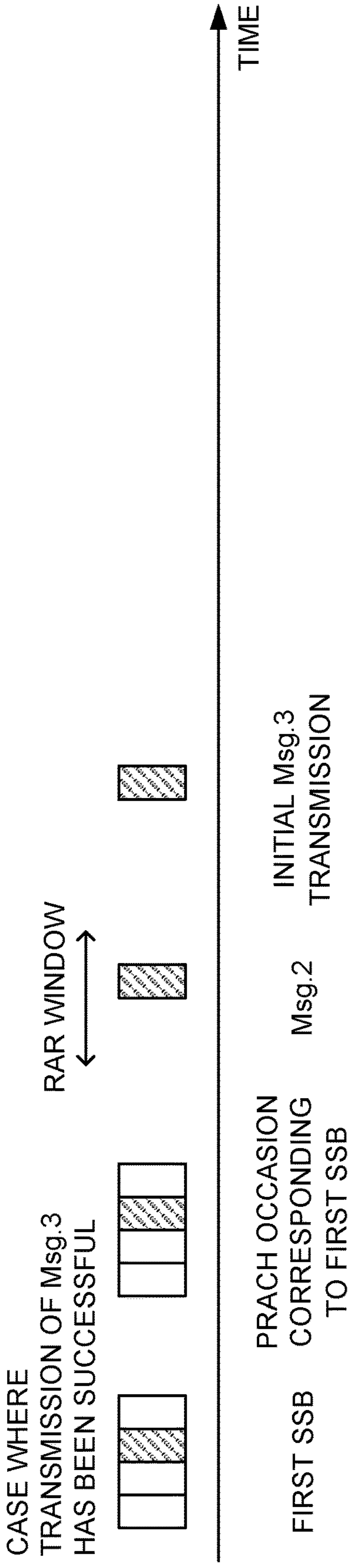
FIGS. 18A and 18B are diagrams to show examples of Aspect 8-1.

The example in FIG. 18A shows a case where reception of a first SSB, transmission of a PRACH in a PRACH occasion corresponding to the first SSB, reception of Msg.2 (RAR), and initial Msg.3 transmission have been successful.

Figure 18B:
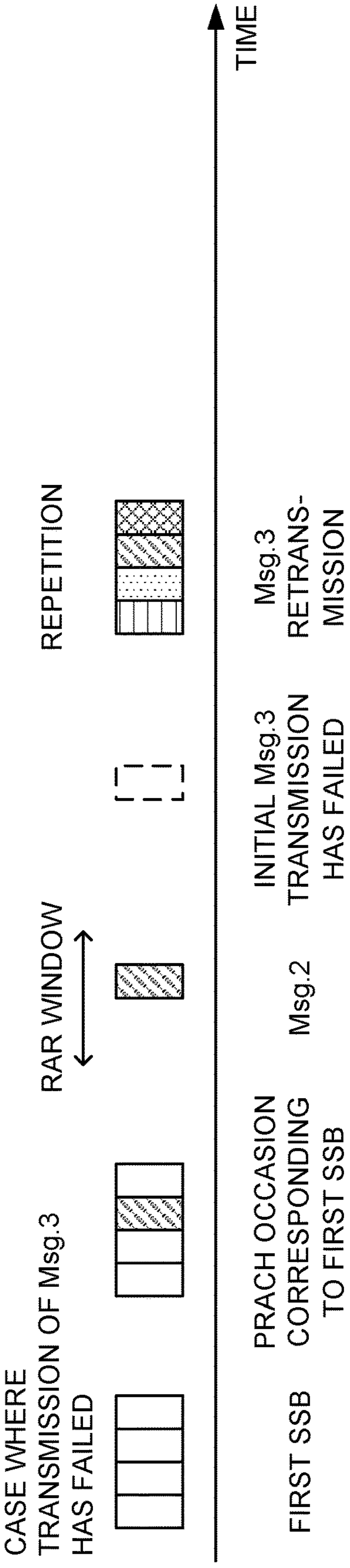

In the example in FIG. 18B, when the UE has failed initial Msg.3 transmission, the UE transmits repetitions of Msg.3 retransmission.

When the UE has failed in initial Msg.3 transmission, the UE may receive DCI for scheduling Msg.3 retransmission. When the UE does not receive Msg.4 within a given time period after the initial Msg.3 transmission, the UE may judge that the initial Msg.3 transmission has failed and transmit Msg.3 retransmission without being scheduled.

Figure 19:
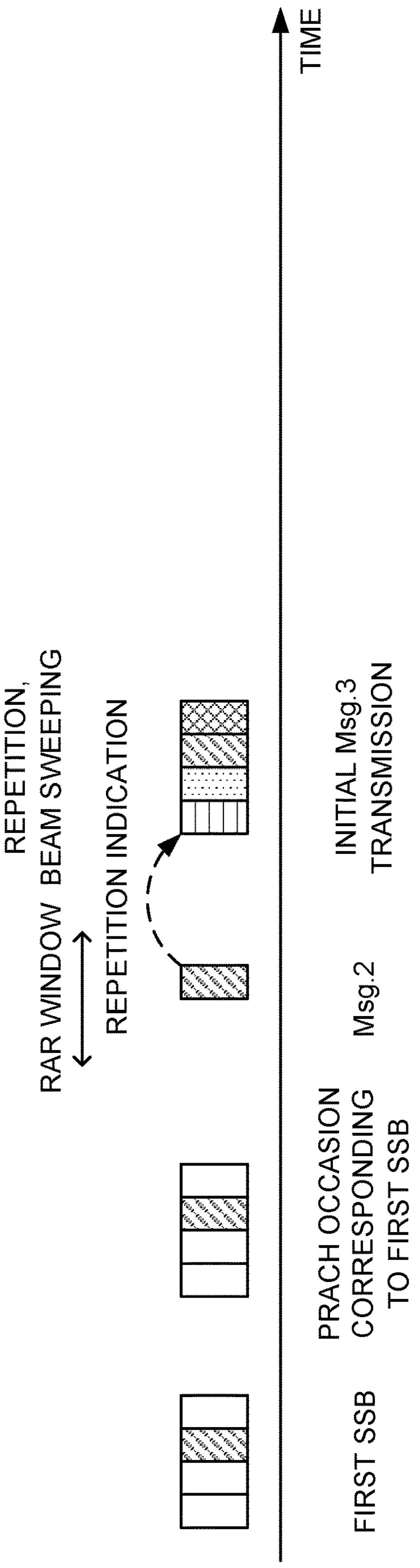
FIG. 19 is a diagram to show an example of a first variation of Aspect 8-1.

The UE may transmit a plurality of repetitions of initial Msg.3 transmission. As shown in the example in FIG. 19, a plurality of repetitions/the number of repetitions of initial Msg.3 transmission may be indicated by a Msg.2 PDCCH/RAR (PDSCH) or DCI for indicating retransmission. The plurality of repetitions of initial Msg.3 transmission may be indicated or defined in a specification as in Aspect 8-2 to be described later.

At the time of Msg.3 retransmission, no second SSB may be transmitted. Different beams (beam sweeping) may be used to transmit a plurality of repetitions of a Msg.2 PDCCH/RAR. For example, when a base station recognizes that the reception quality of a PRACH is low, beam sweeping may be performed subsequently to the Msg.2 PDCCH.

Figure 20A:
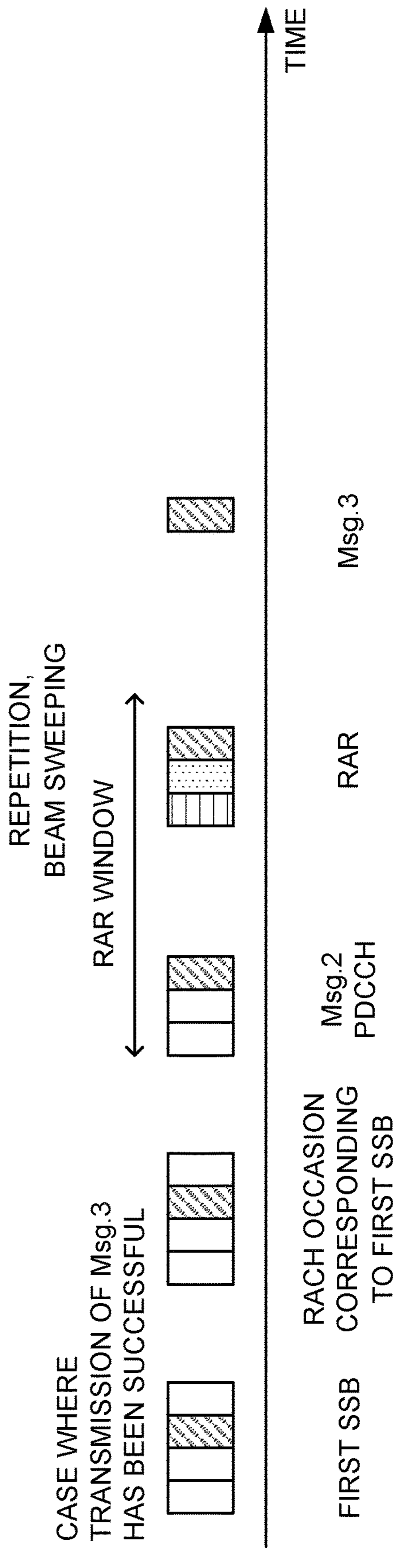
FIGS. 20A and 20B are diagrams to show examples of a second variation of Aspect 8-1.

As in the example in FIG. 20A, beam sweeping may be used for a plurality of repetitions of a RAR. For the UE, a Msg.2 PDCCH may be transmitted by using the beam of a detected first SSB, a plurality of repetitions of a RAR may be scheduled by the Msg.2 PDCCH, and beam sweeping may be used for the plurality of repetitions.

Figure 20B:
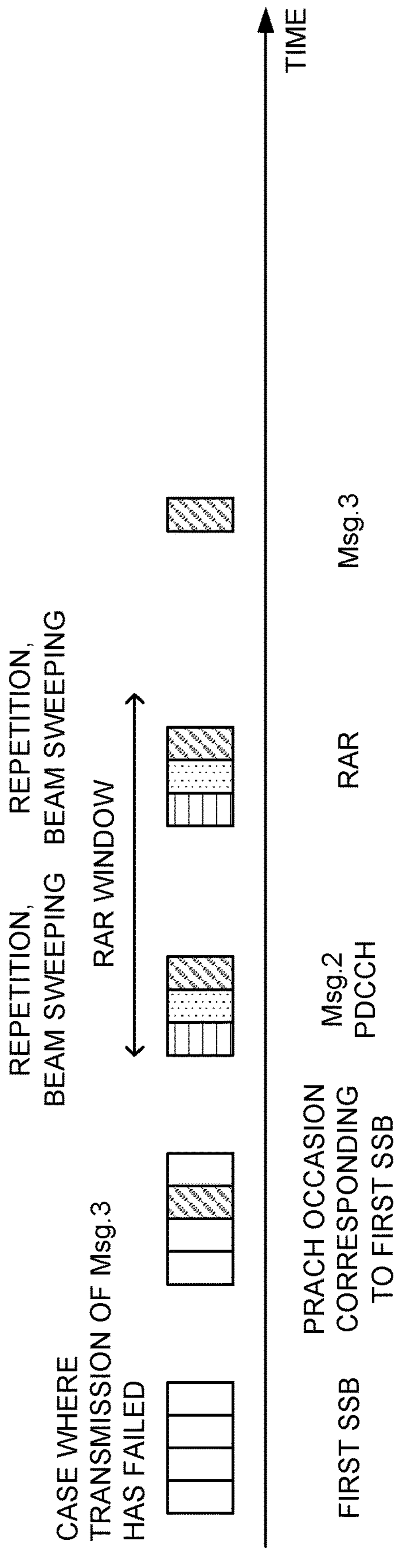

As in the example in FIG. 20B, beam sweeping may be used for a plurality of repetitions of a Msg.2 PDCCH and a plurality of repetitions of a RAR. Beam sweeping may be used for the repetitions of the Msg.2 PDCCH, the plurality of repetitions of the RAR are scheduled by the plurality of repetitions of the Msg.2 PDCCHs, and beam sweeping may be used for the plurality of repetitions of the RAR.

Figure 21:
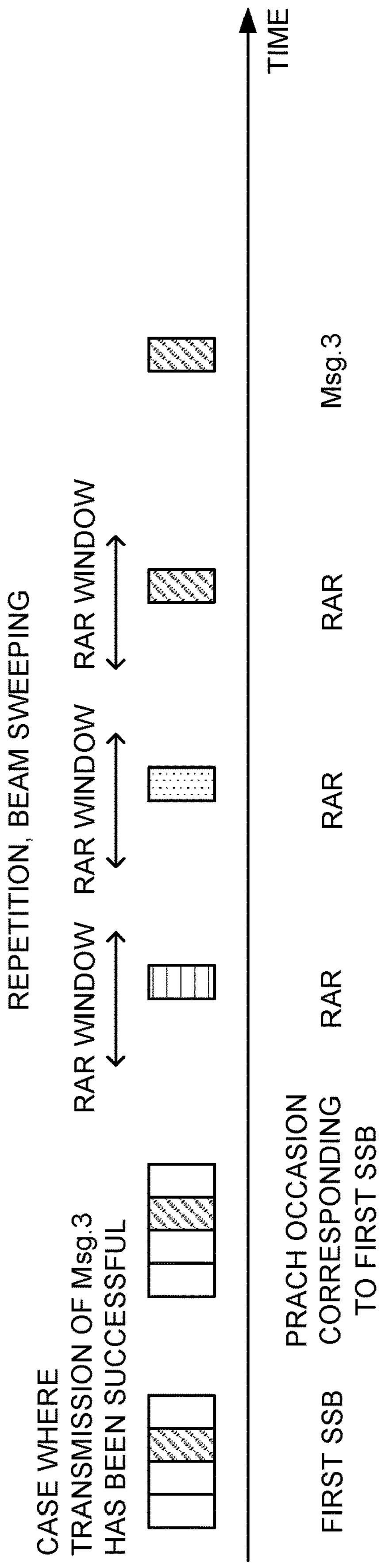
FIG. 21 is a diagram to show an example of a third variation of Aspect 8-1.

As in the example in FIG. 21, beam sweeping may be used for a plurality of RAR windows. The plurality of RAR windows may be defined in a specification or may be configured/indicated. The UE may use a beam corresponding to each RAR window to attempt reception of a Msg.2 PDCCH and a RAR in the RAR window. The UE that has received a RAR may use a resource/beam scheduled by the RAR to transmit Msg3.

«Aspect 8-2»

The UE that has transmitted a plurality of repetitions of initial Msg.3 transmission/Msg.3 retransmission may attempt to detect Msg.4 in a plurality of occasions.

Figure 22:
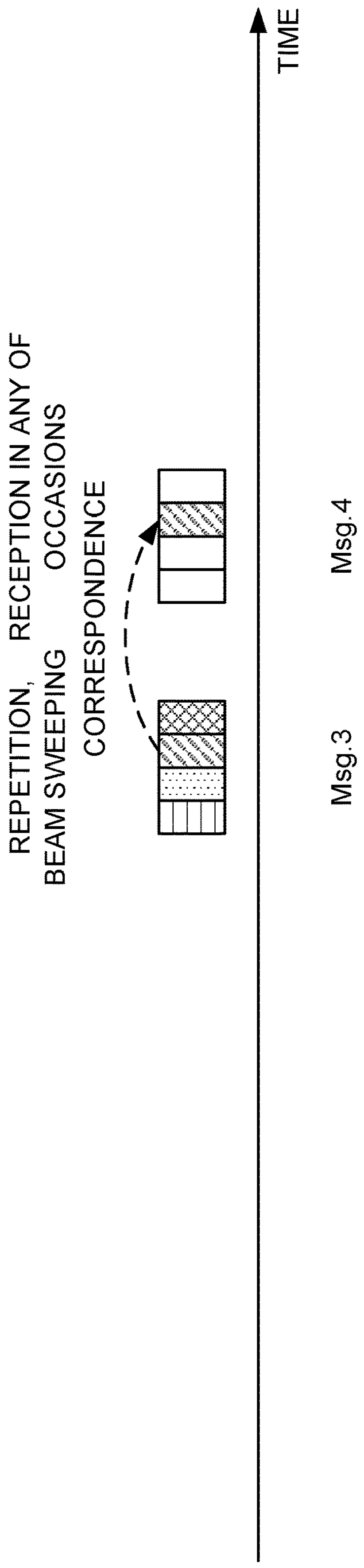
FIG. 22 is a diagram to show an example of Aspect 8-2.

As in the example in FIG. 22, a plurality of beams are used for a plurality of respective repetitions of Msg.3. A plurality of occasions for Msg.4 correspond to the plurality of respective repetitions of Msg.3. The base station may select one repetition, based on reception/measurement/detection of the plurality of repetitions of Msg.3 and use an occasion/beam corresponding to the selected repetition among the plurality of occasions/beams for Msg.4 to transmit Msg.4.

When the UE has successfully detected Msg.4 in one occasion, the UE may use a DL/UL beam corresponding to the occasion for subsequent reception/transmission (may assume that the DL/UL beam corresponding to the occasion is QCLed with a DMRS of a PDSCH/PDCCH). With this operation, the UE and the base station can have a common recognition of a beam to be used.

«Aspect 8-3»

This aspect relates to whether a plurality of repetitions are transmitted in initial Msg.3 transmission/Msg.3 retransmission (the number of repetitions, aggregation factor).

Whether a plurality of repetitions are transmitted (the number of repetitions) may be defined in a specification or may be notified/configured by broadcast/SIB/higher layer signaling or the like.

The number of repetitions of Msg.3 retransmission may be defined in a specification or may be notified/configured by broadcast/SIB/higher layer signaling or the like. Whether a plurality of repetitions of Msg.3 retransmission are transmitted (the number of repetitions) may be configured separately from whether a plurality of repetitions of initial Msg.3 transmission are transmitted (the number of repetitions). The number of repetitions of initial Msg.3 transmission need not be limited to one. The number of repetitions of initial Msg.3 transmission may be defined in a specification or may be notified/configured by broadcast/SIB/higher layer signaling or the like. The number of repetitions may be changed (increased) according to the number of transmission times of Msg.3.

The number of repetitions of Msg.3 retransmission may be larger than the number of repetitions of initial Msg.3 transmission. Only a UE that has failed in initial Msg.3 transmission applies a larger number of repetitions, which allows only a necessary UE(s) transmits many repetitions and can hence improve resource usage efficiency.

Whether a plurality of repetitions of Msg.3 retransmission are transmitted (the number of repetitions) may be indicated by at least one of Msg.2, Msg.3 RAR UL grant, and DCI for scheduling Msg.3 retransmission.

The base station can indicate a repetition(s) for each UE transmitting Msg.3, which allows more flexible operation. For example, the base station may indicate a plurality of repetitions of Msg.3 retransmission when received power/reception quality of initial Msg.3 transmission is equal to or lower than a threshold, and otherwise need not indicate a plurality of repetitions of Msg.3 retransmission.

Whether a plurality of repetitions of Msg.3 retransmission are transmitted may be notified by one-bit information or may be indicated by the number of repetitions. Correspondences between a value (codepoint) of a repetition indication and the number of repetitions may be defined in a specification or may be notified/configured by broadcast/SIB/higher layer signaling or the like. For example, in the correspondences, the value 00 may correspond to the number of repetitions being 1 (transmission in one slot), and the value 01 may correspond to the number of repetitions being 2 (transmission in two slots).

Whether a plurality of repetitions of Msg.3 retransmission are transmitted (the number of repetitions) is not indicated, the UE need not transmit the plurality of repetitions of Msg.3 retransmission, may use the number of repetitions of initial Msg.3 transmission as the number of repetitions of Msg.3 retransmission, may use a previous number of repetitions of Msg.3 retransmission as the number of repetitions of Msg.3 retransmission, or may use a specific number of repetitions (the number of repetitions defined in a specification) as the number of repetitions of Msg.3 retransmission.

«Aspect 8-4»

This aspect relates to a method of determining a beam for initial Msg.3 transmission/Msg.3 retransmission.

{Aspect 8-4-1}

A beam for initial Msg.3 transmission/Msg.3 retransmission may be defined in a specification or may be notified/configured by broadcast/SIB/higher layer signaling or the like.

{Aspect 8-4-2}

A beam for initial Msg.3 transmission/Msg.3 retransmission may be indicated by at least one of Msg.2, Msg.3 RAR UL grant, and DCI for scheduling Msg.3 retransmission. Correspondences between a value (codepoint) of an indication and a beam ID (RS index) may be defined in a specification or may be notified/configured by broadcast/SIB/higher layer signaling or the like.

Assignment of a beam ID and assignment of the number of repetitions may be indicated by common indication information (field/bits). For example, as shown in the example in FIG. 23A, when the values of two-bit indication information are from 00 to 01, the number of repetitions may be two, and when the values of the indication information are from 10 to 11, the number of repetitions may be four. Beam IDs for the number of repetitions (beam ID for each repetition) may be associated with each value of the indication information.

Assignment of a beam ID and assignment of the number of repetitions may be indicated by independent pieces of indication information (fields/bits). For example, as in the example in FIG. 23B, each value of first two-bit indication information may be associated with four beam IDs, and the number of repetitions may be indicated/configured by second indication information different from the first indication information or may be defined in a specification. When the number of repetitions is two, first two respective beam IDs among the four beam IDs indicated by the first indication information may be used for each of the first repetition and the second repetition.

{Aspect 8-4-3}

A beam for initial Msg.3 transmission/Msg.3 retransmission may be determined by a UE. A beam for initial Msg.3 transmission/Msg.3 retransmission may be determined based on a rule or may depend on UE implementation.

«Aspect 8-5»

This aspect relates to Aspect 8-4-1 described above.

When a UE uses wide beams (beams of first SSBs) and narrow beams (narrower beams than the beams of the first SSBs), correspondences between the beam ID of a wide beam and the beam ID of a narrow beam may be defined in a specification, may be notified/configured by broadcast/SIB/higher layer signaling or the like, or may be reported by the UE.

Figure 24:
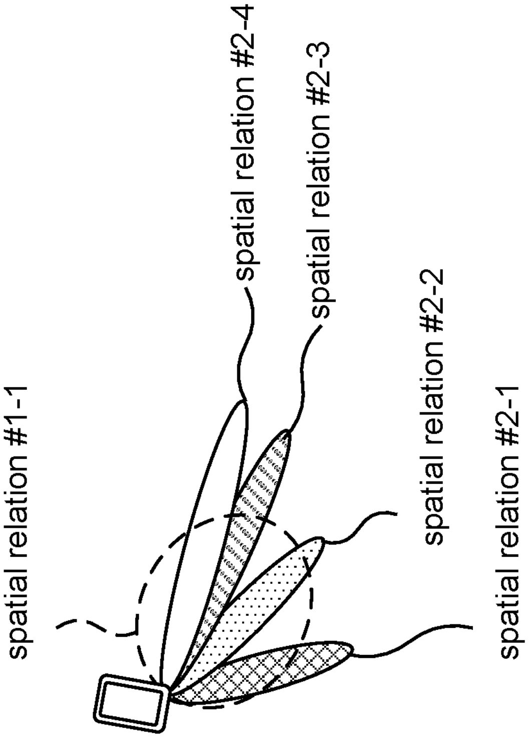
FIG. 24 is a diagram to show an example of Aspect 8-5.

In the example in FIG. 24, spatial relation #1-1 includes spatial relations #2-1 to #2-4. For example, when spatial relation #1-1 is used for initial Msg.3 transmission, spatial relations #2-1 to #2-4 may be used for Msg.3 retransmission.

According to this embodiment, performance of Msg.3 can be improved.

Ninth Embodiment

This relates to a relationship between a second SSB and Msg.3.

The UE may receive/measure/detect a second SSB.

A UE that has detected a first SSB may transmit Msg.1 (PRACH) in a PRACH occasion corresponding to the detected first SSB, receive a RAR in a RAR window corresponding to the first SSB, and transmit Msg.3 scheduled by a RAR UL grant in the RAR. When the UE is possible to perform initial access operation based on the first SSB, the UE may perform only the initial access operation based on the first SSB.

When Msg.3 transmission has failed a specific number of failure times, either of initial access operations 1 and 2 below may be followed. The Msg.3 transmission failure may be Msg.3 retransmission being scheduled or may be Msg.4 not being able to be received within a given time period. The specific number of failure times may be defined in a specification or may be notified/configured by broadcast/SIB/higher layer signaling or the like. The specific number of failure times may be one.

{Initial Access Operation 1}

The UE continues initial access based on the first SSB and uses a beam corresponding to the detected second SSB for Msg.3 retransmission. Here, the UE may transmit a plurality of repetitions of Msg.3 retransmission as in the eighth embodiment. The UE continues the initial access based on the first SSB and uses the beam corresponding to the detected second SSB for Msg.3 retransmission after the specific number of failure times of Msg.3 transmission failure.

{Initial Access Operation 2}

The UE stops the initial access based on the first SSB and initiates initial access based on the detected second SSB. The UE may transmit Msg.1 in a PRACH occasion corresponding to the detected second SSB, receive a RAR in a RAR window corresponding to the detected second SSB, and transmit Msg.3 scheduled by a RAR UL grant in the RAR. Here, the UE may use a beam corresponding to the detected second SSB for Msg.3 transmission.

The UE need not receive/measure/detect all the second SSBs (may receive/measure/detect part of the second SSBs). When QCL relationships (inclusion relationships) between a first SSB index and a second SSB index are defined/configured, the UE may receive/measure/detect a second SSB index corresponding to (included in) a first SSB index. The UE may use the second SSB index corresponding to (included in) the first SSB index used for the beam for initial Msg.3 transmission, for a beam for Msg.3 retransmission.

In the eighth embodiment, a beam for Msg.2 or later may be based on the detected second SSB or a second SSB corresponding to (included in) a detected first SSB.

The UE may perform initial access after reception of both the first SSB and the second SSB. When the UE is possible to perform initial access operation based on the first SSB, the UE may perform only the initial access operation based on the first SSB. In this way, beam sweeping for Msg.2 is performed by limiting to a minimum number of UEs, which can improve resource usage efficiency.

Figure 25:
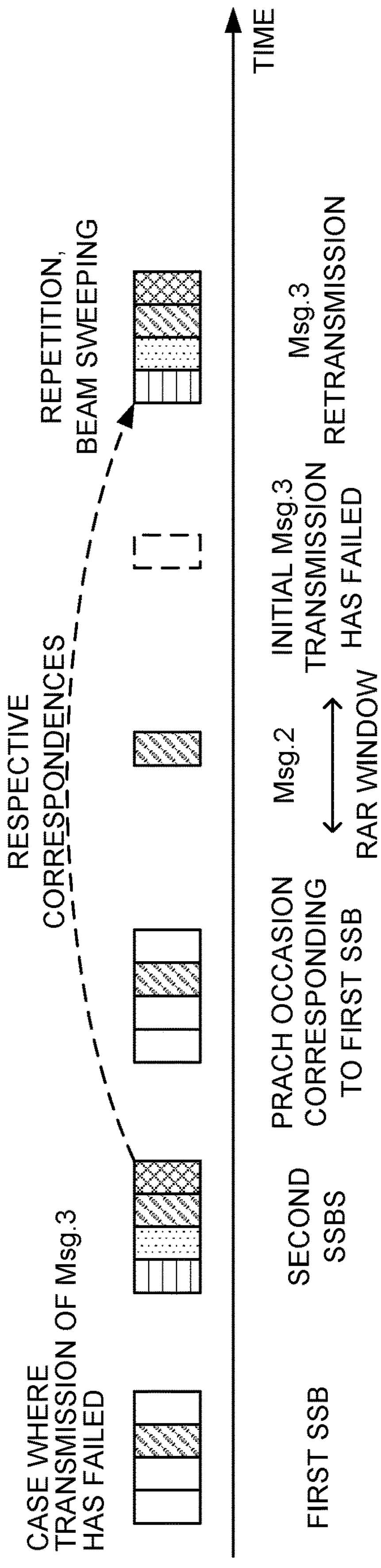
FIG. 25 is a diagram to show an example of a ninth embodiment.

The example in FIG. 25 shows a case where the UE detects a first SSB and a plurality of second SSBs, transmits Msg.1 in a PRACH occasion corresponding to the detected first SSB, receive a RAR in a RAR window corresponding to the detected first SSB, and fails in initial Msg.3 transmission scheduled by a RAR UL grant in the RAR. The UE transmits a plurality of repetitions of Msg.3 retransmission. Beams for the plurality of repetitions may correspond to the plurality of respective detected second SSBs. The plurality of second SSBs may be associated with (included in) the detected first SSB.

According to this embodiment, performance of initial access/Msg.3 can be improved by using a second SSB(s).

Tenth Embodiment

This relates to a beam used for an SSB (first SSB/second SSB).

In NR, SSB transmission periodicity is 20 ms, and a period in which a PBCH content is maintained is 80 ms.

Beam sweeping/beam cycling may be used for at least one or some specific channels/signals (second signals) of a PSS/SSS/PBCHs in an SSB in specific periodicity. For example, narrower beams (beams of second SSBs) than those of first SSBs may be used for this beam sweeping.

Figure 26:
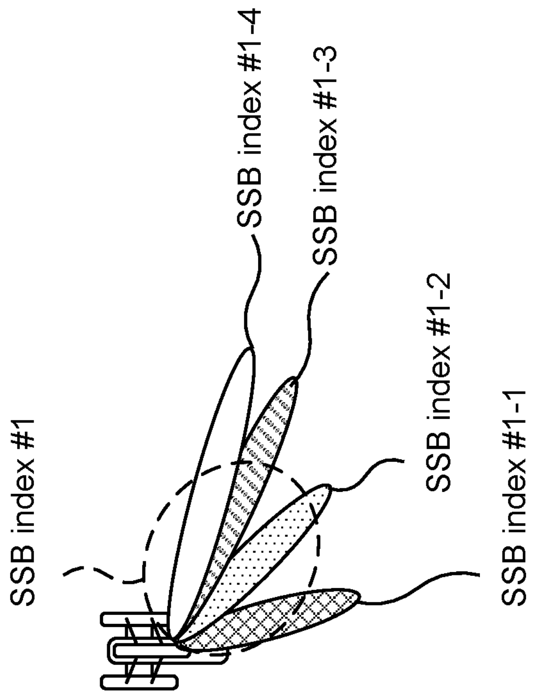
FIG. 26 is a diagram to show an example of beams according to a tenth embodiment.

As in FIG. 26, when the beam with SSB index #1 includes the beams with SSB indices #1-1 to #1-4, it may be assumed that the UE can receive narrow beams as those with SSB indices #1-1 to #1-4 even in a case of using (assuming) a wide beam as that with SSB index #1.

The UE may specify the time/frequency of an SSB by using such a wide beam as that with SSB index #1 and thereafter use narrow beams as those with SSB indices #1-1 to #1-4 to specify SSB indices #1-1 to #1-4.

For example, a wide beam (SSB index #1) may be used for a PSS/SSS (first signal), and narrow beams (SSB indices #1-1 to #1-4) may be used for a PBCH-DMRS and PBCHs (second signals).

Figure 27:
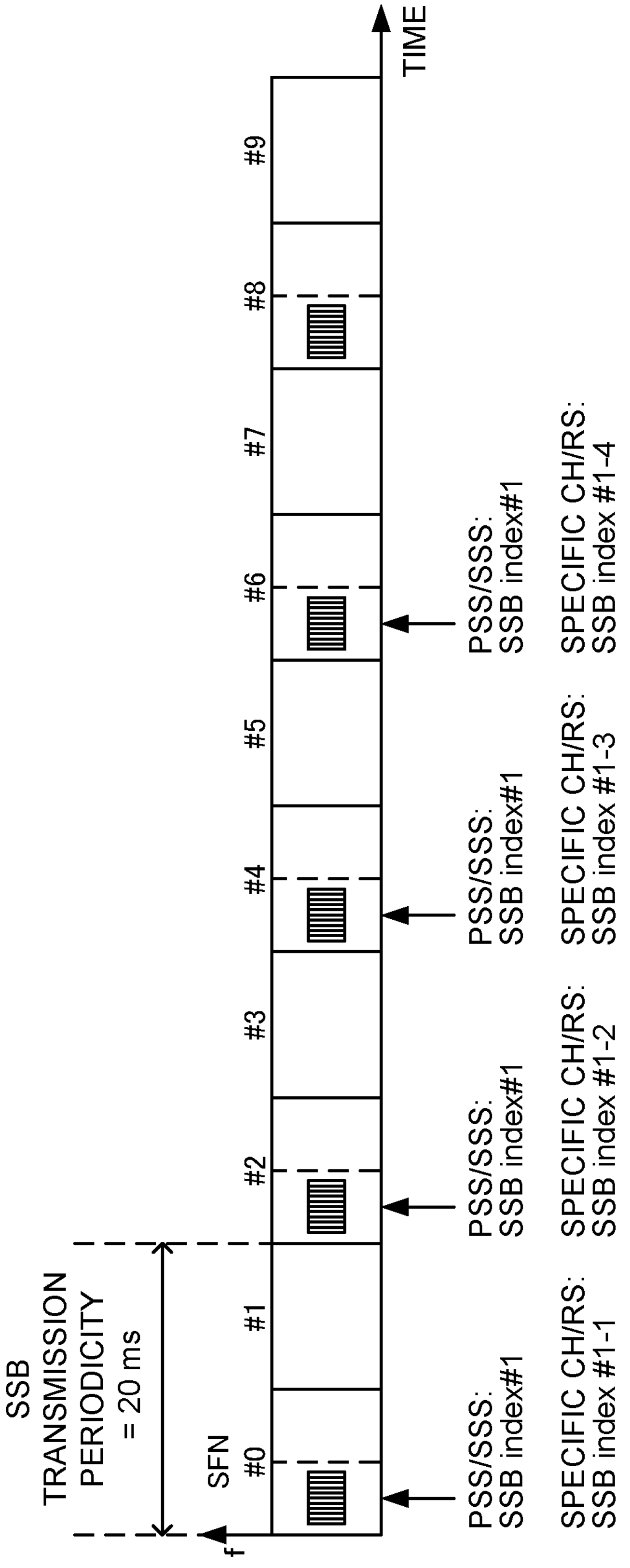
FIG. 27 is a diagram to show an example of SSB beams.

As shown in FIG. 27, a set of SSBs is transmitted every cycle of SSB transmission periodicity (for example, 20 ms), and PSSs/SSSs in the SSBs with SSB index #1 in respective cycles of SSB transmission periodicity are transmitted by using the same beam (SSB index #1). With this, decrease in accuracy for detecting a PSS/SSS can be prevented.

In a plurality of cycles of the SSB transmission periodicity (for example, four cycles of the SSB transmission periodicity) in specific periodicity (for example, 80 ms), PBCH-DMRSs and PBCHs in the SSBs with SSB index #1 may be subjected to beam sweeping (transmitted by using the four respective beams with SSB indices #1-1 to #1-4).

Figure 28:
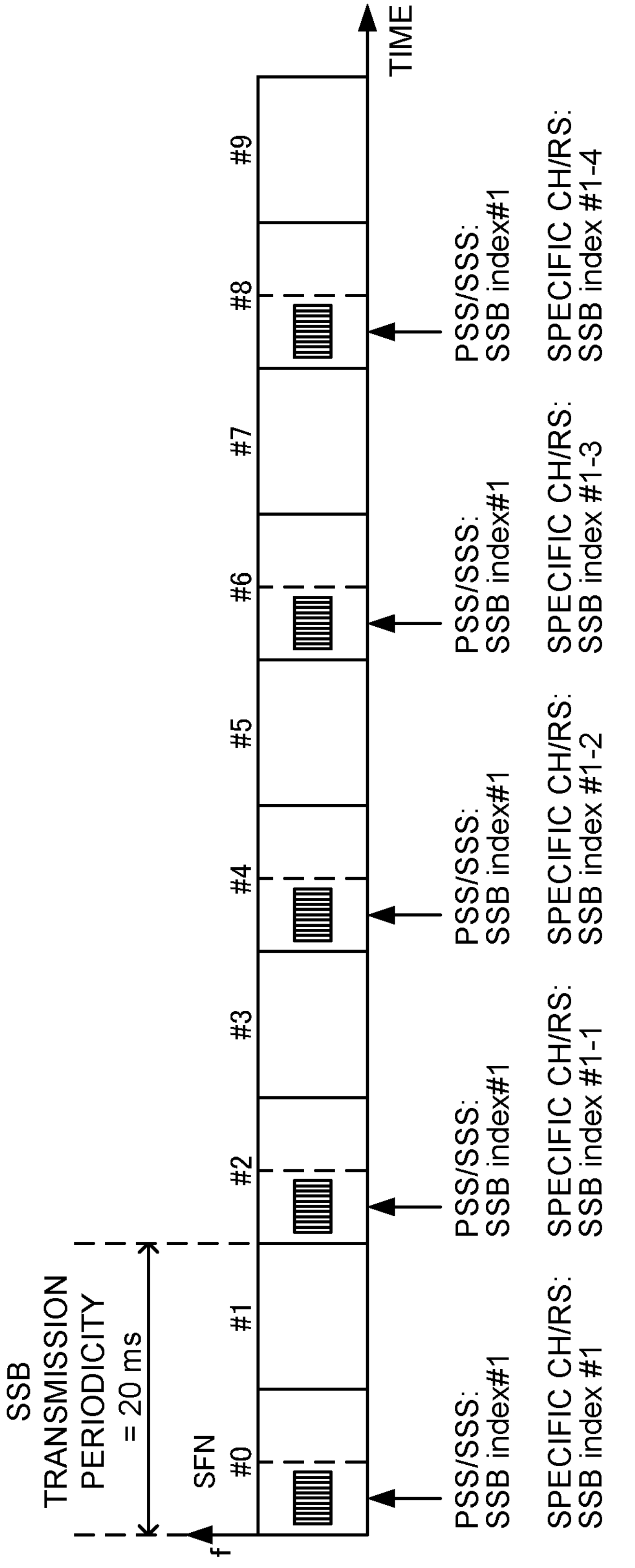
FIG. 28 is a diagram to show an example of a variation of the SSB beams.

As shown in FIG. 28, a set of SSBs is transmitted every cycle of SSB transmission periodicity (for example, 20 ms), and PSSs/SSSs in the SSBs with SSB index #1 in each cycle of SSB transmission periodicity are transmitted by using the same beam (SSB index #1). With this, decrease in accuracy for detecting a PSS/SSS can be prevented.

In the first cycle of the SSB transmission periodicity in specific periodicity (for example, 100 ms), PBCH-DMRSs and PBCHs in the SSB with SSB index #1 may be transmitted by using the beam with SSB index #1. In the second and subsequent cycles of the SSB transmission periodicity (for example, the second to fifth four cycles of the SSB transmission periodicity) in specific periodicity, PBCH-DMRSs and PBCHs in the SSBs with SSB index #1 may be subjected to beam sweeping (transmitted by using the four respective beams with SSB indices #1-1 to #1-4).

The UE may assume that at least one or some specific channels/signals of a PSS/SSS/PBCHs (PBCH-DMRSs) and a channel(s)/signal(s) other than these in one SSB are not in a QCL relationship.

Figure 29A:
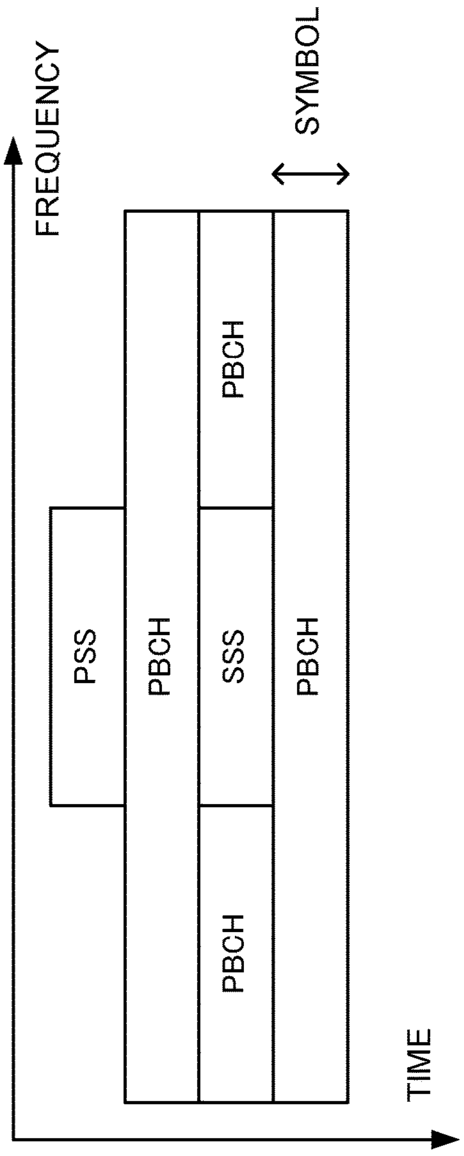
FIGS. 29A and 29B are diagrams to show examples of an SSB structure.
Figure 29B:
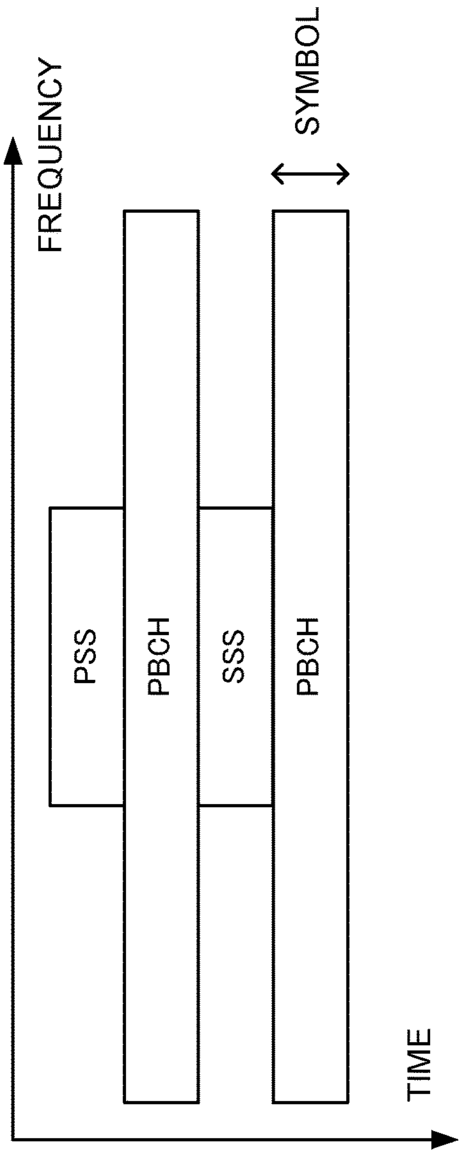

An SSS and PBCHs may be transmitted in the same symbol as in FIG. 29A, or an SSS and PBCHs may be transmitted in different symbols as in FIG. 29B.

«Aspect 10-1»

This aspect relates to transmission of Msg.1 (PRACH) and reception of a Msg.2 PDCCH/RAR.

{Aspect 10-1-1}

The UE may use such a wide beam as that with SSB index #1 (beam including the beams with SSB indices #1-1 to #1-4) to transmit Msg.1 (PRACH).

A PRACH occasion may correspond to such a wide beam as that with SSB index #1. The UE may select, based on reception/measurement/detection of an SSB with such a wide beam as that with SSB index #1, a PRACH occasion corresponding to the SSB and transmit a PRACH in the selected PRACH occasion. The number of PRACH occasions may be the number of SSBs each with such a wide beam as that with SSB index #1 (for example, 64).

The UE may use the beam with the SSB index (for example, SSB index #1) notified by using Msg.1, to receive a Msg.2 PDCCH/RAR.

{Aspect 10-1-2}

The UE may use such narrow beams as those with SSB indices #1-1 to #1-4 (beams included in the beam with SSB index #1) to transmit Msg.1 (PRACH).

A PRACH occasion may correspond to such a narrow beam as those with SSB indices #1-1 to #1-4. The UE may select, based on reception/measurement/detection of an SSB with such a narrow beam as those with SSB indices #1-1 to #1-4, a PRACH occasion corresponding to the SSB and transmit a PRACH in the selected PRACH occasion. The number of PRACH occasions may correspond to the number of SSBs each with such a narrow beam as those with SSB indices #1-1 to #1-4 (for example, 64×4).

The UE may use the beam with the SSB index (for example, any of SSB indices #1-1 to #1-4) notified by using Msg.1, to receive a Msg.2 PDCCH/RAR.

«Aspect 10-2»

This aspect relates to Msg.3 transmission.

{Aspect 10-2-1}

The UE may use such a wide beam as that with SSB index #1 (beam including the beams with SSB indices #1-1 to #1-4) to transmit Msg.3.

A beam used for Msg.3 transmission may be the beam notified by Msg.1 in Aspect 10-1-1.

In Aspect 10-1-2, the UE may include information of such a narrow beam as those with SSB indices #1-1 to #1-4, in Msg.3 (index in FIG. 30A). In this way, the UE can use a narrow beam notified by Msg.3, for transmission/reception after the Msg.3 transmission.

The UE may notify the narrow beam by another a UL channel/UL signal instead of Msg.3.

After the UE has received a response to Msg.3 (for example, a Msg.4 PDCCH/PDSCH), the UE may use the narrow beam notified by Msg.3, as QCL information. In other words, in transmission/reception after reception of the response to Msg.3, the UE may use the narrow beam notified by Msg.3, as a QCL source.

A given channel/signal being in a QCL relationship with an SSB (being QCLed with the SSB) may be interpreted as being in a QCL relationship with the SSB with the SSB index notified by MMsg.3.

{Aspect 10-2-2}

The UE may use such narrow beams as those with SSB indices #1-1 to #1-4 (beams included in the beam with SSB index #1) to transmit Msg.3.

In Aspect 10-1-1, the UE may notify information of a wide beam by Msg.1, and include information (indices in FIG. 30B) of narrow beams associated with (included in) the wide beam, in Msg.3. In this example, SSB index #x of a wide beam corresponds to SSB indices #x-1 to #x-4 of narrow beams.

The UE may notify the narrow beams by another a UL channel/UL signal instead of Msg.3.

«Aspect 10-3»

The UE need not assume a QCL relationship between a PSS/SSS and a PBCH in one SSB. The UE need not assume a QCL relationship between a plurality of PBCHs corresponding to the same SSB index in specific periodicity.

In Aspect 10-2, the UE may notify a narrow beam (beam for a PBCH, SSB index corresponding to the beam of a received PBCH) by Msg.3.

A given channel/signal having a QCL relationship with an SSB before given timing (timing based on Msg.3 transmission, Msg.4 reception, or transmission of an HARQ-ACK for Msg.4) may mean the channel/signal having a QCL relationship with a PSS/SSS. A given channel/signal having a QCL relationship with an SSB after the given timing may mean the channel/signal having a QCL relationship with a PBCH/PBCH-DMRS.

«Aspect 10-4»

The UE may be notified of information (SSB index) related to a narrow beam (beam for a PBCH/PBCH-DMRS) by the PBCH/PBCH-DMRS. In Aspect 10-2-2, the UE may report this information related to the narrow beam by Msg.3.

{Aspect 10-4-1}

The beams for PBCHs (narrow beams, SSB indices #1-1 to #1-4) may each be notified by information outside an MIB (for example, a timing related field (timing related bits)) in the corresponding PBCH.

Figure 31:
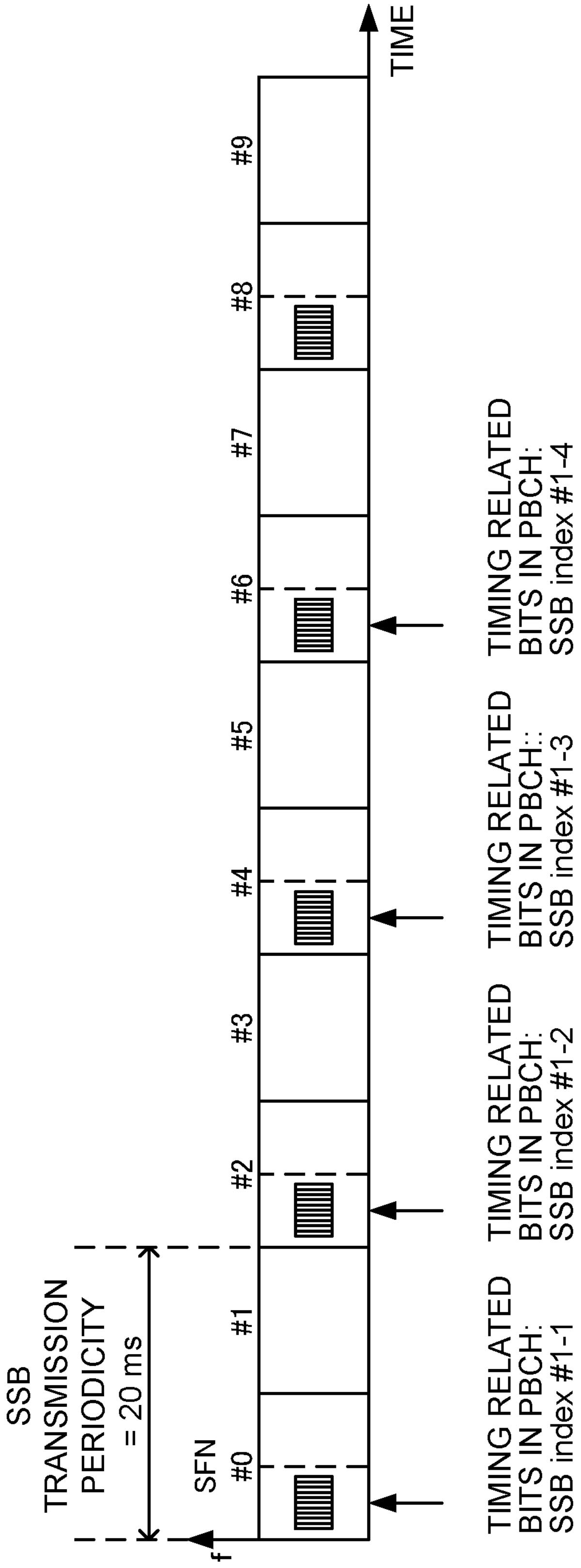
FIG. 31 is a diagram to show an example of Aspect 10-4-1.

For example, when the beams in FIG. 27 described above are used for PBCHs, four different values (SSB indices #1-1 to #1-4) may be notified in respective timing related fields in four cycles of the SSB transmission periodicity in specific periodicity as in the example in FIG. 31.

SSB indices #x-1 to #x-4 of narrow beams corresponding to SSB index #x of a wide beam (beam for a PSS/SSS) may each be notified by information outside an MIB (for example, a timing related field (timing related bits)) in a corresponding PBCH. With this, the size of information can be reduced compared with that in Aspect 10-4-1.

PBCH beam cycle periodicity (for example, specific periodicity, the number of cycles of SSB transmission periodicity used for a beam cycle, and the like) may be notified by an MIB/SIB.

{Aspect 10-4-2}

The beams for PBCHs (narrow beams, SSB indices #1-1 to #1-4) may be notified by a PBCH-DMRS sequence. In specific periodicity, a PBCH-DMRS sequence corresponding to the same wide beam (beam for a PSS/SSS) may be different for each narrow beam (cycle of SSB transmission periodicity). In the PBCH-DMRS sequence, at least one of a time/frequency resource, a cyclic shift index, a comb index, and an orthogonal cover code (OCC) index may be associated with the index of the narrow beam.

The correspondences between an SSB index of a PBCH and a PBCH-DMRS sequence may be defined in a specification, may be broadcast, or may be configured by higher layer signaling. By receiving/confirming/detecting a PBCH-DMRS sequence, the UE can obtain narrow beams (SSB indices #1-1 to #1-4) from the received PBCH-DMRSs, based on the correspondences.

Figure 32:
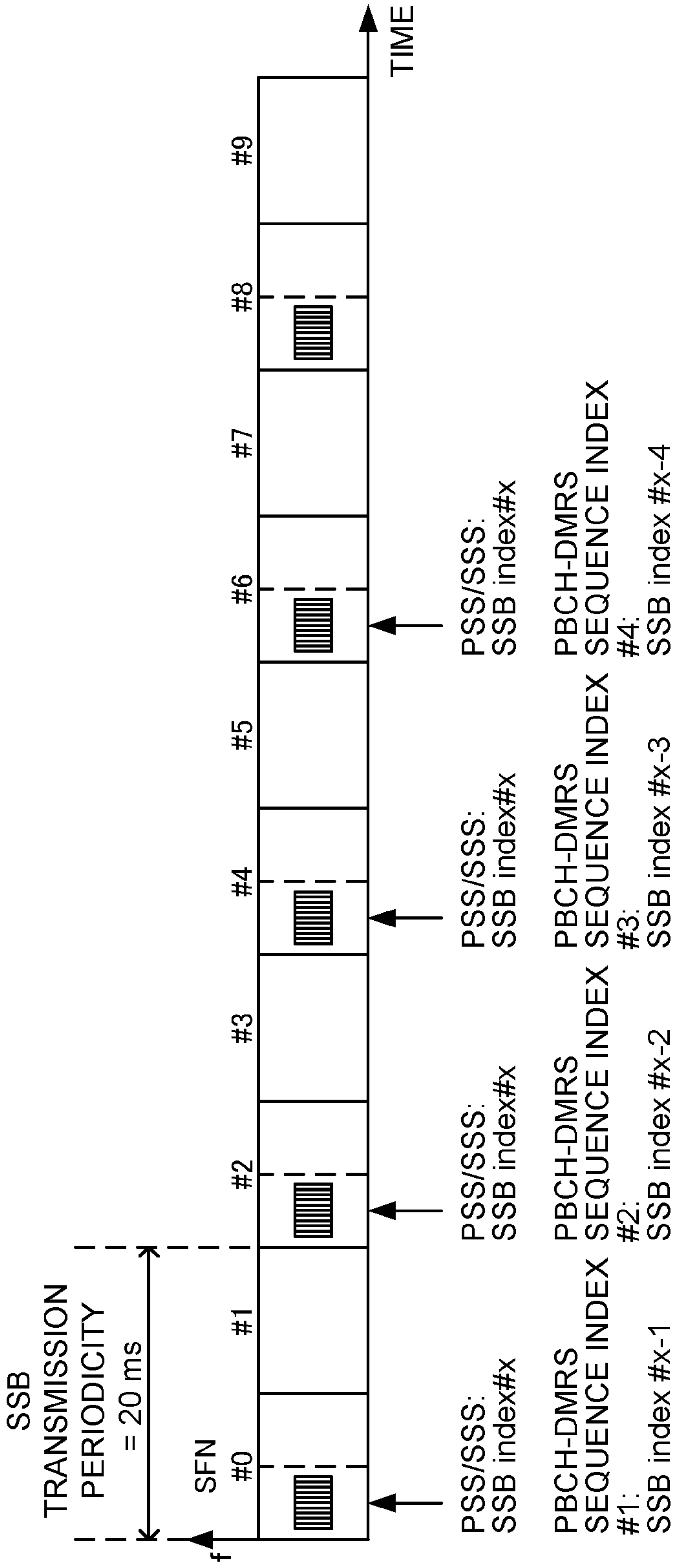
FIG. 32 is a diagram to show an example of Aspect 10-4-2.

For example, when the beams in FIG. 27 described above are used for PBCHs, and the wide beam (beam for a PSS/SSS) corresponds to SSB index #x, the PBCH-DMRS sequences in four cycles of the SSB transmission periodicity in specific periodicity may be associated with four different values (SSB indices #x-1 to X-4) as in the example in FIG. 32.

Figure 33:
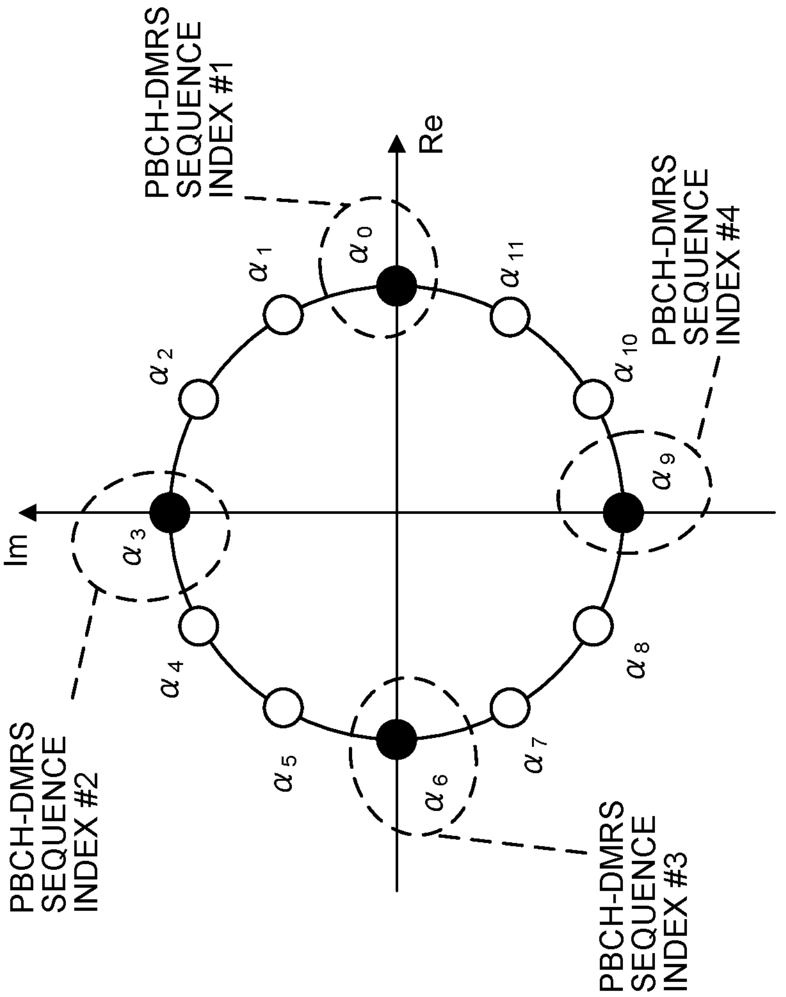
FIG. 33 is a diagram to show an example of cyclic shift of a PBCH-DMRS sequence.

As in the example in FIG. 33, cyclic shifts of PBCH-DMRS sequences in four cycles of the SSB transmission periodicity in specific periodicity may be associated with four different values (cyclic shift indices corresponding to SSB indices #x-1 to X-4, PBCH-DMRS sequence indices). Four different values of a cyclic shift index m_CS may be 0, 3, 6, and 9.

{Aspect 10-4-3}

The beams for PBCHs (narrow beams, SSB indices #1-1 to #1-4) may be determined by a rule using the time-domain resource of an SSB. For example, the rule may determine an SSB index, based on an SFN and a time location in a frame.

Figure 34:
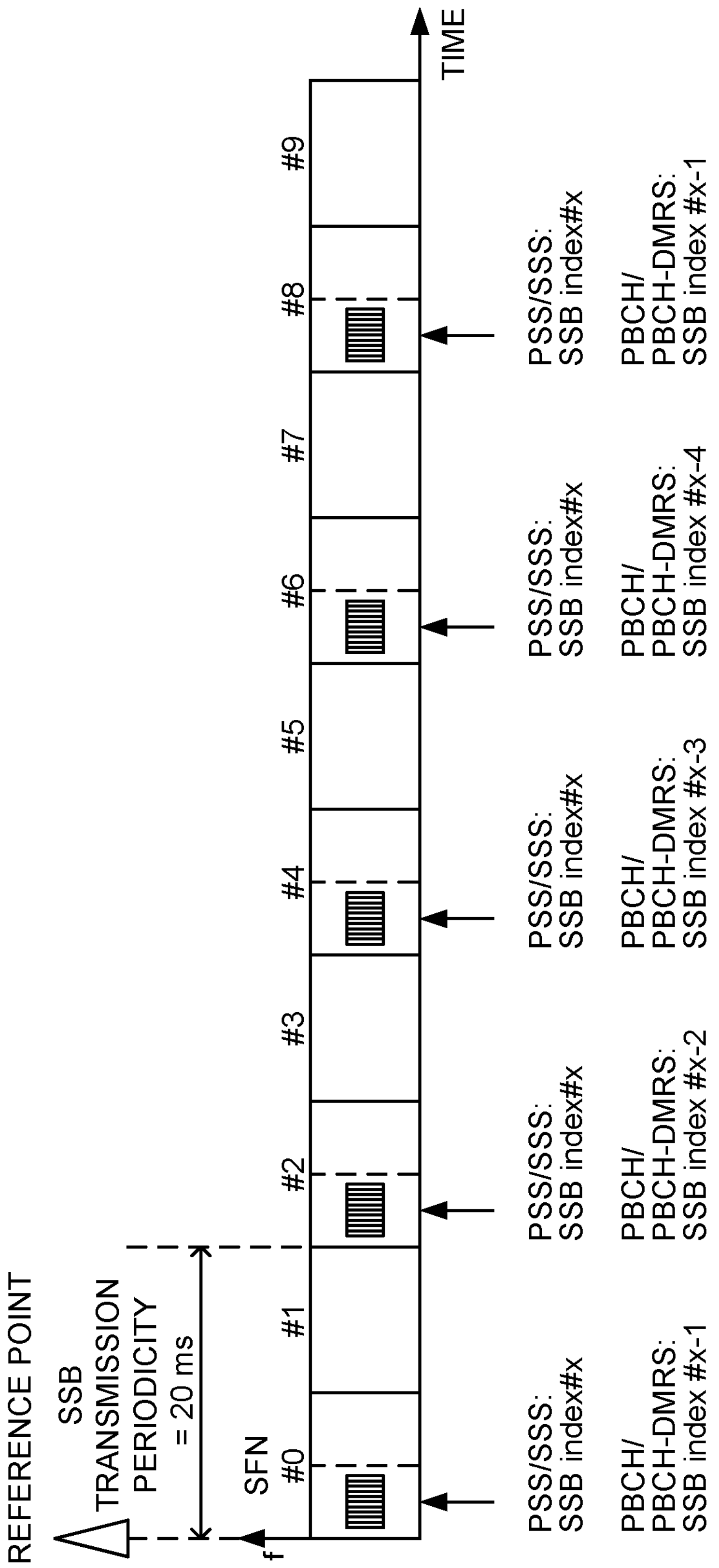
FIG. 34 is a diagram to show an example of Aspect 10-4-3.

For example, when the beams in FIG. 27 described above are used for PBCHs, and a wide beam (beam for a PSS/SSS) corresponds to SSB index #x, a plurality of SSBs (for example 64 SSBs) in an SSB set per cycle of the SSB transmission periodicity may be indexed, and a plurality of SSB sets (for example, four SSB sets) from a reference point (for example, the starting point of a frame, specific periodicity (for example, four cycles of the SSB transmission periodicity), a specific number of (for example, four) cycles of the SSB transmission periodicity, or the like) may be indexed as in the example in FIG. 34. SSB index #x-i of the beam for a PBCH may be subjected to mod operation (for example, mod 4) every specific number of cycles of the SSB transmission periodicity.

«Aspect 10-5»

When the UE uses an SSB index in a procedure (transmission/reception of a given channel/signal) after notification of the SSB index, the given channel/signal being QCLed with the SSB having the SSB index may follow at least one of interpretations 1 and 2 below.

{Interpretation 1} The UE uses a PSS/SSS of the SSB as a QCL source of the channel/signal.

{Interpretation 2} The UE uses a PBCH-DMRS of the SSB as a QCL source of the channel/signal.

The UE may follow either of QCL application methods 1 and 2 below.

{QCL Application Method 1}

As described in Aspect 10-3, the UE may use interpretation 1 before given timing (timing based on Msg.3 transmission, Msg.4 reception, or transmission of an HARQ-ACK for Msg.4) and use interpretation 2 after the timing. The given timing may be being after the elapse of a specific time period (specific number of symbols/specific number of slots) since Msg.3 transmission, Msg.4 reception, or transmission of an HARQ-ACK for Msg.4.

{QCL Application Method 2}

Whether to use interpretation 1 or 2 may be defined in a specification, may be broadcast, or may be configured/indicated for each channel/RS of a QCL application destination (target).

Either of interpretations 1 and 2 may be configured/indicated together with a beam indication such as a TCI state/QCL information.

For example, since a narrow beam is preferable for a UE-specific channel/RS, interpretation 2 may be used. For example, since a number of beam repetition transmissions cost overhead for a UE-common channel/RS, interpretation 1 may be used.

According to this embodiment, the UE can appropriately determine a beam to be used for an SSB/channel/signal.

Eleventh Embodiment

Figure 35:
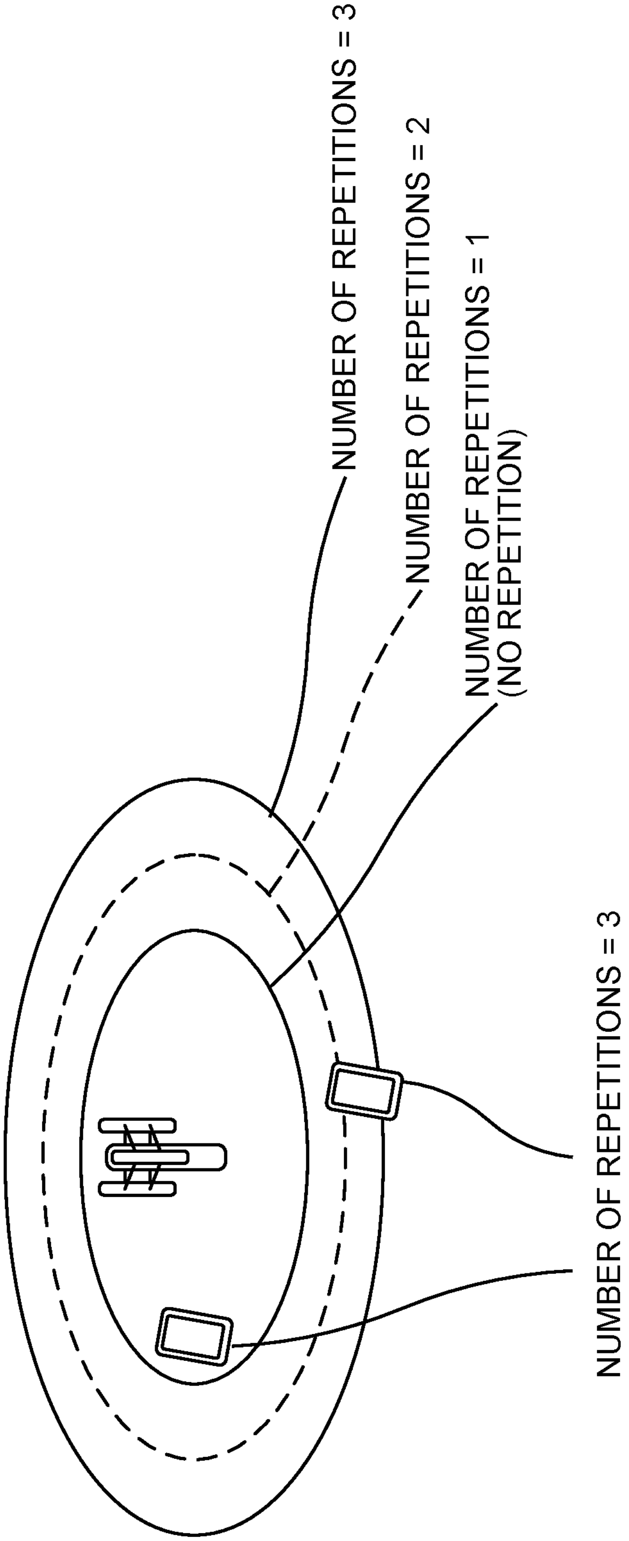
FIG. 35 is a diagram to show an example of an eleventh embodiment.

Repetition transmission may be notified/configured by broadcast/higher layer signaling. The notified/configured UE may apply repetition transmission, to a specific type of channel/RS (FIG. 35). The same number of repetitions may be applied to all the notified/configured UEs.

The specific type of channel/RS may be a plurality of types of DL/UL channels/RSs or may be all DL/UL channels/RSs.

One number of repetitions (aggregation factor) may be configured for the specific type of channel/RS.

A plurality of numbers of repetitions may be configured for the plurality of respective types of channels/RSs. The number of repetitions may be configured for each type of channel/RS.

The number of repetitions may be defined in a specification, may be notified/configured by broadcast/an MIB/SIB, may be notified/configured by UE-specific higher layer control information (RRC IE), or may be based on a value reported by UE capability signaling. For example, a UE having low transmission/reception performance may use a large number of repetitions while a UE having higher performance may use a smaller number of repetitions.

The method of configuring the number of repetitions may follow Aspect 2-2 to be described later.

Some patterns of the number of repetitions may be defined/configured. One of the patterns may be indicated by broadcast/higher layer signaling/a MAC CE/physical layer control information. The example in FIG. 36A shows a case where one number of repetitions is configured/indicated for a plurality of types of channels/RSs. When configurations #1 to #4 are configured and one of configurations #1 to #4 is indicated, the UE applies the number of repetitions corresponding to the indicated configuration to the plurality of types of channels/RSs. The example in FIG. 36B shows a case where one number of repetitions is configured/indicated for each type of channel/RS. When configurations #1 to #4 are configured and one of configurations #1 to #4 is indicated, the UE applies the number of repetitions corresponding to a channel/RS (PUSCH/PUCCH/PDSCH) to the channel/RS.

According to this embodiment, coverage can be improved by repetition transmission.

Twelfth Embodiment

Figure 37:
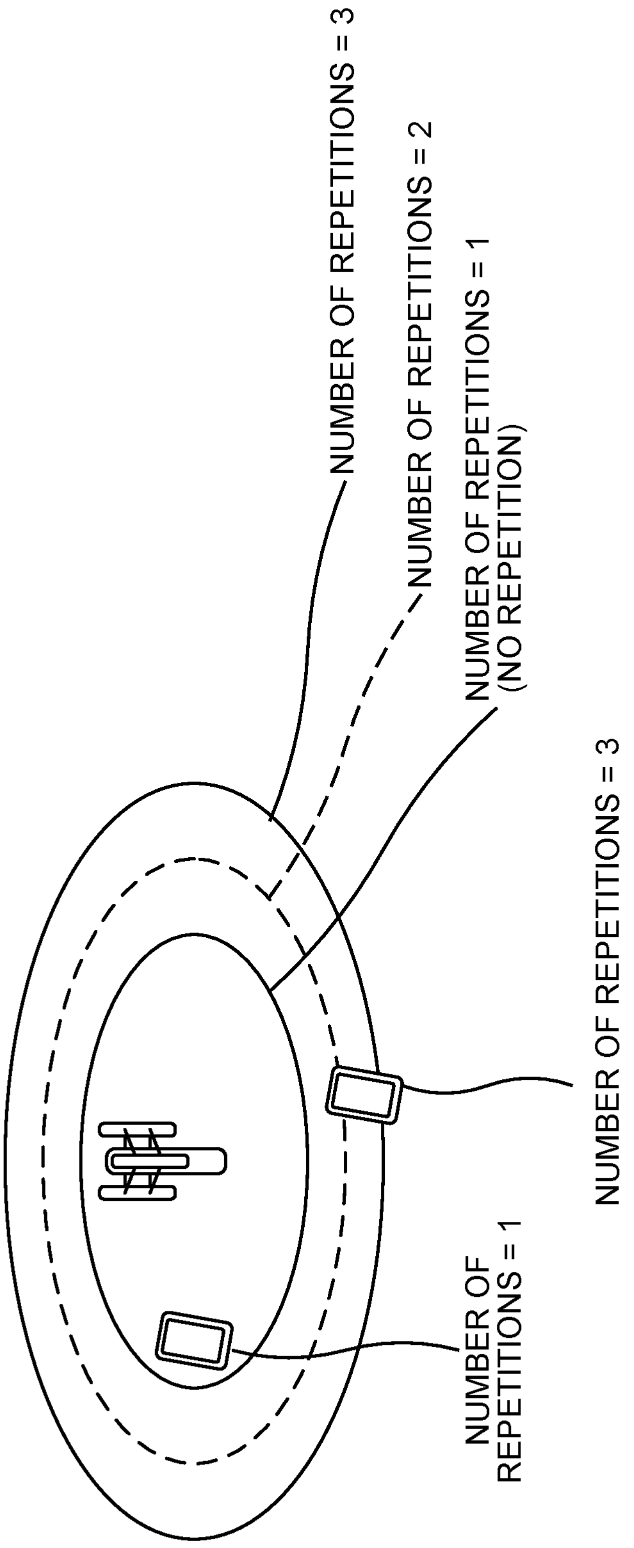
FIG. 37 is a diagram to show an example of a twelfth embodiment.

Repetition transmission may be notified/configured by broadcast/higher layer signaling. The notified/configured UE may apply repetition transmission, to a specific type of channel/RS as necessary (according to a condition) (FIG. 37).

The specific type of channel/RS may be a plurality of types of DL/UL channels/RSs or may be all DL/UL channels/RSs.

When an application condition is satisfied, the UE may apply repetition transmission, to the specific type of channel/RS.

The number of repetitions may be configured for each type of channel/RS. The number of repetitions may be configured for a plurality of types of DL/UL channels/RSs.

The number of repetitions may be notified/configured by broadcast/an MIB/SIB or may be notified/configured by UE-specific higher layer control information (RRC IE).

The number of repetitions may be determined based on a determination rule.

When the UE has been successful in PSS/SSS detection (reception power of a PSS/SSS is equal to or higher than a threshold) but has failed in reading an MIB, the determination rule may be such that the number of repetitions is determined based on the number of times of MIB reading failure. For example, the number of repetitions is one (no repetition transmission is performed) when the number of failure times is 0, while the number of repetitions is four when the number of failure times is four.

The determination rule may be such that the number of repetitions is determined based on the number of times of Msg.3 transmission failure. For example, the number of repetitions is one for initial Msg.3 transmission, the number of repetitions is two for the first Msg.3 retransmission, and the number of repetitions is three for the second Msg.3 retransmission.

Correspondences of the number of times of MIB reading failure, the number of times of Msg.3 transmission failure, or the like and the number of repetitions may be defined in a specification, may be configured by higher layer signaling, or may be reported by UE capability signaling.

A problem is since when the determined number of repetitions is applied.

The UE may apply the determined number of repetitions to a specific type of channel/RS immediately after the application condition is satisfied. The UE may apply the number of repetitions to a specific type of channel/RS triggered/scheduled after the application condition is satisfied. The UE may apply the number of repetitions to a specific type of channel/RS transmitted/received after the application condition is satisfied.

The UE may apply the determined number of repetitions to a specific type of channel/RS after the elapse of a standby time (for example, X symbols/X slots/Y [ms] or the like) from a time point at which the application condition is satisfied. The UE may apply the number of repetitions to a specific type of channel/RS triggered/scheduled after the elapse of the standby time from a time point at which the application condition is satisfied. The UE may apply the number of repetitions to a specific type of channel/RS transmitted/received after the elapse of the standby time from a time point at which the application condition is satisfied.

The standby time may be defined in a specification, may be configured by higher layer signaling, or may be reported by UE capability signaling.

The UE may explicitly/implicitly notify repetition transmission after the application condition is satisfied, and apply the determined number of repetitions to a specific type of channel/RS, based on the notification. When the UE has judged that repetition transmission is needed, UL repetition transmission is possible. By the UE notifying a base station that repetition transmission is needed, DL repetition transmission is also made possible.

In the first UL transmission after the application condition is satisfied, the UE may explicitly transmit a request/indication/notification of repetition transmission. By the UE performing repetition transmission of the first UL transmission after the application condition is satisfied, the UE may implicitly transmit a request/indication/notification of repetition transmission.

«Aspect 12-1»

The UE may determine repetition transmission/the number of repetitions. An application condition may be at least one of the following conditions or may be AND/OR of a plurality of conditions among the following conditions.

- Received power/reception quality of a specific SSB is equal to or lower than a threshold (for example, the specific SSB may be an SSB corresponding to the highest received power/reception quality among 65 SSBs).
- The UE fails in Msg.1 (PRACH) transmission within a specific time period (time) (the UE does not receive Msg.2 within the specific time period (time)).
- The UE fails in Msg.2 (PDCCH/RAR) reception within a specific time period (time) (the UE does not receive Msg.2 (PDCCH/RAR) within the specific time period (time)).
- The UE fails in Msg.3 (PUSCH scheduled by a RAR UL grant) transmission within a specific time period (time) (the UE does not receive Msg.4 or is indicated with Msg.3 retransmission within the specific time period (time)).
- The UE fails in Msg.4 reception within a specific time period (time) (the UE does not receive Msg.4 within the specific time period (time)).
- The UE fails in Msg.4 HARQ-ACK transmission within a specific time period (time) (the UE is indicated with reception of Msg.4 retransmission within the specific time period (time)).
- The UE makes determination, based on implementation (the UE determines repetition transmission of Msg.1/Msg.3/Msg.4 HARQ-ACK, based on SSB reception or the like). The UE that has performed the repetition transmission of Msg.1/Msg.3/Msg.4 HARQ-ACK may apply repetition transmission to a specific type of channel/RS in an initial access procedure subsequent to this/operation after RRC connection establishment. The UE may transmit a desire/request about the number of repetitions to the base station.
- The UE fails in Msg.A (PRACH/PUSCH) transmission within a specific time period (time) (the UE does not receive Msg.B or is scheduled with Msg.3 transmission by Msg.B (fallback indication) within the specific time period (time)).
- The UE fails in Msg.B (PDCCH/PDSCH) reception within a specific time period (time) (the UE does not receive Msg.B (PDCCH/PDSCH) within the specific time period (time)).
- The UE is successful in reading of an MIB but fails in reception of at least one of an SIB1 PDSCH and a PDCCH (CORESET #0/search space #0) for scheduling the SIB1 PDSCH.

Figure 38A:
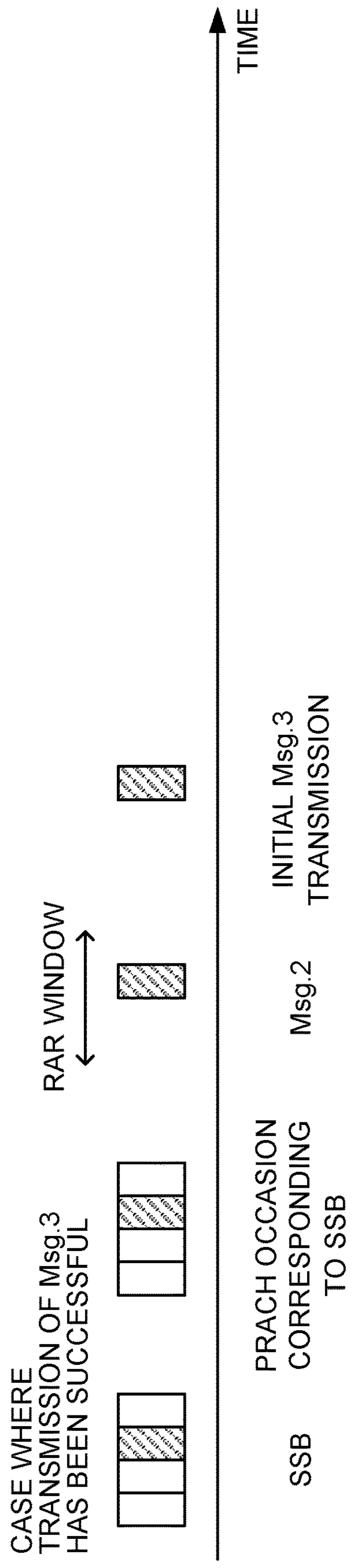
FIGS. 38A and 38B are diagrams to show examples of Aspect 12-1.

As in FIG. 38A, when the application condition is not satisfied (the UE has been successful in initial Msg.3 transmission), the UE need not apply repetition transmission (may apply the number of repetitions being one) to a specific type of channel/RS subsequent to this.

Figure 38B:
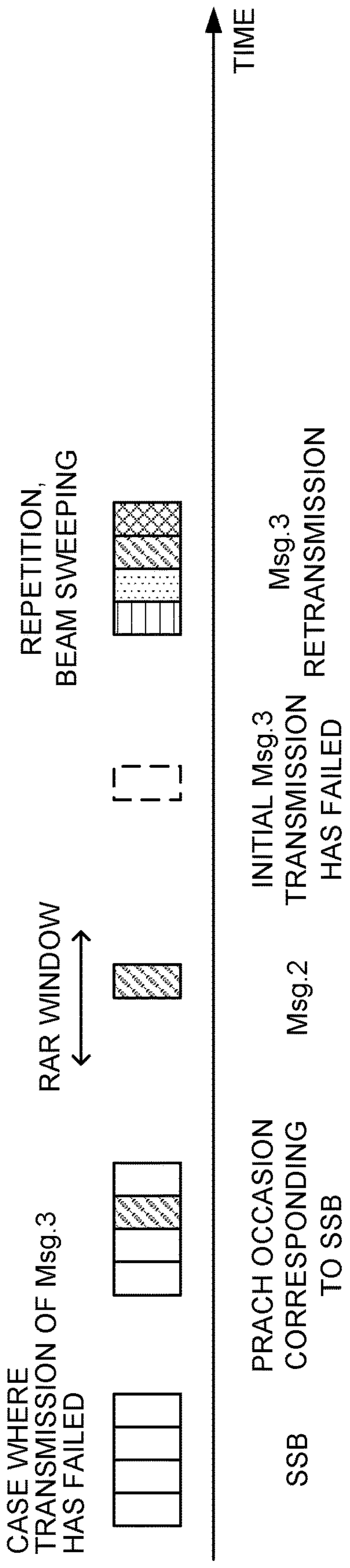

As in FIG. 38B, when the application condition is satisfied (the UE has failed in initial Msg.3 transmission), the UE may apply repetition transmission (apply the number of repetitions being larger than one) to a specific type of channel/RS (for example, Msg.3 retransmission) subsequent to this. The UE may use different beams (may use beam sweeping) for a plurality of respective repetitions or may use the same beam for the plurality of repetitions.

Relationships between the application condition and the number of repetitions will be described below.

{Aspect 12-1-A}

Correspondences between the application condition and the number of repetitions may be defined in a specification or may be notified/configured by broadcast/higher layer signaling. The UE may determine the number of repetitions corresponding to the application condition by using the correspondences and apply the number of repetitions to a specific type of channel/RS.

In the examples in FIGS. 39A and 39B, the application condition may be defined by a range of a value P of an SSB RSRP. Boundary values P_0, P_1, and P_2 may be defined in a specification or may be notified/configured by broadcast/higher layer signaling.

In the example in FIG. 39A, the number of repetitions for one or more specific types of channels/RSs is defined. In the example in FIG. 39B, the number of repetitions for each type of channel/RS (PUSCH/PUCCH/PDSCH) is defined. Since coverage is different for each channel/RS, the necessary number of repetitions may be different. For example, DL received (transmission) power is higher than UL received (transmission) power, and the larger the payload size is, the smaller the coverage becomes. The type of channel/RS may be the type of message/content. The type of message/content may be Msg.2/3/4 or the like.

Aspect 12-1 may be applied before RRC connection establishment, and the number of repetitions may be configured by an RRC IE after the RRC connection establishment.

{Aspect 12-1-B}

A plurality of configurations/candidates for the number of repetitions requested/reported by UL transmission (for example, Msg.3) may be defined in a specification or may be notified/configured by broadcast/higher layer signaling or the like. The UE may determine the number of repetitions from the plurality of configurations. The UE may request/report the determined number of repetitions by Msg.3 and apply, after reception confirmation of Msg.3 (reception of a Msg.4 PDCCH or Msg.4 (PDSCH)), the number of repetitions to a specific type of channel/RS.

In the example in FIG. 40A, a plurality of configurations/candidates for the number of repetitions for one or more specific types of channels/RSs are defined/configured. In the example in FIG. 40B, a plurality of configurations/candidates for the number of repetitions are defined/configured for each type of channel/RS (PUSCH/PUCCH/PDSCH). Since coverage is different for each channel/RS, the necessary number of repetitions may be different. For example, DL received (transmission) power is higher than UL received (transmission) power, and the larger the payload size is, the smaller the coverage becomes. The type of channel/RS may be the type of message/content. The type of message/content may be Msg.2/3/4 or the like.

Aspect 12-1 may be applied before RRC connection establishment, and the number of repetitions may be configured by an RRC IE after the RRC connection establishment.

«Aspect 12-2»

The base station (network) may determine repetition transmission/the number of repetitions. The UE may be indicated/configured with repetition transmission by at least one of a Msg.2 PDCCH/RAR, Msg.4, a Msg.B PDCCH/PDSCH, and higher layer signaling.

A plurality of configurations/candidates for the number of repetitions indicated/configured by DL transmission (at least one of a Msg.2 PDCCH/RAR, Msg.4, a Msg.B PDCCH/PDSCH, and higher layer signaling) may be defined in a specification or may be notified/configured by broadcast/higher layer signaling. The base station may be notified of/indicated/configured with one of the plurality of configurations of the number of repetitions by DL transmission. The UE may apply the notified number of repetitions to a specific type of channel/RS.

In the example in FIG. 41A, a plurality of configurations/candidates for the number of repetitions for one or more specific types of channels/RSs are defined/configured. In the example in FIG. 41B, a plurality of configurations/candidates for the number of repetitions are defined/configured for each type of channel/RS (PUSCH/PUCCH/PDSCH). Since coverage is different for each channel/RS, the necessary number of repetitions may be different. For example, DL received (transmission) power is higher than UL received (transmission) power, and the larger the payload size is, the smaller the coverage becomes. The type of channel/RS may be the type of message/content. The type of message/content may be Msg.2/3/4 or the like.

According to this embodiment, the UE can appropriately apply repetition transmission.

Thirteenth Embodiment

Coverage may be enlarged by repetition transmission of an SSB. A channel/RS (for example, a UE-specific channel/RS) other than an SSB may enlarge coverage by the use of a narrower beam than that of an SSB. Repetition transmission of a channel/RS other than an SSB need not be performed to a maximum extent.

Repetition transmission of an SSB transmitted periodically has a small effect on system overhead. Meanwhile repetition transmission of a UE-specific channel/RS has a large effect on system overhead.

Figure 42A:
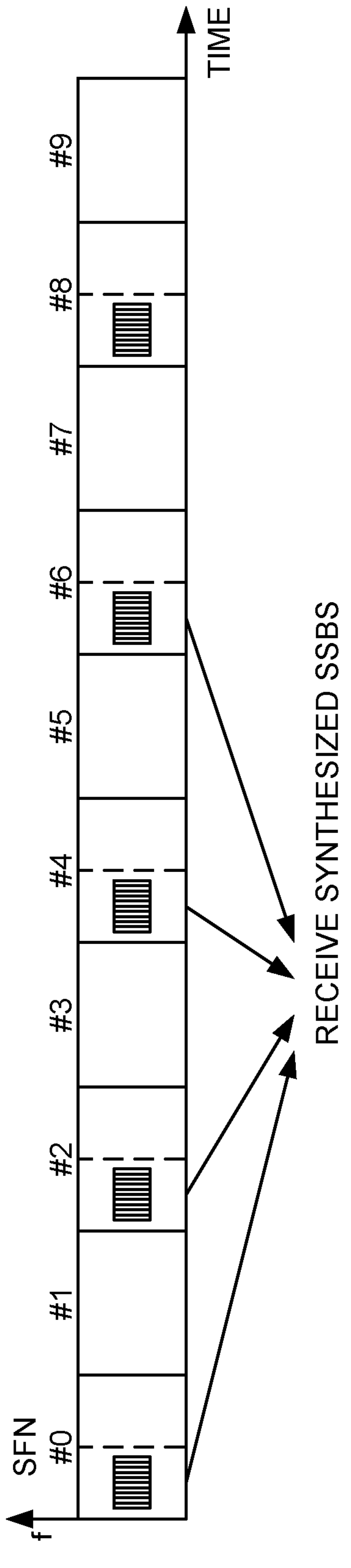
FIGS. 42A and 42B are diagrams to show examples of a thirteenth embodiment.
Figure 42B:
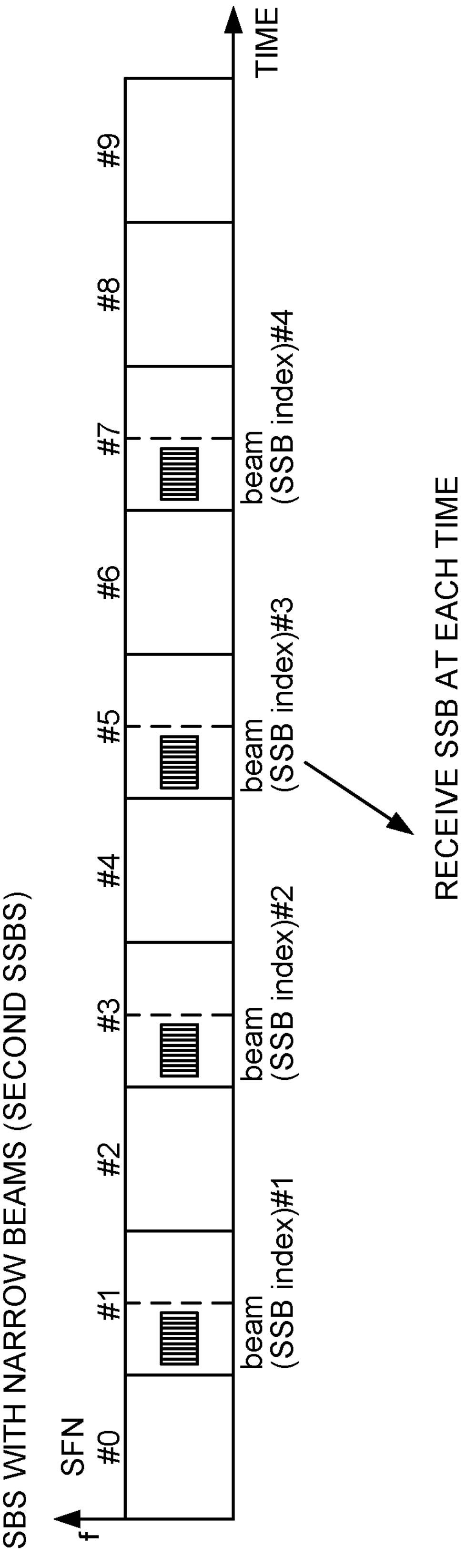

As in the example in FIG. 42A, signals each using a wide beam (for example, SSBs with wide beams, first SSBs) may be synthesized and received, to thereby enlarge coverage. The UE may synthesize and receive a specific number of (for example, four) SSBs to obtain synthesis gain. As in the example in FIG. 42B, signals each using a narrow beam (for example, SSBs with narrow beams, second SSBs) may have narrow beams, to thereby enlarge coverage. In the example in FIGS. 42A and 42B, four narrow beams correspond to (are included in) one wide beam. The narrow beams are subjected to beam sweeping, and different beams (SSB indices #1 to #4) are used in respective cycles of periodicity. In this example, the second SSBs of narrow beams are transmitted in different frames/slots from those of the first SSBs of wide beams but may be transmitted in the same frames/slots as those of the first SSBs. As in the tenth embodiment, a PSS/SSS may use a different beam from that of a PBCH/PBCH-DMRS within one SSB.

When an application condition is satisfied in the twelfth embodiment, the UE may request a narrow beam (for example, a second SSB) as the QCL source of a specific type of channel/RS. The UE may follow either of beam application operations 1 and 2 below.

{Beam Application Operation 1}

When the application condition is satisfied (for example, the received power/reception quality of an SSB is equal to or lower than a threshold), the UE may request/report repetition transmission as in Aspect 12-1-B and also apply a narrow beam to the QCL source of a specific type of channel/RS. The UE may determine the number of repetitions and select/determine a beam to be applied to the repetition. A wide beam (first SSB) may be applied to a channel/RS to which repetition transmission is not applied. A narrow beam (second SSB) may be applied to a channel/RS to which repetition transmission is applied. The number of repetitions of a channel/RS using a narrow beam may be smaller than the number of repetitions of a channel/RS using a wide beam.

{Beam Application Operation 2}

When the application condition is satisfied (for example, the received power/reception quality of an SSB is equal to or lower than a threshold), the UE may apply a narrow beam to the QCL source of a specific type of channel/RS without requesting/reporting repetition transmission as in Aspect 12-1-B.

According to beam application operations 1 and 2, it is possible to reduce resources necessary for repetition transmission and consequently increase resource usage efficiency.

A narrow beam may be one of a plurality of second SSBs associated with (included in) a received first SSB. A method of selecting a narrow beam may be defined in a specification or may be notified/configured by PBCH/SIB1/broadcast/higher layer signaling.

A channel/RS to which a narrow beam is applied may be all channels/RSs.

A channel/RS to which a narrow beam is applied may be a specific type of channel/RS. The specific type may be an RS, data, a control channel, or a channel having a given payload size or larger. To a channel/RS other than the specific type of channel/RS, repetition transmission may be applied, but neither repetition transmission nor a narrow beam may be applied.

Figure 43A:
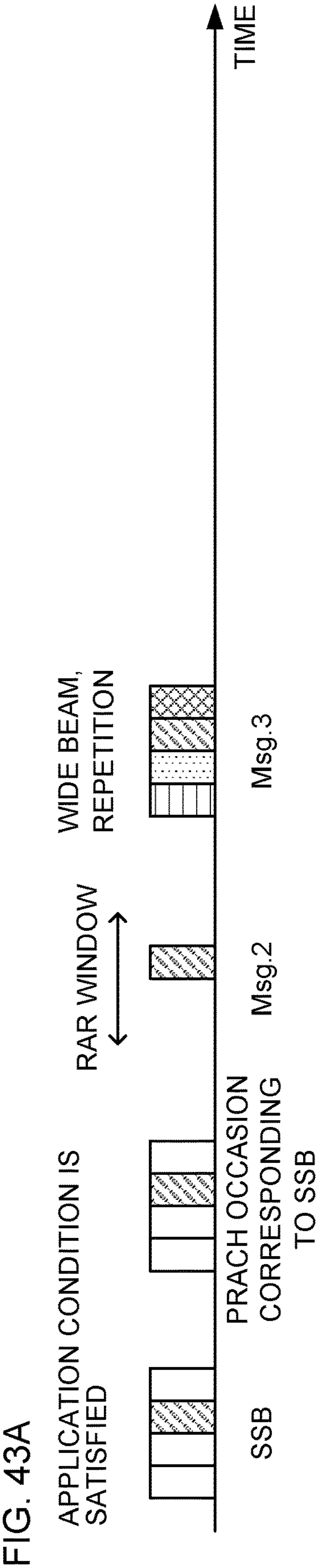
FIGS. 43A to 43C are diagrams to show an example of a Msg.3 transmission method.

FIG. 43A is a diagram to show an example of the eleventh/twelfth embodiment. When the application condition is satisfied (when the received power/reception quality of a detected SSB is equal to or lower than a threshold), the UE may transmit a PRACH in a PRACH occasion corresponding to the SSB, receive Msg.2 in a RAR window, and transmit a plurality of repetitions of Msg.3 by using a wide beam. For the plurality of repetitions, respective different wide beams may be used. The SSB may be a first SSB. The different wide beams may be associated with respective different first SSBs.

Figure 43B:
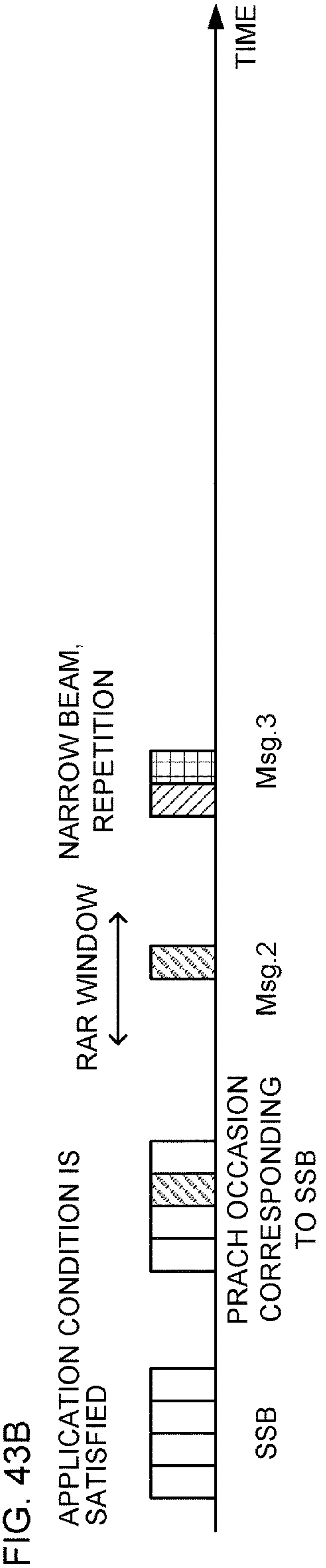

FIG. 43B is a diagram to show an example of beam application operation 1. When the application condition is satisfied (when the received power/reception quality of a detected SSB is equal to or lower than a threshold), the UE may transmit a PRACH in a PRACH occasion corresponding to the SSB, receive Msg.2 in a RAR window, and transmit a plurality of repetitions of Msg.3 by using a narrow beam. For the plurality of repetitions, respective different narrow beams may be used. The SSB may be a first SSB. The different narrow beams may be associated with respective different second SSBs associated with the first SSB.

Figure 43C:
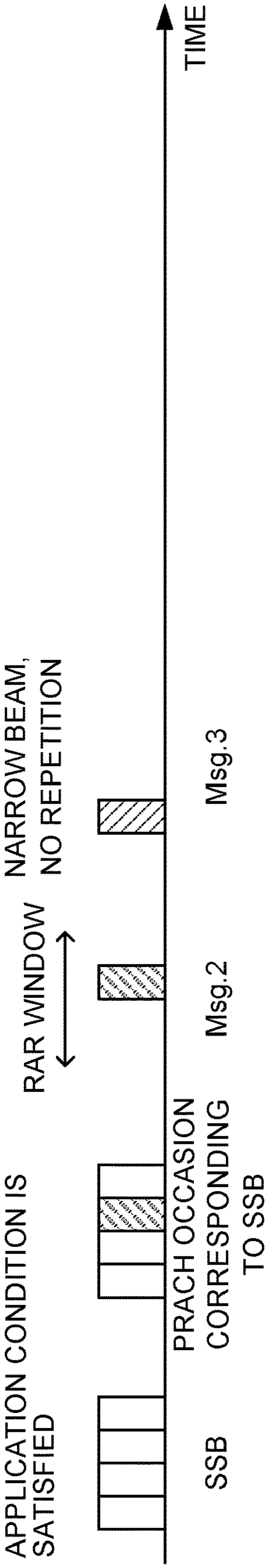

FIG. 43C is a diagram to show an example of beam application operation 2. When the application condition is satisfied (when the received power/reception quality of a detected SSB is equal to or lower than a threshold), the UE may transmit a PRACH in a PRACH occasion corresponding to the SSB, receive Msg.2 in a RAR window, and transmit Msg.3 (no repetition transmission) by using a narrow beam. The SSB may be a first SSB. The narrow beam may be associated with one of the plurality of second SSBs associated with the first SSB.

In Aspects 12-1-A, 12-1-B, and 12-2, whether to use a wide beam or a narrow beam may be configured in addition to the number of repetitions. For example, in the example in FIG. 44A, the number of repetitions and whether to use a wide beam or a narrow beam may be associated with each configuration in FIG. 14A of Aspect 12-2. For example, in the example in FIG. 44B, the number of repetitions and whether to use a wide beam or a narrow beam may be associated with each configuration in FIG. 14B of Aspect 12-2.

Other Embodiments

<<UE Capability/Higher Layer Parameter>>

A higher layer parameter (RRC information element)/UE capability corresponding to at least one function (characteristics, feature) in each of the embodiments may be defined. The UE capability may indicate whether to support this function.

The UE with which the higher layer parameter corresponding to the function is configured may perform the function. The "UE with which the higher layer parameter corresponding to the function is not configured does not perform the function (for example, applies operation in Rel. 15/16)" may be defined.

The UE that has reported the UE capability indicating support of the function may perform the function. The "UE that has not reported the UE capability indicating support of the function does not perform the function (for example, applies operation in Rel. 15/16)" may be defined.

When the UE has reported the UE capability indicating support of the function and with which the higher layer parameter corresponding to the function is configured, the UE may perform the function. "When the UE does not report the UE capability indicating support of the function and with which the higher layer parameter corresponding to the function is not configured, the UE does not perform the function (for example, applies operation in Rel. 15/16)" may be defined.

The UE capability may indicate whether to support a second SSB.

The UE capability may indicate whether to support that one QCL source/RS index is associated with a plurality of QCL sources/RS indices (includes a plurality of QCL sources/RS indices).

According to the UE capability/higher layer parameter described above, the UE can implement the function while maintaining compatibility with existing specifications.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 45:
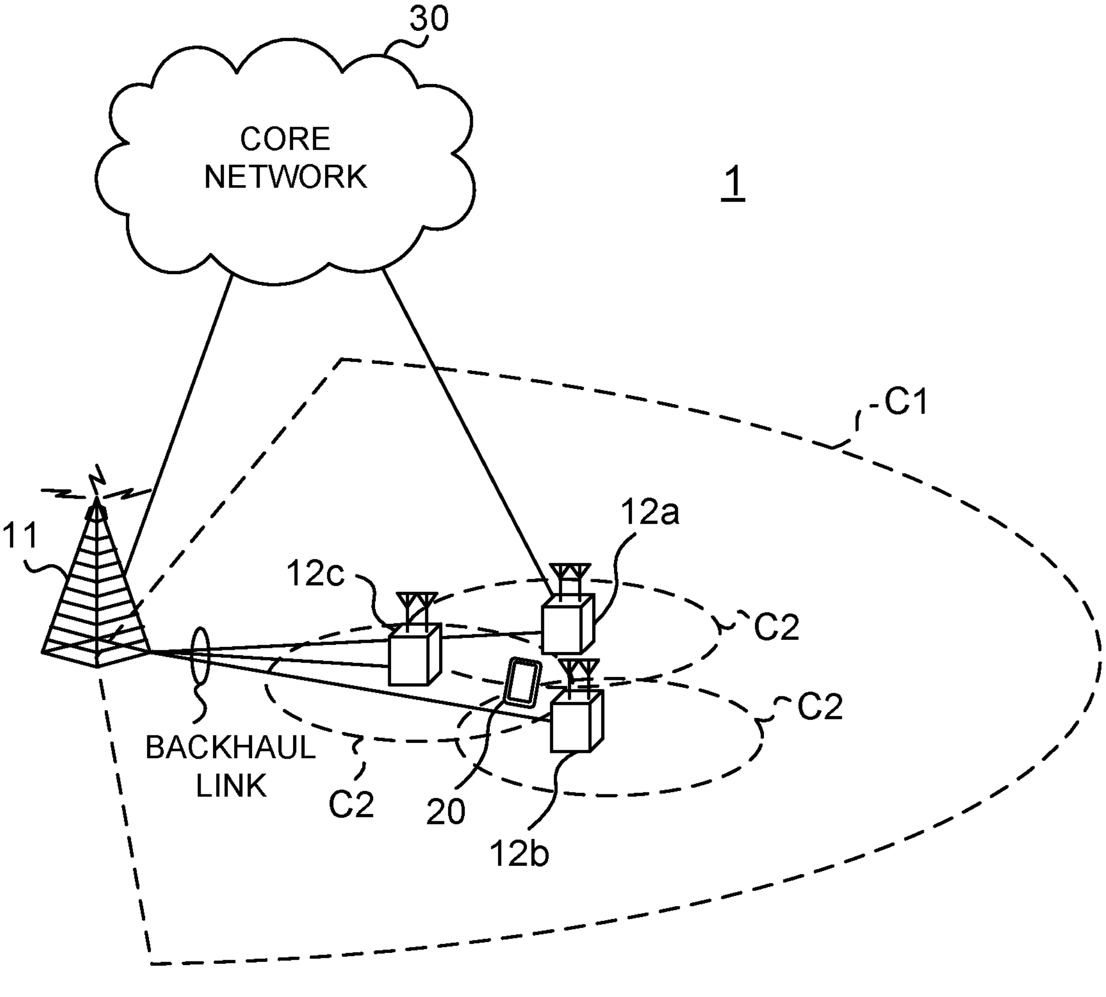
FIG. 45 is a diagram to show an example of a schematic structure of a radio communication system according to one embodiment.

FIG. 45 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 46:
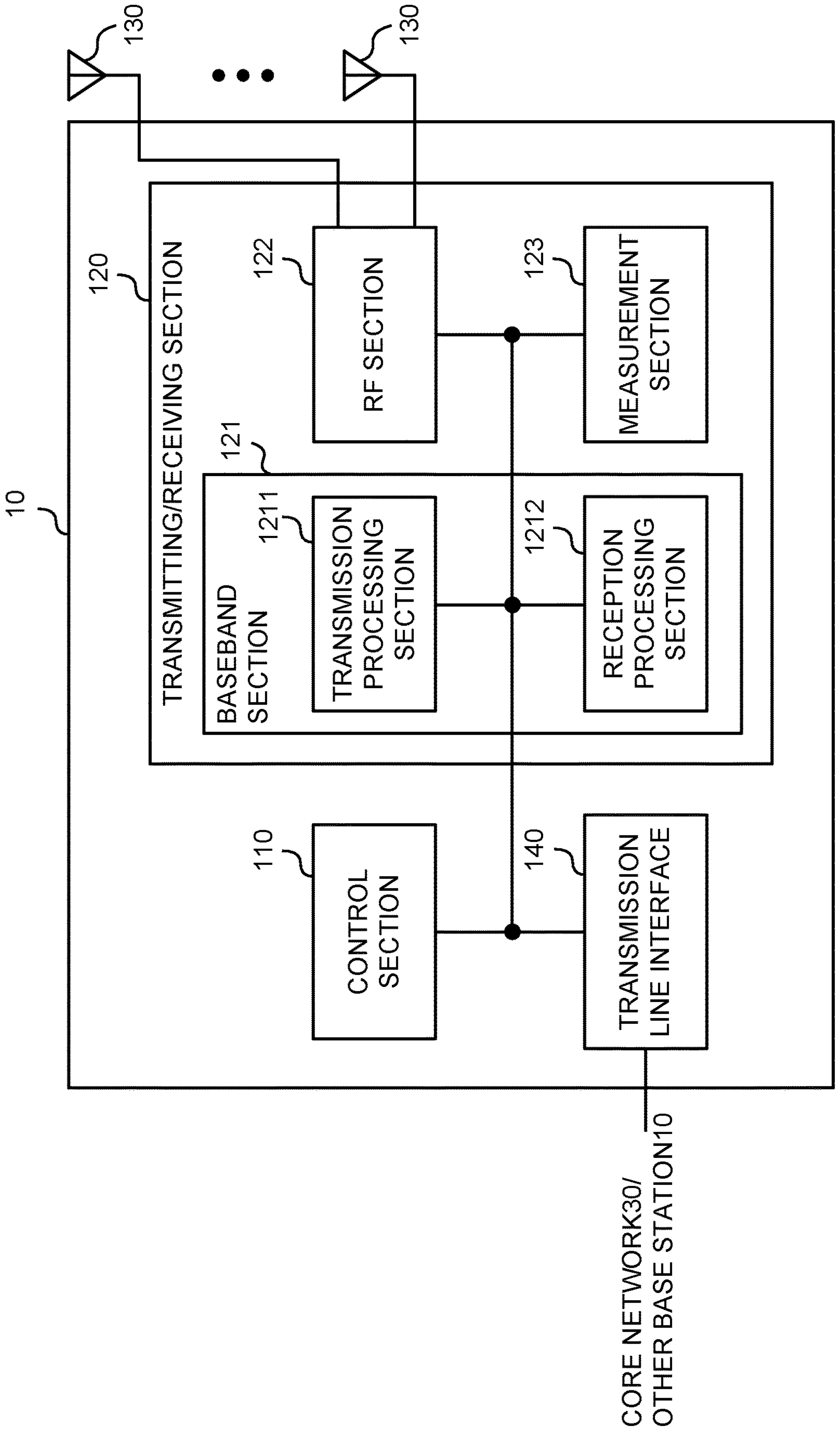
FIG. 46 is a diagram to show an example of a structure of a base station according to one embodiment.

FIG. 46 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120.

The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a first number of first synchronization signal blocks and a second number of second synchronization signal blocks. The control section 110 may control initial access based on at least one of the first number of the first synchronization signal blocks and the second number of the second synchronization signal blocks.

The transmitting/receiving section 120 may transmit a first synchronization signal block and a second synchronization signal block. The control section 110 may control reception of a signal based on the second synchronization signal block, based on a reception result of the first synchronization signal block.

The transmitting/receiving section 120 may transmit the first synchronization signal block and a plurality of second synchronization signal blocks. The control section 110 may control transmission by assuming that the plurality of second synchronization signal blocks are quasi-co-located (QCLed) with the first synchronization signal block.

The transmitting/receiving section 120 may transmit a first synchronization signal block. The control section 110 may control, when reception of the first synchronization signal block has failed, reception of a preamble by using a random access occasion for report of the failure.

The transmitting/receiving section 120 may receive a message in a random access procedure, in a physical uplink shared channel. The control section 110 may control a plurality of repetitions of at least one of transmission of a downlink channel for scheduling the physical uplink shared channel and reception of a channel the physical uplink shared channel.

The transmitting/receiving section 120 may transmit a synchronization signal block including a first signal and a second signal. The control section 110 may control transmission of the synchronization signal block by assuming that a first beam used for the first signal and a second beam used for the second signal are different from each other.

The transmitting/receiving section 120 may transmit indication of repetition for a plurality of types of signals. The control section 110 may apply the repetition to the plurality of types of signals, based on the indication.

User Terminal

Figure 47:
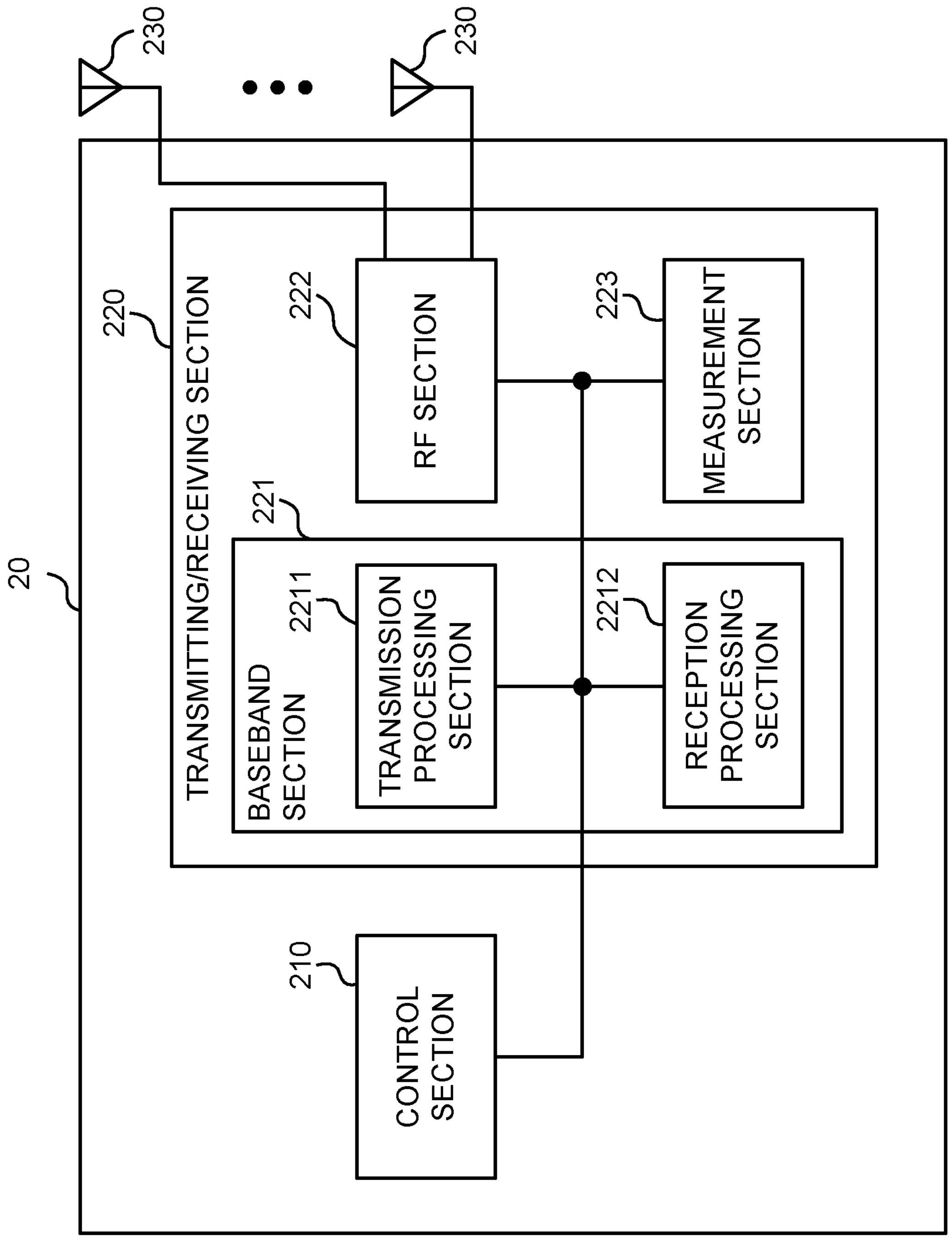
FIG. 47 is a diagram to show an example of a structure of a user terminal according to one embodiment.

FIG. 47 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive at least one synchronization signal block of a first number of first synchronization signal blocks and a second number of second synchronization signal blocks. The control section 210 may control initial access based on the synchronization signal block.

The second number may be larger than the first number.

Transmission periodicity of the second synchronization signal blocks may be different from transmission periodicity of the first synchronization signal blocks.

The second synchronization signal blocks may be transmitted aperiodically.

The transmitting/receiving section 220 may attempt reception of a first synchronization signal block. The control section 210 may control reception of a second synchronization signal block, based on a reception result of the first synchronization signal block.

When the first synchronization signal block is received, the control section may use a first random access channel occasion corresponding to the first synchronization signal block to control transmission of a first preamble.

When the second synchronization signal block is received, the control section may use a second random access channel occasion corresponding to the second synchronization signal block to control transmission of a second preamble.

When reception of the first synchronization signal block has failed, the control section may control reception of the second synchronization signal block.

The transmitting/receiving section 220 may receive at least one synchronization signal block of a first synchronization signal block and a plurality of second synchronization signal blocks. The control section 210 may control reception by assuming that the plurality of second synchronization signal blocks are quasi-co-located (QCLed) with the first synchronization signal block.

When a first demodulation reference signal for downlink is QCLed with the first synchronization signal block and a second demodulation reference signal for downlink is QCLed with one of the plurality of second synchronization signal blocks, the control section may control reception by assuming that the second demodulation reference signal is not QCLed with the first demodulation reference signal.

When a first demodulation reference signal for downlink is QCLed with the first synchronization signal block and a second demodulation reference signal for downlink is QCLed with one of the plurality of second synchronization signal blocks, the control section may control reception by assuming that the second demodulation reference signal is QCLed with the first demodulation reference signal.

When a preamble is transmitted in a random access channel occasion corresponding to the synchronization signal block, the control section may control reception by assuming that a third demodulation reference signal for downlink is QCLed with the synchronization signal block.

The transmitting/receiving section 220 may attempt reception of a first synchronization signal block. The control section 210 may control, when reception of the first synchronization signal block has failed, transmission of a preamble by using a random access occasion for report of the failure.

When reception of the first synchronization signal block has failed, the receiving section may attempt reception of the second synchronization signal block.

When the reception of the first synchronization signal block has failed, the receiving section may attempt, after the transmission of the preamble, reception of the second synchronization signal block.

When the reception of the first synchronization signal block has failed and the reception of the second synchronization signal block has been successful, the control section may control the transmission of the preamble.

The transmitting/receiving section 220 may transmit a message in a random access procedure, in a physical uplink shared channel. The control section 210 may control a plurality of repetitions of at least one of reception of a downlink channel for scheduling the physical uplink shared channel and transmission of a channel the physical uplink shared channel.

The control section may use a plurality of beams for the plurality of respective repetitions.

When initial transmission of the message has failed, the control section may control the plurality of repetitions of the transmission of the physical uplink shared channel.

The random access procedure may be based on a first synchronization signal block, and retransmission of the message may be based on a second synchronization signal block.

The transmitting/receiving section 220 may receive a synchronization signal block including a first signal and a second signal. The control section 210 may control the reception of the synchronization signal block by assuming that a first beam used for the first signal and a second beam used for the second signal are different from each other.

The first signal may correspond to a first synchronization signal block index, the second signal may correspond to a second synchronization signal block index, and the first synchronization signal block index may be associated with a plurality of second synchronization signal block indices.

The first synchronization signal block index may be unchanged in each cycle of periodicity, and the second synchronization signal block index may change in each cycle of the periodicity.

The first signal may be a synchronization signal, and the second signal may be a physical broadcast channel.

The transmitting/receiving section 220 may receive indication of repetition for a plurality of types of signals. The control section 210 may apply the repetition to the plurality of types of signals, based on the indication.

When an application condition is satisfied, the control section may apply the repetition to the plurality of types of signals.

The indication may include a plurality of repetitions, and the control section may apply one of a plurality of repetition numbers to at least one of the plurality of types of signals.

The control section may apply, in a random access procedure based on a first synchronization signal block, a beam corresponding to a second synchronization signal block, to the repetition.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 48:
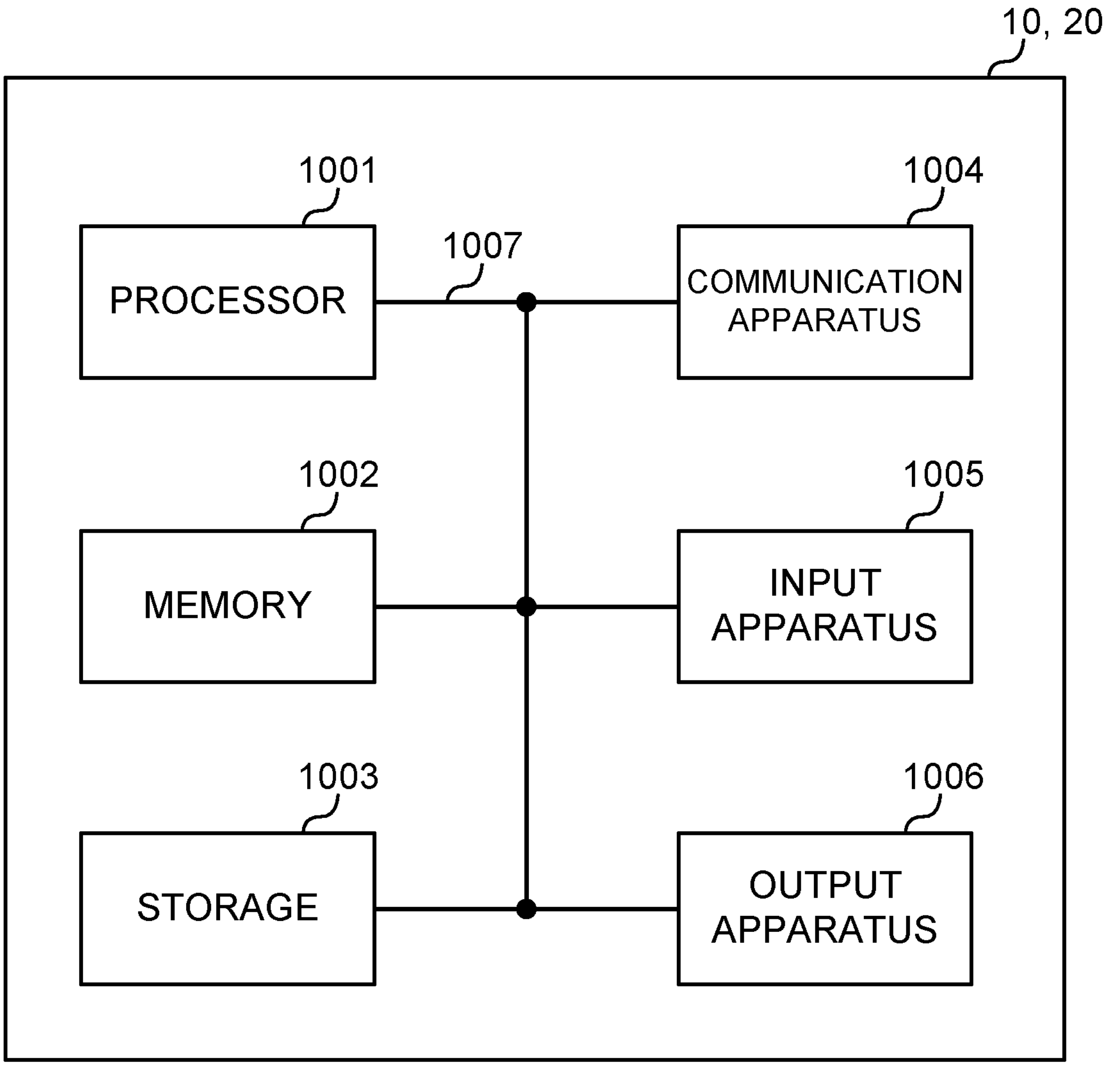
FIG. 48 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 48 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a “subframe.” Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a “sub-slot.” A mini-slot may be constituted of symbols less than the number of slots. A PDSCH (or PUSCH) transmitted in a time unit larger than a mini-slot may be referred to as “PDSCH (PUSCH) mapping type A.” A PDSCH (or PUSCH) transmitted using a mini-slot may be referred to as “PDSCH (PUSCH) mapping type B.”

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a “TTI,” a plurality of consecutive subframes may be referred to as a “TTI,” or one slot or one mini-slot may be referred to as a “TTI.” That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a “slot,” a “mini-slot,” and so on instead of a “subframe.”

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a “normal TTI” (TTI in 3GPP Rel. 8 to Rel. 12), a “long TTI,” a “normal subframe,” a “long subframe,” a “slot” and so on. A TTI that is shorter than a normal TTI may be referred to as a “shortened TTI,” a “short TTI,” a “partial or fractional TTI,” a “shortened subframe,” a “short subframe,” a “mini-slot,” a “sub-slot,” a “slot” and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a “physical resource block (Physical RB (PRB)),” a “subcarrier group (SCG),” a “resource element group (REG),”a “PRB pair,” an “RB pair” and so on.

Furthermore, a resource block may be constituted of one or a plurality of resource elements (REs). For example, one RE may correspond to a radio resource field of one subcarrier and one symbol.

A bandwidth part (BWP) (which may be referred to as a “fractional bandwidth,” and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a “cell,” a “carrier,” and so on in the present disclosure may be interpreted as a “BWP”.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), asgivening, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives a synchronization signal block including a first signal and a second signal; and a processor that controls reception of the synchronization signal block by assuming that the first signal is quasi co-located (QCLed) with the second signal, wherein the first signal corresponds to a first synchronization signal block index, and the second signal corresponds to a second synchronization signal block index, and the first synchronization signal block index is unchanged over each cycle of a periodicity, and the second synchronization signal block index changes per cycle of the periodicity.

2. The terminal according to claim 1, wherein the first signal is a synchronization signal, and the second signal is a physical broadcast channel.

3. A radio communication method for a terminal, comprising:

receiving a synchronization signal block including a first signal and a second signal; and controlling reception of the synchronization signal block by assuming that the first signal is quasi co-located (QCLed) with the second signal, wherein the first signal corresponds to a first synchronization signal block index, and the second signal corresponds to a second synchronization signal block index, and the first synchronization signal block index is unchanged over each cycle of a periodicity, and the second synchronization signal block index changes per cycle of the periodicity.

4. A base station comprising:

a transmitter that transmits a synchronization signal block including a first signal and a second signal; and a processor that controls transmission of the synchronization signal block by assuming that the first signal is quasi co-located (QCLed) with the second signal, wherein the first signal corresponds to a first synchronization signal block index, and the second signal corresponds to a second synchronization signal block index, and the first synchronization signal block index is unchanged over each cycle of a periodicity, and the second synchronization signal block index changes per cycle of the periodicity.

5. A system comprising a base station and a terminal, wherein the base station comprises a transmitter that transmits a synchronization signal block including a first signal and a second signal, and the terminal comprises:

a receiver that receives the synchronization signal block including the first signal and the second signal; and a processor that controls reception of the synchronization signal block by assuming that the first signal is quasi co-located (QCLed) with the second signal, wherein the first signal corresponds to a first synchronization signal block index, and the second signal corresponds to a second synchronization signal block index, and the first synchronization signal block index is unchanged over each cycle of a periodicity, and the second synchronization signal block index changes per cycle of the periodicity.

* * * * *